United States Patent
Jakobovits et al.

(10) Patent No.: US 12,061,775 B2
(45) Date of Patent: Aug. 13, 2024

(54) COLLABORATION SYSTEM INCLUDING MARKERS IDENTIFYING MULTIPLE CANVASES IN A SHARED VIRTUAL WORKSPACE

(71) Applicant: Haworth, Inc., Holland, MI (US)

(72) Inventors: Ariel Jakobovits, Redwood City, CA (US); Satish Santhakumar, Fremont, CA (US); Demian Entrekin, Oakland, CA (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 18/214,441

(22) Filed: Jun. 26, 2023

(65) Prior Publication Data

US 2023/0342000 A1 Oct. 26, 2023

Related U.S. Application Data

(63) Continuation of application No. 17/480,084, filed on Sep. 20, 2021, now Pat. No. 11,755,176, which is a
(Continued)

(51) Int. Cl.
*G06F 3/14* (2006.01)
*G06F 3/0482* (2013.01)
(Continued)

(52) U.S. Cl.
CPC .......... *G06F 3/0482* (2013.01); *G06F 3/1431* (2013.01); *G06F 3/1454* (2013.01); *H04L 67/131* (2022.05); *H04L 67/01* (2022.05)

(58) Field of Classification Search
CPC .................................................. G06F 3/0482
See application file for complete search history.

(56) References Cited

U.S. PATENT DOCUMENTS

| | | |
|---|---|---|
| 4,686,332 A | 8/1987 | Greanias et al. |
| 5,008,853 A | 4/1991 | Bly et al. |
| | (Continued) | |

FOREIGN PATENT DOCUMENTS

| | | |
|---|---|---|
| AU | 2014275495 B2 | 12/2015 |
| CN | 101630240 A | 1/2010 |
| | (Continued) | |

OTHER PUBLICATIONS

U.S. Appl. No. 15/147,576—Notice of Allowance mailed Jan. 8, 2020, 23 pages.
(Continued)

*Primary Examiner* — Di Xiao
(74) *Attorney, Agent, or Firm* — Haynes Beffel & Wolfeld LLP; Andrew L. Dunlap; Franklin M. Schellenberg

(57) ABSTRACT

A node of a collaboration system is provided to establish communication with other nodes, store data identifying graphical targets having locations in a virtual workspace and including locations in the virtual workspace of the identified graphical targets, and compute a mapping of a local client viewport to a local client screen space. The node is configured to render on the local client screen space graphical targets having locations within the local client viewport, provide a user interface to display a list of viewport markers representing viewports, where each viewport defines an area in the workspace, and respond to an input indicating a selected viewport marker from the list of viewport markers, update the local client viewport to match the location and dimensions of the viewport represented by the selected viewport marker, and render on the local client screen space graphical targets having locations within the updated local client viewport.

30 Claims, 26 Drawing Sheets

Related U.S. Application Data continuation of application No. 15/791,351, filed on Oct. 23, 2017, now Pat. No. 11,126,325.

(51) Int. Cl.
  *H04L 67/131* (2022.01)
  *H04L 67/01* (2022.01)

(56) References Cited

U.S. PATENT DOCUMENTS

| | | |
|---|---|---|
| 5,220,657 A | 6/1993 | Bly et al. |
| 5,309,555 A | 5/1994 | Akins et al. |
| 5,394,521 A | 2/1995 | Henderson, Jr. et al. |
| 5,446,842 A | 8/1995 | Schaeffer et al. |
| 5,537,526 A | 7/1996 | Anderson et al. |
| 5,563,996 A | 10/1996 | Tchao |
| 5,613,134 A | 3/1997 | Lucus et al. |
| 5,689,628 A | 11/1997 | Robertson |
| 5,727,002 A | 3/1998 | Miller et al. |
| 5,781,732 A | 7/1998 | Adams |
| 5,812,847 A | 9/1998 | Joshi et al. |
| 5,818,425 A | 10/1998 | Want et al. |
| 5,835,713 A | 11/1998 | FitzPatrick et al. |
| 5,867,156 A | 2/1999 | Beard et al. |
| 5,872,924 A | 2/1999 | Nakayama et al. |
| 5,938,724 A | 8/1999 | Pommier et al. |
| 5,940,082 A | 8/1999 | Brinegar et al. |
| 6,078,921 A | 6/2000 | Kelley |
| 6,084,584 A | 7/2000 | Nahi et al. |
| 6,128,014 A | 10/2000 | Nakagawa et al. |
| 6,167,433 A | 12/2000 | Maples et al. |
| 6,320,597 B1 | 11/2001 | Ieperen |
| 6,342,906 B1 | 1/2002 | Kumar et al. |
| 6,343,313 B1 | 1/2002 | Salesky et al. |
| 6,518,957 B1 | 2/2003 | Lehtinen et al. |
| 6,564,246 B1 | 5/2003 | Varma et al. |
| 6,710,790 B1 | 3/2004 | Fagioli |
| 6,778,989 B2 | 8/2004 | Bates et al. |
| 6,911,987 B1 | 6/2005 | Mairs et al. |
| 6,930,673 B2 | 8/2005 | Kaye et al. |
| 6,930,679 B2 | 8/2005 | Wu et al. |
| 7,003,728 B2 | 2/2006 | Berque |
| 7,043,529 B1 | 5/2006 | Simonoff |
| 7,100,195 B1 | 8/2006 | Underwood |
| 7,129,934 B2 | 10/2006 | Uman et al. |
| 7,171,448 B1 | 1/2007 | Danielsen et al. |
| 7,356,563 B1 | 4/2008 | Leichtling et al. |
| 7,450,109 B2 | 11/2008 | Halcrow et al. |
| D600,703 S | 9/2009 | LaManna et al. |
| 7,908,325 B1 | 3/2011 | Pabla et al. |
| 8,209,308 B2 | 6/2012 | Rueben et al. |
| D664,562 S | 7/2012 | McCain et al. |
| 8,402,391 B1 | 3/2013 | Doray et al. |
| 8,407,290 B2 | 3/2013 | Abt, Jr. et al. |
| 8,543,929 B1 | 9/2013 | Holloway |
| 8,898,590 B2 | 11/2014 | Okada et al. |
| 8,954,862 B1 | 2/2015 | Mabie et al. |
| 9,201,854 B1 | 12/2015 | Kloiber et al. |
| 9,298,834 B2 | 3/2016 | Kleppner et al. |
| 9,465,434 B2 | 10/2016 | Mason |
| 9,471,192 B2 | 10/2016 | Mason |
| 9,479,548 B2 | 10/2016 | Jensen et al. |
| 9,479,549 B2 | 10/2016 | Pearson |
| 9,607,113 B1 | 3/2017 | Ciolfi et al. |
| 10,255,023 B2 | 4/2019 | Liu et al. |
| 10,353,664 B2* | 7/2019 | Poel .................... G06F 3/1454 |
| 10,802,783 B2 | 10/2020 | Santhakumar et al. |
| 11,262,969 B2 | 3/2022 | Santhakumar et al. |
| 11,481,730 B2 | 10/2022 | Foley et al. |
| 11,816,387 B2 | 11/2023 | Santhakumar et al. |
| 2003/0020671 A1 | 1/2003 | Santoro et al. |
| 2003/0058227 A1 | 3/2003 | Hara et al. |
| 2004/0060037 A1 | 3/2004 | Damm et al. |
| 2004/0083264 A1 | 4/2004 | Veselov |
| 2004/0093331 A1 | 5/2004 | Garner et al. |
| 2004/0150627 A1 | 8/2004 | Luman et al. |
| 2004/0155871 A1 | 8/2004 | Perski et al. |
| 2004/0174398 A1 | 9/2004 | Luke et al. |
| 2004/0243605 A1 | 12/2004 | Bernstein et al. |
| 2004/0243663 A1 | 12/2004 | Johanson et al. |
| 2005/0060656 A1 | 3/2005 | Martinez et al. |
| 2005/0195216 A1 | 9/2005 | Kramer et al. |
| 2005/0237380 A1 | 10/2005 | Kakii et al. |
| 2005/0262107 A1 | 11/2005 | Bergstraesser et al. |
| 2005/0273700 A1 | 12/2005 | Champion et al. |
| 2006/0012580 A1 | 1/2006 | Perski et al. |
| 2006/0066588 A1 | 3/2006 | Lyon et al. |
| 2006/0195507 A1 | 8/2006 | Baek et al. |
| 2006/0211404 A1 | 9/2006 | Cromp et al. |
| 2006/0220982 A1 | 10/2006 | Ueda |
| 2006/0224427 A1 | 10/2006 | Salmon |
| 2006/0294473 A1 | 12/2006 | Keely et al. |
| 2007/0070066 A1 | 3/2007 | Bakhash |
| 2007/0136685 A1 | 6/2007 | Bhatla et al. |
| 2007/0198744 A1 | 8/2007 | Wensley et al. |
| 2007/0262964 A1 | 11/2007 | Zotov et al. |
| 2008/0114844 A1 | 5/2008 | Sanchez et al. |
| 2008/0143818 A1 | 6/2008 | Ferren et al. |
| 2008/0163053 A1 | 7/2008 | Hwang et al. |
| 2008/0177771 A1 | 7/2008 | Vaughn |
| 2008/0201339 A1 | 8/2008 | McGrew et al. |
| 2008/0207188 A1 | 8/2008 | Ahn et al. |
| 2008/0301101 A1 | 12/2008 | Baratto et al. |
| 2009/0049381 A1 | 2/2009 | Robertson et al. |
| 2009/0089682 A1 | 4/2009 | Baier et al. |
| 2009/0128516 A1 | 5/2009 | Rimon et al. |
| 2009/0153519 A1 | 6/2009 | Suarez Rovere |
| 2009/0160786 A1 | 6/2009 | Finnegan |
| 2009/0174679 A1 | 7/2009 | Westerman |
| 2009/0195518 A1 | 8/2009 | Mattice et al. |
| 2009/0207146 A1 | 8/2009 | Shimasaki et al. |
| 2009/0217177 A1 | 8/2009 | DeGrazia |
| 2009/0225075 A1* | 9/2009 | Bates .................... G06T 17/00 |
| | | 345/419 |
| 2009/0234721 A1 | 9/2009 | Bigelow et al. |
| 2009/0251457 A1 | 10/2009 | Walker et al. |
| 2009/0278806 A1 | 11/2009 | Duarte et al. |
| 2009/0282359 A1 | 11/2009 | Saul et al. |
| 2009/0309846 A1 | 12/2009 | Trachtenberg et al. |
| 2009/0309853 A1 | 12/2009 | Hildebrandt et al. |
| 2010/0011316 A1 | 1/2010 | Sar et al. |
| 2010/0017727 A1 | 1/2010 | Offer et al. |
| 2010/0073454 A1 | 3/2010 | Lovhaugen et al. |
| 2010/0132034 A1 | 5/2010 | Pearce et al. |
| 2010/0192091 A1 | 7/2010 | Oishi et al. |
| 2010/0194701 A1 | 8/2010 | Hill |
| 2010/0205190 A1 | 8/2010 | Morris et al. |
| 2010/0211920 A1 | 8/2010 | Westerman et al. |
| 2010/0306650 A1 | 12/2010 | Oh et al. |
| 2010/0306696 A1 | 12/2010 | Groth et al. |
| 2010/0309148 A1 | 12/2010 | Fleizach et al. |
| 2010/0315481 A1 | 12/2010 | Wijngaarden et al. |
| 2010/0318470 A1 | 12/2010 | Meinel et al. |
| 2010/0318921 A1 | 12/2010 | Trachtenberg et al. |
| 2010/0328306 A1 | 12/2010 | Chau et al. |
| 2011/0047505 A1 | 2/2011 | Fillion et al. |
| 2011/0050640 A1 | 3/2011 | Lundback et al. |
| 2011/0055773 A1 | 3/2011 | Agarawala et al. |
| 2011/0060992 A1 | 3/2011 | Jevons et al. |
| 2011/0063191 A1 | 3/2011 | Leung et al. |
| 2011/0069184 A1 | 3/2011 | Go |
| 2011/0109526 A1 | 5/2011 | Bauza et al. |
| 2011/0148926 A1 | 6/2011 | Koo et al. |
| 2011/0154192 A1 | 6/2011 | Yang et al. |
| 2011/0183654 A1 | 7/2011 | Lanier et al. |
| 2011/0191343 A1 | 8/2011 | Heaton et al. |
| 2011/0197147 A1 | 8/2011 | Fai |
| 2011/0197157 A1 | 8/2011 | Hoffman et al. |
| 2011/0197263 A1 | 8/2011 | Stinson, III |
| 2011/0202424 A1 | 8/2011 | Chun et al. |
| 2011/0208807 A1 | 8/2011 | Shaffer |
| 2011/0214063 A1 | 9/2011 | Saul |
| 2011/0216064 A1 | 9/2011 | Dahl et al. |
| 2011/0225494 A1 | 9/2011 | Shmuylovich et al. |

(56) References Cited

U.S. PATENT DOCUMENTS

| | | |
|---|---|---|
| 2011/0243380 A1 | 10/2011 | Forutanpour et al. |
| 2011/0246875 A1 | 10/2011 | Parker et al. |
| 2011/0264785 A1 | 10/2011 | Newman et al. |
| 2011/0271229 A1 | 11/2011 | Yu |
| 2012/0011465 A1 | 1/2012 | Rezende |
| 2012/0019452 A1 | 1/2012 | Westerman |
| 2012/0026200 A1 | 2/2012 | Okada et al. |
| 2012/0030193 A1 | 2/2012 | Richberg et al. |
| 2012/0038572 A1 | 2/2012 | Kim et al. |
| 2012/0050197 A1 | 3/2012 | Kemmochi |
| 2012/0075212 A1 | 3/2012 | Park et al. |
| 2012/0124124 A1 | 5/2012 | Beaty et al. |
| 2012/0127126 A1 | 5/2012 | Mattice et al. |
| 2012/0169772 A1 | 7/2012 | Werner et al. |
| 2012/0176328 A1 | 7/2012 | Brown et al. |
| 2012/0179994 A1 | 7/2012 | Knowlton et al. |
| 2012/0229425 A1 | 9/2012 | Barrus et al. |
| 2012/0254858 A1 | 10/2012 | Moyers et al. |
| 2012/0260176 A1 | 10/2012 | Sehrer |
| 2012/0274583 A1 | 11/2012 | Haggerty |
| 2012/0275683 A1 | 11/2012 | Adler et al. |
| 2012/0278738 A1 | 11/2012 | Kruse et al. |
| 2012/0320073 A1 | 12/2012 | Mason |
| 2013/0004069 A1 | 1/2013 | Hawkins et al. |
| 2013/0027404 A1 | 1/2013 | Sarnoff |
| 2013/0047093 A1 | 2/2013 | Reuschel et al. |
| 2013/0086487 A1 | 4/2013 | Findlay et al. |
| 2013/0093695 A1 | 4/2013 | Davidson |
| 2013/0198653 A1 | 8/2013 | Tse et al. |
| 2013/0218998 A1 | 8/2013 | Fischer et al. |
| 2013/0222371 A1 | 8/2013 | Reitan |
| 2013/0246969 A1 | 9/2013 | Barton |
| 2013/0282820 A1 | 10/2013 | Jabri et al. |
| 2013/0290857 A1* | 10/2013 | Beveridge ............ G06F 3/0482 715/740 |
| 2013/0320073 A1 | 12/2013 | Yokoo et al. |
| 2013/0346878 A1 | 12/2013 | Mason |
| 2013/0346910 A1 | 12/2013 | Mason |
| 2014/0013234 A1 | 1/2014 | Beveridge et al. |
| 2014/0022334 A1 | 1/2014 | Lockhart et al. |
| 2014/0032770 A1 | 1/2014 | Pegg |
| 2014/0033067 A1 | 1/2014 | Pittenger et al. |
| 2014/0040767 A1 | 2/2014 | Bolia |
| 2014/0040780 A1* | 2/2014 | Artzt ................... H04L 65/403 715/753 |
| 2014/0055400 A1 | 2/2014 | Reuschel |
| 2014/0062957 A1 | 3/2014 | Perski et al. |
| 2014/0063174 A1 | 3/2014 | Junuzovic et al. |
| 2014/0101122 A1 | 4/2014 | Oren |
| 2014/0149880 A1 | 5/2014 | Farouki |
| 2014/0149901 A1 | 5/2014 | Hunter |
| 2014/0222916 A1 | 8/2014 | Foley et al. |
| 2014/0223334 A1 | 8/2014 | Jensen et al. |
| 2014/0223335 A1 | 8/2014 | Pearson |
| 2014/0282229 A1* | 9/2014 | Laukkanen ........... G06F 3/1454 715/788 |
| 2014/0325431 A1 | 10/2014 | Vranjes et al. |
| 2014/0380193 A1 | 12/2014 | Coplen et al. |
| 2015/0007040 A1 | 1/2015 | Xu et al. |
| 2015/0007055 A1 | 1/2015 | Lemus et al. |
| 2015/0084055 A1 | 3/2015 | Nagata et al. |
| 2015/0089452 A1 | 3/2015 | Dorninger |
| 2015/0120834 A1* | 4/2015 | Maheshwari ........ G06Q 10/101 709/204 |
| 2015/0185990 A1 | 7/2015 | Thompson |
| 2015/0248384 A1 | 9/2015 | Luo et al. |
| 2015/0279071 A1 | 10/2015 | Xin |
| 2015/0331489 A1 | 11/2015 | Edwardson |
| 2016/0085381 A1* | 3/2016 | Parker .................. G06F 8/34 715/753 |
| 2016/0142471 A1 | 5/2016 | Tse et al. |
| 2016/0179754 A1* | 6/2016 | Borza .................. G06Q 10/101 715/247 |
| 2016/0232647 A1 | 8/2016 | Carlos et al. |
| 2016/0328098 A1 | 11/2016 | Santhakumar et al. |
| 2016/0328114 A1 | 11/2016 | Santhakumar et al. |
| 2016/0378291 A1 | 12/2016 | Pokrzywka |
| 2017/0090852 A1 | 3/2017 | Harada |
| 2017/0235537 A1 | 8/2017 | Liu et al. |
| 2017/0315767 A1 | 11/2017 | Rao |
| 2017/0330150 A1 | 11/2017 | Foley et al. |
| 2018/0292964 A1 | 10/2018 | Snyder |
| 2019/0034395 A1* | 1/2019 | Curry ................... G06F 40/166 |
| 2019/0065041 A1* | 2/2019 | Nakamura ............ G06F 3/0416 |
| 2020/0164278 A1* | 5/2020 | Andre .................. G06Q 10/10 |

FOREIGN PATENT DOCUMENTS

| | | |
|---|---|---|
| CN | 103023961 A | 4/2013 |
| CN | 103229141 A | 7/2013 |
| CN | 104112440 A | 10/2014 |
| CN | 104395883 A | 3/2015 |
| CN | 104412257 A | 3/2015 |
| JP | 2002116996 A | 4/2002 |
| JP | 2005258877 A | 9/2005 |
| JP | 2010079834 A | 4/2010 |
| JP | 2010129093 A | 6/2010 |
| JP | 2010134897 A | 6/2010 |
| JP | 2010165178 A | 7/2010 |
| JP | 2010218313 A | 9/2010 |
| JP | 2012043251 A | 3/2012 |
| JP | 2016012252 A | 1/2016 |
| KR | 20030034987 A | 5/2003 |
| KR | 1020090085068 A | 8/2009 |
| WO | 0161633 A2 | 8/2001 |
| WO | 2008063833 A1 | 5/2008 |
| WO | 2009018314 A2 | 2/2009 |
| WO | 2011029067 A2 | 3/2011 |
| WO | 2011048901 A1 | 4/2011 |
| WO | 2012162411 A1 | 11/2012 |
| WO | 2014023432 A1 | 2/2014 |
| WO | 2014121209 A2 | 8/2014 |

OTHER PUBLICATIONS

KR 10-2016-7000174—Request for Examination and Voluntary Amendment, 31 pages, Feb. 25, 2019.
U.S. Appl. No. 15/668,009—Office Action dated Dec. 26, 2019, 18 pages.
AU 2014275495—Response to First Examination Report mailed Mar. 25, 2019 filed Jan. 29, 2020, 131 pages.
U.S. Appl. No. 16/375,487—Preliminary Amendment filed Nov. 6, 2019, 11 pages.
U.S. Appl. No. 16/375,487—Notice of Allowance dated Mar. 6, 2020, 38 pages.
U.S. Appl. No. 15/147,576—Notice of Allowance dated Apr. 22, 2020, 10 pages.
U.S. Appl. No. 15/668,009—Office Action dated Jun. 18, 2020, 28 pages.
U.S. Appl. No. 15/668,009—Response to Office Action dated Dec. 26, 2019 filed Apr. 17, 2020, 30 pages.
U.S. Appl. No. 16/375,487—Notice of Allowance dated Apr. 27, 2020, 13 pages.
PCT/US2016/033134 International Search Report, dated Aug. 8, 2016, 3 pages.
PCT/US2018/028365—International Search Report and Written Opinion dated Jul. 31, 2018, 13 pages.
U.S. Appl. No. 15/496,472—Non-Final Office Action mailed Dec. 31, 2018, 46 pages.
CA 2914371—First Office Action dated Mar. 11, 2020, 4 pages.
EP 14808241.5—Extended European Search Report dated Nov. 18, 2016, 9 pgs.
EP 14808241.5—Summons to Attend Oral Proceedings dated Feb. 18, 2020, 12 pages.
AU 2014275495—Notice of Acceptance dated Feb. 20, 2020, 6 pages.
JP 2017-557318—Amendment filed with JP translation on Dec. 17, 2017, 13 pages.

(56) References Cited

OTHER PUBLICATIONS

EP 16790089-3—Response to European Extended Search Report dated Jan. 2, 2019, as filed Jul. 5, 2019, 27 pages.
EP 16790089-3—Rule 71(3) EPC Communication (Intention to Grant) dated Jan. 22, 2020, 100 pages.
KR 10-2016-7000174—First Office Action dated Sep. 1, 2020, 12 pages.
CA 2914371—Response to First Office Action filed Jul. 10, 2020, 13 pages.
CA 2914371—Second Office Action dated Jan. 22, 2021, 4 pages.
EP 14808241.5—Intent to grant Rule 71(3) communication, 84 pages.
CN 201680026389.4—First Office Action dated Sep. 23, 2020, 22 pages.
CN 201680026389.4—Response to First Office Action filed Jan. 7, 2021, 19 pages with English translation.
KR 10-2016-7000714—Second Office Action dated Apr. 27, 2021, 45 pages (translation included).
U.S. Appl. No. 14/090,830 Notice of Allowance, dated Dec. 26, 2018, 17 pages.
U.S. Appl. No. 15/668,009 Notice of Allowance, dated Dec. 14, 2020, 17 pages.
CA 2914371 Response to Second Office Action dated Jan. 22, 2021, filed Jul. 21, 2021, 10 pages.
U.S. Appl. No. 17/201,574—Office Action dated Mar. 3, 2022, 19 pages.
CA 2914371—Third Office Action dated Feb. 18, 2022, 7 pages.
"Ergonomics Data and Mountain Heights," Ergonomic Ground Rules, last revised Sep. 22, 2010, 2 pgs.
Albin, T., "Comfortable Portable Computing: The Ergonomic Equation," Copyright 2008 Ergotron, Inc., 19 pgs.
Anacore, "Anacore Presents Synthesis", InfoComm 2012: Las Vegas, NV, USA, Jun. 9-15, 2012, 2 pages, screen shots taken fromhttp://www.youtube.com/watch?v=FbQ9P1c5aNk (visited Nov. 1, 2013).
EP 12789695.9—Supplemental European Search Report dated Nov. 19, 2014, 9 pgs.
EP 14808241.5—Amendments made at the time of regional phase entry, Dec. 17, 2015, 11 pages.
EP 14808241.5—First Office Action dated Jan. 25, 2018, 10 pages.
EP 14808241.5—Response to European Extended Search Report dated Nov. 18, 2016 filed May 24, 2017, 19 pages.
EP 14808241.5—Response to First Office Action dated Jan. 25, 2018 filed on May 22, 2018, 15 pages.
Ionescu, Ama, et al., "WorkspaceNavigator: Tools for Capture, Recall and Reuse using Spatial Cues in an Interactive Workspace," 2002, <URL=https://hci.stanford.edu/research/wkspcNavTR.pdf>, 16 p.
PCT/US2014/018375—International Preliminary Report on Patentability, dated Dec. 8, 2015, 12 pgs.
Johanson, Brad et al., "The Event Heap: an Enabling Infrastructure for Interactive Workspaces." 2000 <Url=https://iraphics.stanford.edu/papers/eheap/>, 11 pages.
JP 2016-518315—First Office Action dated Feb. 6, 2018, 7 pages.
JP 2016-518315—Request for Examination and Amendment filed Feb. 23, 2017, 9 pages.
Keller, Ariane, "The ANA Project, Development of the ANA-Core Software" Masters Thesis, dated Sep. 21, 2007, ETH Zurich, 92 pages.
U.S. Appl. No. 14/090,830—Office Action dated Dec. 3, 2015, 26 pgs.
U.S. Appl. No. 14/090,830—Office Action dated May 5, 2016, 39 pgs.
U.S. Appl. No. 15/147,224—Office Action dated Feb. 7, 2018, 16 pgs.
U.S. Appl. No. 15/340,810—Office Action dated Jun. 18, 2018, 20 pgs.

PCT/US2017/017432—International Search Report and Written Opinion dated May 31, 2017, 14 pages.
PCT/US2013/058030—International Search Report and Written Opinion mailed Dec. 27, 2013, 11 pgs.
PCT/US2013/058040—International Search Report and Written Opinion mailed Dec. 18, 2013, 10 pgs.
PCT/US2013/058261—International Search Report and Written Opinion mailed Dec. 30, 2013, 14 pgs.
PCT/US2014/014475—International Search Report and Written Opinion dated Nov. 28, 2014, 10 pgs.
PCT/US2014/014489—International Search Report and Written Opinion dated May 30, 2014, 13 pgs.
PCT/US2016/031000—International Search Report and Written Opinion dated Aug. 16, 2016, 14 pages.
PCT/US2012/039176—International Search Report and Written Opinion mailed Sep. 24, 2012, 15 pgs.
PCT/US2014/014494—International Search Report and Written Opinion dated May 30, 2014, 10 pgs.
PCT/US2014/018375—International Search Report and Written Opinion mailed Jul. 1, 2014, 16 pgs.
Taylor, Allen G, SQL for Dummies, 7th Edition, published Jul. 5, 2012, 11 pages.
U.S. Appl. No. 13/758,993—Line Drawing Behavior for Digital Whiteboard filed Feb. 4, 2013, 46 pgs.
U.S. Appl. No. 13/759,017—Office Action dated Nov. 6, 2014, 19 pgs.
U.S. Appl. No. 14/090,830—Appeal Brief filed Dec. 6, 2017, 29 pgs.
U.S. Appl. No. 14/090,830—Examiner's 2nd Answer to Appeal Brief dated Mar. 28, 2018, 23 pgs.
U.S. Appl. No. 14/090,830—Examiner's Answer to Appeal Brief dated Mar. 19, 2018, 23 pgs.
U.S. Appl. No. 14/090,830—Reply Brief dated Apr. 17, 2018, 7 pgs.
U.S. Appl. No. 14/090,830—Supplemental Appeal Brief filed Jan. 5, 2018, 7 pgs.
Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2014.
W3C Working Group Note, HTML: The Markup Language (an HTML language reference), http://www.w3.org/TR/html-markup/iframe.html[Aug. 4, 2016 2:01:59 PM], 3 pages.
CN 201480039006.8—First Office Action dated Jul. 28, 2017, 20 pages.
CN 201480039006.8—Response to First Office Action dated Jul. 28, 2017 filed Feb. 12, 2018, 38 pages.
CN 201480039006.8—Second Office Action dated Jun. 1, 2018, 39 pages.
JP 2016-518315—Notice of Allowance dated Sep. 18, 2018, 10 pages.
JP 2016-518315—Response to First Office Action dated Feb. 6, 2018 filed Aug. 2, 2018, 19 pages.
U.S. Appl. No. 15/147,576—Office Action dated Oct. 5, 2018, 22 pages.
U.S. Appl. No. 15/147,224—Final Office Action, dated Dec. 13, 2018, 13 pages.
EP 16790089-3—EP Extended Search Report dated Jan. 2, 2019, 10 pages.
PCT/US2017/017432—International Preliminary Report on Patentability and Written Opinion, dated Aug. 14, 2018, 10 pages.
U.S. Appl. No. 15/147,576—Office Action dated Aug. 8, 2019, 22 pages.
AU 2014275495—First Examination Report mailed Mar. 25, 2019, 3 pages.
Buszko et al., Decentralized Ad-Hoc Groupware API and Framework for Mobile Collaboration, Proceedings of the 2001 International ACM SIGGROUP Conference on Supporting Group Work, Association for Computing Machinery, dated Sep. 30-Oct. 3, 2001, 10 pages.

* cited by examiner

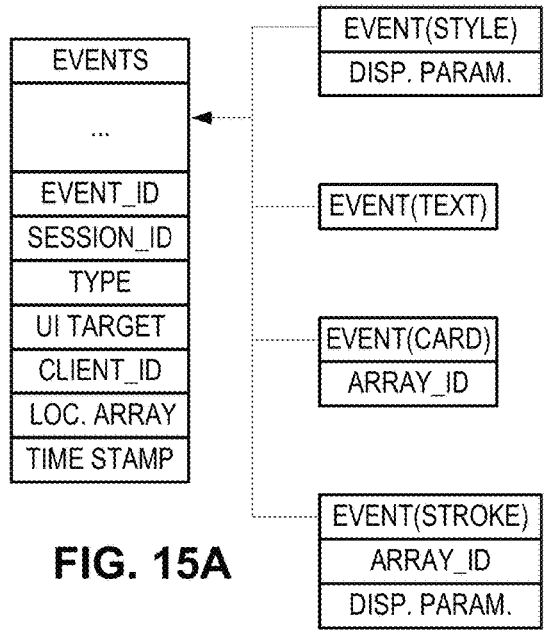
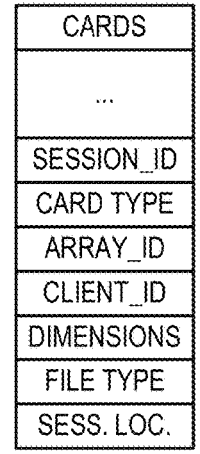
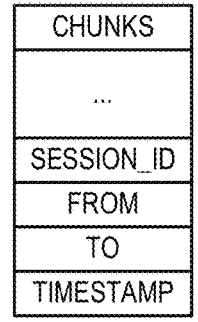
FIG. 15A
FIG. 15B
FIG. 15C
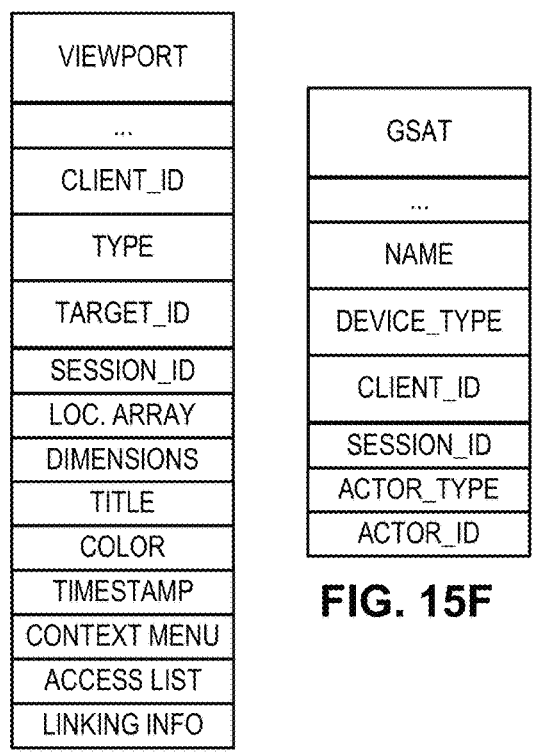
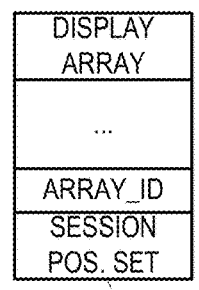
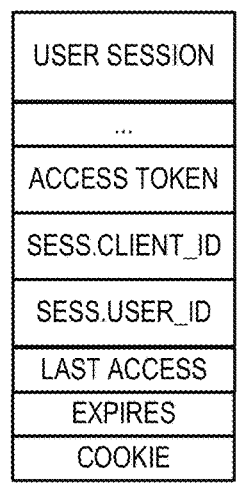
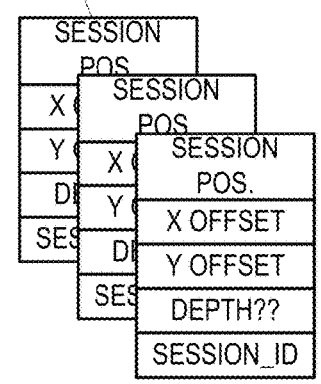
FIG. 15D
FIG. 15F
FIG. 15E
FIG. 15G

COLLABORATION SYSTEM INCLUDING MARKERS IDENTIFYING MULTIPLE CANVASES IN A SHARED VIRTUAL WORKSPACE

PRIORITY DATA

This application is a continuation of U.S. application Ser. No. 17/480,084, entitled COLLABORATION SYSTEM INCLUDING MARKERS IDENTIFYING MULTIPLE CANVASES IN A SHARED VIRTUAL WORKSPACE, filed Sep. 20, 2021, which is a continuation of U.S. application Ser. No. 15/791,351, entitled VIRTUAL WORKSPACE INCLUDING SHARED VIEWPORT MARKERS IN A COLLABORATION SYSTEM, filed Oct. 23, 2017, the disclosure of which is incorporated herein by reference in its entirety.

RELATED APPLICATIONS

The commonly owned patent, U.S. Pat. No. 10,304,037, is incorporated herein by reference, entitled COLLABORATION SYSTEM INCLUDING A SPATIAL EVENT MAP, filed Nov. 26, 2013.

BACKGROUND

Field

The technology disclosed relates to apparatuses, methods, and systems for digital collaboration, which facilitate multiple simultaneous users having access to global workspace data, and more particularly to creating and accessing shared viewport markers that allow all users of digital collaboration systems to open viewports represented by the shared viewport markers.

Description of Related Art

Digital displays are often used for interactive presentations and other purposes in a manner analogous to whiteboards. Some displays are networked and can be used for collaboration, so that modifications made to the display image on one display are replicated on another display. Collaboration systems can be configured to operate collaboration sessions in which users located at different client platforms share a workspace as described in our co-pending U.S. application Ser. No. 14/090,830, entitled Collaboration System Including A Spatial Event Map, filed Nov. 26, 2013, published Aug. 7, 2014). The distributed nature of such systems allows multiple users in different places to interact with, and change, data in the same workspace at the same time, and also at times when no other user is observing the workspace. Also, the workspace can be very large, essentially unbounded in some systems.

Several problems associated with collaboration systems using large (e.g., practically unbounded) workspaces relate to efficient and user friendly navigation around the workspace. Specifically, these problems can include: (i) locating graphical objects in the workspace and viewing them as they were intended to be viewed by their creators; (ii) traversing the workspace in an intended order while minimizing manual panning and zooming; and (iii) creating content specific tools for the many types and formats of content that can be placed in a digital whiteboard without cluttering the user interface. These problems can arise, in part, because the workspace can be essentially unbounded, and users can place graphical objects anywhere in the workspace, making it difficult for a user to identify and view all graphical objects that are intended to be viewed together or associated with each other at the same time. These problems also arise because a user may add graphical objects to the workspace in a specific order, or with the intention that they are viewed by other users in a specific order, or in association with or at the same time as other graphical objects. However, without the correct mechanisms and tools in place it can be difficult for a user to follow a series of graphical objects in the intended order (e.g., in a walkthrough), as intended by a creator of the graphical objects. This can lead to a user missing some critical information that is closely associated with a graphical target currently being viewed.

SUMMARY

A system is disclosed that supports the storing and tracking of viewports within a collaborative workspace (e.g., a digital whiteboarding workspace) that enables users to share displayable areas within the workspace as intended by a creator of content in the workspace for efficient traversal and organization of the workspace across multiple devices and locations. The technology disclosed includes a method for one client to find and track on their display a particular viewport and all of the graphical objects included therein, as generated by another client within a shared workspace.

A network node, for use in a collaboration system, is described that comprises a display having a physical display space, a user input device, a processor and a communication port. The processor is configured with logic to establish communication with one or more other network nodes, store collaboration data identifying graphical targets having locations in a virtual workspace, the collaboration data including locations in the virtual workspace of the identified graphical targets, compute a mapping of a local client viewport having a location and dimensions in the virtual workspace to a local client screen space having dimensions in the physical display space, render on the local client screen space one or more graphical targets having locations within the local client viewport as a function of the mapping, provide a user interface to (i) display a list of viewport markers representing viewports in the virtual workspace, each viewport represented by the viewport markers defining an area in the virtual workspace having a location and dimensions, and (ii) respond to an input indicating a selected viewport marker from the list of displayed viewport markers, update the local client viewport to match the location and dimensions, in the virtual workspace, of the viewport represented by the selected viewport marker, and render on the local client screen space one or more graphical targets having locations within the updated local client viewport.

Further, a network node, for use in a collaboration system, is described that comprises a display having a physical display space, a user input device, a processor and a communication port. The processor is configured with logic to establish a link to a server-side network node, and retrieve, from the server-side network node, at least part of a log of entries identifying: a location and dimensions, within a virtual workspace, of a viewport represented by a viewport marker selected from a menu, graphical targets, and virtual coordinates of the graphical targets representing locations in the virtual workspace, wherein the viewport represented by the selected viewport marker defines an area in the virtual workspace having the location and dimensions, the defined area in the virtual workspace includes certain graphical targets for simultaneous display on the physical display space of the network node when rendered by the network node, and wherein an entry in the log, which identifies the viewport represented by the selected viewport marker, comprises data specifying (i) virtual coordinates of the location and dimensions, within the virtual workspace, of the viewport represented by the selected viewport marker and having the defined area including the certain graphical targets and (ii) virtual coordinates of a location and dimensions in the virtual workspace of the certain graphical targets. The processor is further configured with logic to map a displayable area, in the physical display space, to locations and dimensions of a local client viewport that is set to match the locations and dimensions of the viewport represented by the selected viewport marker, and render each of the certain graphical targets included in the defined area of the viewport represented by the selected viewport marker onto the displayable area.

Also, methods of operating client nodes in a collaboration session as described herein, and non-transitory computer readable media storing computer programs, implementing logical functions as described herein, for a client in a collaboration session, are described.

The above summary is provided in order to provide a basic understanding of some aspects of the collaboration system described herein. This summary is not intended to identify key or critical elements of the technology disclosed or to delineate a scope of the technology disclosed.

BRIEF DESCRIPTION OF THE DRAWINGS

The included drawings are for illustrative purposes and serve to provide examples of structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures. The technology disclosed will be described with respect to specific embodiments thereof, and reference will be made to the drawings, which are not drawn to scale, and in which:

FIGS. 15A, 15B, 15C, 15D, 15E, 15F and 15G (collectively FIG. 15) represent data structures which can be part of workspace data maintained by a database at the collaboration server 1405.

DETAILED DESCRIPTION

Figure 1A:
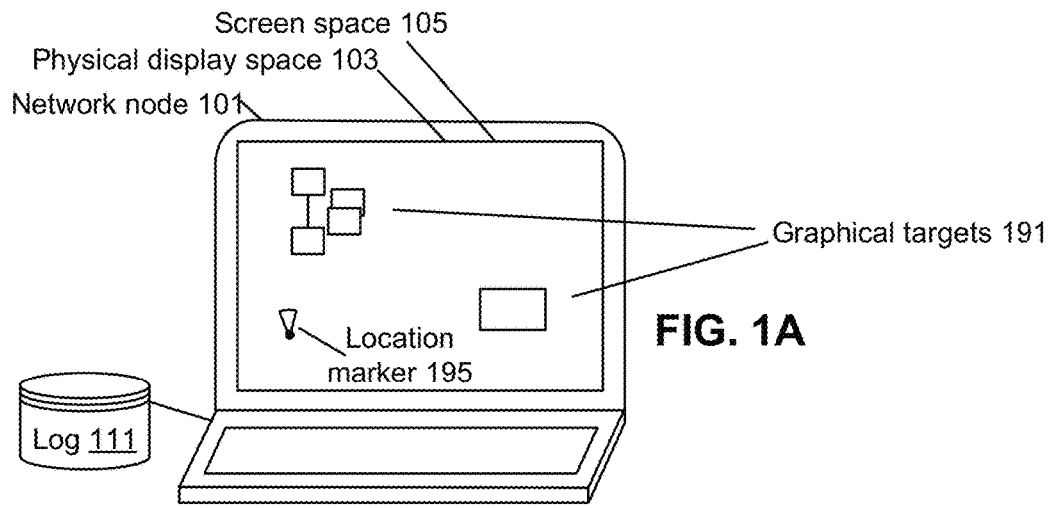
FIGS. 1A, 1B, and 1C (collectively FIG. 1) illustrate one implementation of a system of network nodes that collaborate within a virtual workspace.

The following description is presented to enable any person skilled in the art to make and use the technology disclosed, and is provided in the context of particular applications and requirements. Various modifications to the disclosed embodiments will be readily apparent to those skilled in the art, and the general principles defined herein may be applied to other embodiments and applications without departing from the spirit and scope of the technology disclosed. Thus, the technology disclosed is not intended to be limited to the embodiments shown, but is to be accorded the widest scope consistent with the principles and features disclosed herein.

Overview of Collaborative Workspaces and Viewports

Collaborative workspaces, such as digital whiteboarding workspaces, are essentially blank canvases that exist in two-dimensional space to which users can add content such as text or images. When content is added to a workspace it must be placed at a specific location. Thus, when a user places content in a workspace, the user must indicate to the system where in the workspace content is to be placed. To support referencing specific locations within workspaces, a system that implements a collaborative workspace might treat its workspace as a Cartesian plane having an origin at its center. Such a system need not place any artificial limitations on the distance from the origin that one can reference, and in such a system, the maximum and minimum coordinates that can be referenced in the workspace are limited by the extent of the addressing scheme used to store those coordinates. If, for example, a system were able to store addresses extending from (−1,000,000) to 1,000,000 in both the vertical and horizontal directions, then the workspaces supported by that system would be considered practically unlimited since it would take the average person an inordinate amount of time to traverse, much less fill, that much space.

While a workspace may be essentially infinite in size, the physical display area of a screen that a user would use to render the workspace is finite in size. Therefore, a user would not be able to render an entire workspace, but rather, would always be rendering a portion of the workspace. Because the entire workspace is addressable in Cartesian coordinates, any portion of the workspace that a user may be viewing itself has a location, width, and height in Cartesian space. This concept of a portion of a workspace can be referred to as a viewport, which is described in greater detail below.

For example, in a system that implements a collaborative workspace, workspaces can be stored on a central network node (e.g., a server) comprised of a processor and communication port that is capable of receiving connections from other network nodes (e.g., client nodes) and transmitting to them all or part of the digital workspace as requested. When a user wishes to render a workspace, they will use a client, comprised of a display, user input device(s), processor and communication port, that is configured with logic to establish communication with the central network node, request and receive workspace data, and render workspaces to the display. Upon connecting to the central network node, clients can request a finite portion of the workspace by transmitting values representing a viewport, namely a location, width, and height. In response to such a request, the central network node will return data enabling the client to render that area of the workspace including any content that has been placed wholly or partially within that area previously by any users of the system to the client's display. Assuming no changes are being made to a workspace, two users on separate clients that request the same viewport from the central network node for display on the same size screen at the same time will see the exact same result rendered to the display. If two users on separate clients with the same screen sizes wish to view the same portion of the workspace, one user (user A) must somehow convey (using their client) to the client of the other user (user B) the exact location, width, and height of their current viewport so that the client of user B can obtain the content of the same portion of the workspace from the central network node and render the content within that particular viewport on the display of user B.

In a collaboration system, where users wish to share viewports for any purpose, such as synchronizing displays, the system implementing the collaborative workspace must (i) enable clients to transmit information related to their viewports to the central network node, (ii) enable the central network node to distribute the dimensions of the viewports and the contents located within the viewports to the client nodes, and (iii) enable clients to select and obtain the dimensions, locations and contents of the viewports, so that the contents of the workspace that are located in the viewports can be rendered on the respective screens of the clients. For example, a system that implements a collaborative workspace can include viewport information whenever clients are connecting to and transmitting information about the state of the workspace. This viewport information can include the locations, dimensions and/or contents of the viewports of any and all clients connected to the central network node and the locations, dimensions and/or contents of viewports that have been saved by users in the workspace.

Definitions And Descriptions

The "unlimited workspace" problem includes the need to track how people and devices interact with the workspace over time. In one implementation, this can be addressed by allowing a first system to select a particular view (i.e., a viewport) including specific graphical objects created by a second system. In other words, the first system has the ability to select and view a particular portion of the workspace that was created by the second system, such that the first system views all of the graphical objects as intended by the user of the second system. In another implementation, a first system can save a viewport (e.g., a particular area of the workspace) in association with a viewport marker, and make the viewport marker available to a second system. In order to solve this core problem and to be able to provide the features described above, a Spatial Event Map has been created, which includes a system architecture supporting collaboration using a plurality of Spatial Event Maps and a plurality of collaboration groups. The Spatial Event Map contains information needed to define objects and events in a workspace. The Spatial Event Map comprises data structures specifying events having locations and dimensions in a virtual collaboration space (e.g., a virtual workspace). The events, maps of events in the space, and access to the space by multiple users, including multiple simultaneous users, support collaboration from users around the globe.

Space: In order to support an unlimited amount of spatial information for a given collaboration session, a way is provided to organize a virtual space termed the workspace, which can for example be characterized by a two-dimensional Cartesian plane with essentially unlimited extent in one or both of the dimensions for example, in such a way that new content can be added to the space, that content can be arranged and rearranged in the space, that a user can navigate from one part of the space to another, and that a user can easily find needed things in the space when required.

Events: Interactions with the workspace are handled as events. People, via tangible user interface devices, and systems can interact with the workspace. Events have data that can define or point to a target graphical object to be displayed on a physical display, and an action, such as creation, modification, movement within the workspace and deletion of a target graphical object, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content, and to understand how the spatial data evolves over time. Also, the Spatial Event Map can have a reasonable size in terms of the amount of data needed, while also defining an unbounded workspace.

There can be several different kinds of events in the system. Events can be classified as persistent events, also referred to as history events that are stored permanently, or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the Spatial Event Map of a session. Ephemeral events may include events not stored in an undo/playback event stream for the system. A Spatial Event Map, or maps, can be used by a collaboration system to track the times and locations in the workspace in some embodiments of both persistent and ephemeral events on workspaces in the system.

Map: A map of events in the workspace can include the sum total of discrete spatial events that relate to graphical objects having locations in the workspace. When the persistent spatial events for a workspace are available, then that workspace and events in the map of that workspace can be "mapped" to a physical display or screen that has a displayable area referred to herein as a screen space, of specific size. A client can specify their own a viewport (i.e., a local client viewport) in the workspace, where the local client viewport has a location and dimensions in the workspace. The client can then map the events from their local client viewport of the workspace to the screen space for display.

Multi-User Access: One key characteristic is that all users, or multiple users, who are working on a workspace simultaneously, should be able to see the interactions of the other users in a near-real-time way. The Spatial Event Map allows users having displays at different physical locations to experience near-real-time events, including both persistent and ephemeral events, within their respective viewports, for all users on any given workspace. The collaboration system architectures described herein enable operation of many workspaces and many user groups.

User manipulation of groups of graphical targets, referred to as group interactions, at client nodes, such as group creation, duplication, movement, editing, group membership modifications, deletion and other group management interactions, can be experienced as near-real-time events, including both persistent and ephemeral events, within their respective screen spaces, for all users on any given workspace. One way for a first user to ensure that all other users can view graphical targets or widgets as intended by the first user is to provide the ability for the first user to create a viewport having an area that includes one or more graphical targets and share a viewport marker to the other users. The shared viewport marker represents the viewport created by the first user and allows the other users to open up (view) that viewport and all of the graphical targets included therein as intended by the first user.

Widget: A widget is a component of a workspace that the user can interact with or view, e.g. Notes, Images, Clocks, Web Browsers, Video Players, Location Markers, Viewport Markers, etc. A Window is a widget that is a rectangular region with two diagonally opposite corners. Most widgets are also windows.

Furthermore, the Spatial Event Map can include a log of events, where entries in the log have the location of the graphical target of the event in the workspace and a time. Also, entries in the log can include a parameter (e.g. url or actual file) identifying graphical constructs used to render the graphical target on a display. A graphical construct has a location and a dimension in the screen space when it is rendered. Server-side network nodes and client-side network nodes are described which interact to form the collaboration system by which the Spatial Event Map can be made accessible to authorized clients, and clients can utilize the Spatial Event Map to render local display areas, and create events that can be added to the Spatial Event Map and shared with other clients.

The (virtual) workspace associated with a specific collaboration session can be represented as an unbounded virtual area providing a frame of reference without a specified boundary, within which to locate events in time and in virtual collaboration space. The workspace can encompass a virtual area that is practically unlimited in that it has a size large enough that the likelihood of a client-side network node navigating beyond its boundaries is negligible. For example, a size encompassing a virtual area that maps to a physical display space including 1,000,000 pixels by 1,000,000 pixels can be considered practically unlimited in some settings. In some examples, the workspace is essentially "infinite" in that its size is only limited by the extent of the addressing scheme used to identify locations within the workspace. Also, the system can include a number of workspaces, where each workspace can be configured individually for access by a single user or by a user group.

The collaboration system can be configured according to an application program interface (API) so that the server-side network nodes and the client-side network nodes can communicate about collaboration events. Messages can be defined that identify events that create, modify or delete a graphical target having a location in the workspace and the time, and groups of graphical targets. The events can be classified as history events ("he" events) and as ephemeral, or volatile events ("ve" events), where history events are stored in the Spatial Event Map, and ephemeral events are not permanently stored with the Spatial Event Map but are distributed among other clients of the collaboration session. Messages containing collaboration system operating information can be exchanged in, for example, an application layer including history events and ephemeral events among nodes within the collaboration system. Contents of the messages are sometimes referred to as metadata.

In the collaborative environment, it can be beneficial to see what others are working on within the environment, and to be able to see what others have created, as the creator intended their creation to viewed. The technology disclosed allows a first network node to select a viewport marker that represents a viewport including a location and dimensions as created by a second network node without any significant increase in network utilization. This can be accomplished by exchanging messages, which are configured according to the API, carrying simple text event records that can include JSON data structures or the like, rather than sending images between network nodes. The first network node receives descriptions of events from all other participating network nodes within a virtual workspace, and stores at least some of them in a local log. The first network node also creates its own events, and stores at least some of them in the local log. The first network node has a viewport into the virtual workspace that can include any number of graphical targets defined by the events. The first network node can render the objects described by the event records that have coordinates within its viewport, ignoring the event records describing events relating to graphical object located outside of its viewport.

Further, the first network node can select a viewport created by the second network node, so that the first network node can render each of the objects included in the area designated by the viewport created by the second network node. This way, the first network node will render each of the objects as intended by the second network node. This allows the first network node to be able to render the "full picture" with all of the associated objects at the same time, without missing any objects or information designated by the second network node.

In one example, an operator of the first network node might be interested in all of the events or objects within a viewport created by the second network node. The first network node can extract event information from the local log that identifies a viewport marker representing the viewport created by the second network node. A graphical menu can be rendered to allow the user to select from one or more previously created viewport markers. The first network node can then select the viewport marker from the menu and obtain information from the local log or from a log stored on a server that allows them to update their local viewport to match the viewport created by the second network node along with all of the graphical targets within the viewport. The first network node can render those graphical targets included in the viewport on a local screen space.

Descriptions of the Figures

Figure 1B:
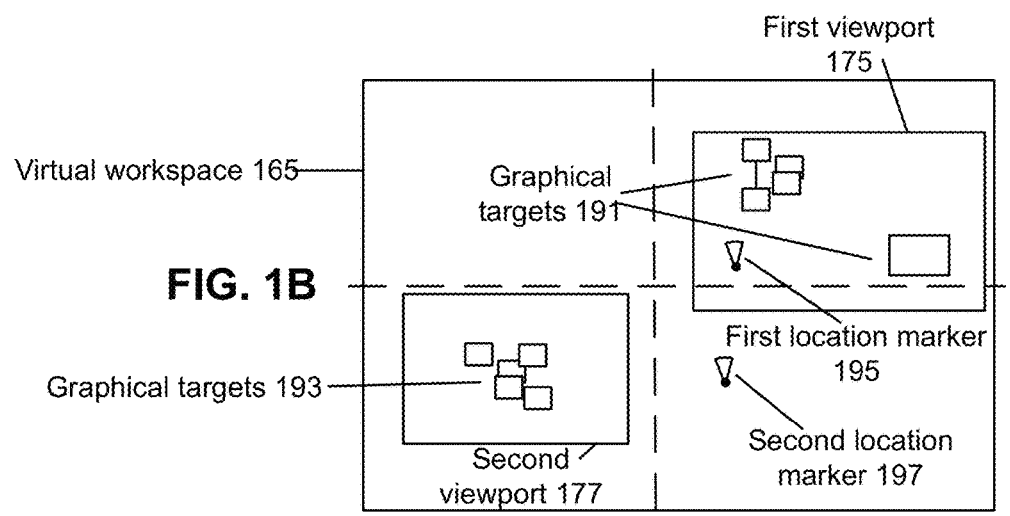
Figure 1C:
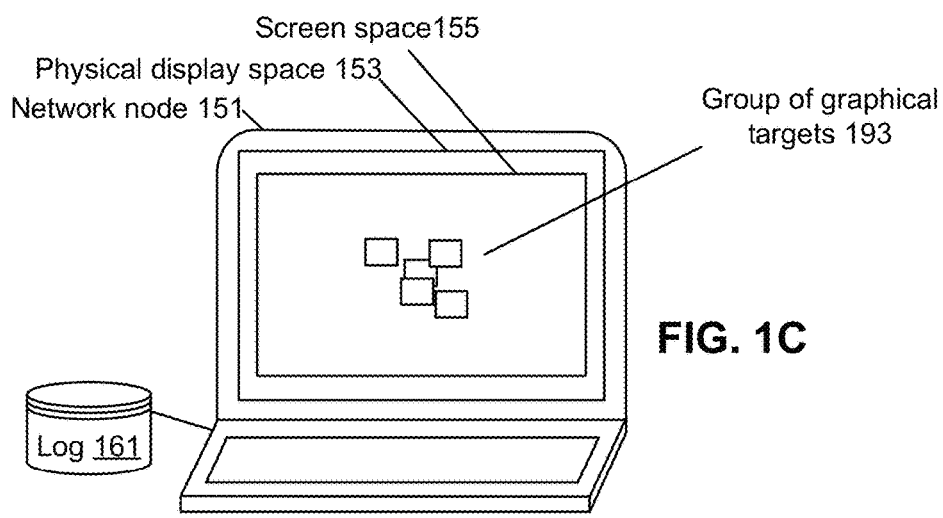

An environment is illustrated by FIGS. 1A-1C, describing a virtual workspace with graphical targets, viewports, and screen spaces. FIG. 1A illustrates a first network node (e.g., a client-side network node) 101 with a physical display space 103 that includes a screen space 105 allocated for use in the collaboration session. As illustrated, the screen space 105 can be coextensive with the physical display space 103 at the first network node, or can consist of an allocated portion, like a window, in the physical display space. The physical display space has a resolution in terms of a number of pixels and an aspect ratio set by the local network node that is independent of the workspace. The resolution in the workspace is based on the coordinate system used, and can include an essentially unbounded number of virtual points that can identify locations in the virtual workspace. In one example, the screen space 105 includes the entire displayable area of, and has the same resolution as, the physical display space 103. In another example, the screen space can be smaller than the physical display space.

In the illustrated example, the network node can include touch sensors on the screen space 105 that can perform as a user input device. The collaboration system client on the network node can access a local log file 111 that can store event records defining a Spatial Event Map or other type of data structure representing contents of a currently used workspace. In this example, a set of graphical targets 191, and a first location marker 195 are displayed in the screen space 105. The screen space 105 provides a view of a certain area of the virtual workspace, as a viewport or a local client viewport.

FIG. 1B illustrates a virtual workspace 165, a first viewport 175, and a second viewport 177 that have locations and dimensions in the workspace. A plurality of graphical targets 191 and a first location marker 195, have locations within the first viewport 175. Graphical targets 193 have locations within the second viewport 177. A second location marker 197 has a location within the virtual workspace 165 outside the boundaries of both the first viewport 175 and the second viewport 177. Second viewport 177 can be a viewport created by the first network node 101, so as to have a certain area defined by a location and dimensions within the virtual workspace 165. The virtual workspace 165 has locations identified by coordinates relative to a reference point, such as a center point, and so the virtual workspace 165 can be unbounded. In a system of Cartesian coordinates, the center point of the virtual workspace 165 lies at coordinate (0,0). Every graphical object, which is the graphical target of an event in the collaboration session, can be defined by, or specified to have, an area within the virtual workspace, such as a rectangle having an upper left x,y coordinate and a lower right x,y coordinate. The x,y coordinates of the rectangle can be defined with respect to the center coordinate (0,0) of the virtual workspace 165.

Likewise, the first viewport 175 and the second viewport 177 can be defined by corresponding areas within the virtual workspace defined by the coordinate system chosen. Thus, in this example, the first viewport 175 might have for example an upper left coordinate of (−1000, +600) and a lower right coordinate of (+250, −150) assuming that the center of the virtual workspace 165 lies at the center of the rectangle shown. This provides an area of 1250×750 virtual pixels having a 5×3 aspect ratio.

FIG. 1C shows a second network node (e.g., a client-side network node) 151 with a physical display space 153 and a screen space 155. In the illustrated example, the second network node 151 can include touch sensors that can perform as a user input device. The second network node 151 can have access to a local log file 161 that can store event records defining a Spatial Event Map or other type of data structure representing contents of a virtual workspace, such as the same workspace 165 currently in use at the first network node. In this example, the local client viewport of the second network node is second viewport 177, and maps to the screen space 155. As mentioned above, second viewport 177 can be created by the first network node 101 to include an area that includes graphical targets 193. In this implementation, the second network node 151 can select a viewport marker (not illustrated) that represents second viewport 177 created by the first network node 101. As a result of the second network node 151 selecting the viewport marker representing second viewport 177, and as a result of the second viewport 177 being mapped to the screen space 155, the set of graphical targets 193 is displayed in the screen space 155.

A network node can generate an event to record the creation of a graphical target such as a text box, a location marker, a viewport marker, a web page, or a viewport within a virtual workspace. The event including the creation of the viewport marker or the viewport can include the location and dimension of the viewport and one or more graphical targets within the virtual workspace, a time of the event, as well as various other attributes of the viewport and the graphical targets within the viewport. The network node can then communicate the event to other network nodes participating in the workspace. Each participating network node can store the event in its local log 111, 161. In this example, an event exists in the local log 111, 161 for each of the events creating or modifying or moving the graphical targets 191, 193, the location markers 195, 197, and the viewports 175, 177 within the virtual workspace 165. The graphical targets of the events can be rendered on the screen space 105, 155 by a processor with logic to render the graphical targets.

The processor includes logic to render graphical targets having locations in a viewport to the screen space, and to render only those graphical targets, or portions of graphical targets, that are within the boundaries of the viewport, using a zoom level that is a function of the local screen space resolution and the dimensions of the local client viewport.

A screen space can have a fixed aspect ratio, and fixed resolution in terms of pixels per line, and lines per screen. This aspect ratio and resolution can be used to compute the mapping of the viewport to the screen space. For example, a starting viewport in the workspace can include an array of 1000 points by 1000 lines. The screen space can have the same resolution of 1000 by 1000. However, if a user executes a zoom out operation, the screen space resolution remains the same, but the workspace resolution increases to, for example, 2000 points by 2000 lines. In this case, the graphical targets of the events in the larger viewport are scaled to fit within the smaller number of pixels in the screen space as a function of the zoom factor. Likewise, if the user executes a zoom in operation, the screen space resolution remains the same, but the workspace resolution decrease to, for example, 500 points by 500 lines. In this case, the graphical targets of the events in the smaller viewport are scaled to fit within the larger number of pixels in the screen space. A viewport can be specified by a location in the workspace, an aspect ratio of the client screen space, and a zoom level, or ratio of resolution of the viewport compared to that of the screen space.

This allows various devices such as mobile devices, computers, and walls to display respective viewports at a common zoom level and at aspect ratios that match the respective screen spaces. The technology disclosed allows clients to specify viewports independently, so that two viewports may overlap. In one example, a first user modifies a viewport so that it includes an area already included in the viewport of a second user. In this example, the viewports are independent of each other, and one viewport can be modified without affecting the other. In another example, a first user selects a viewport (by way of selecting a viewport marker) created by a second user, whereby the local viewport of the first user is set to match the selected viewport and the viewport attributes and/or specifications created by the second user. In this case, even if the screen space of the first user has a different aspect ratio and resolution than the second user, the screen space of the first user will still display the same graphical targets so as to essentially replicate the viewport as intended by the second user. This matching is performed by adjusting dimensions and aspect ratios of the graphical targets and/or the entire viewport, as created by the second user, so that the first user views all of the graphical targets of the viewport as intended by the second user.

Figure 2:
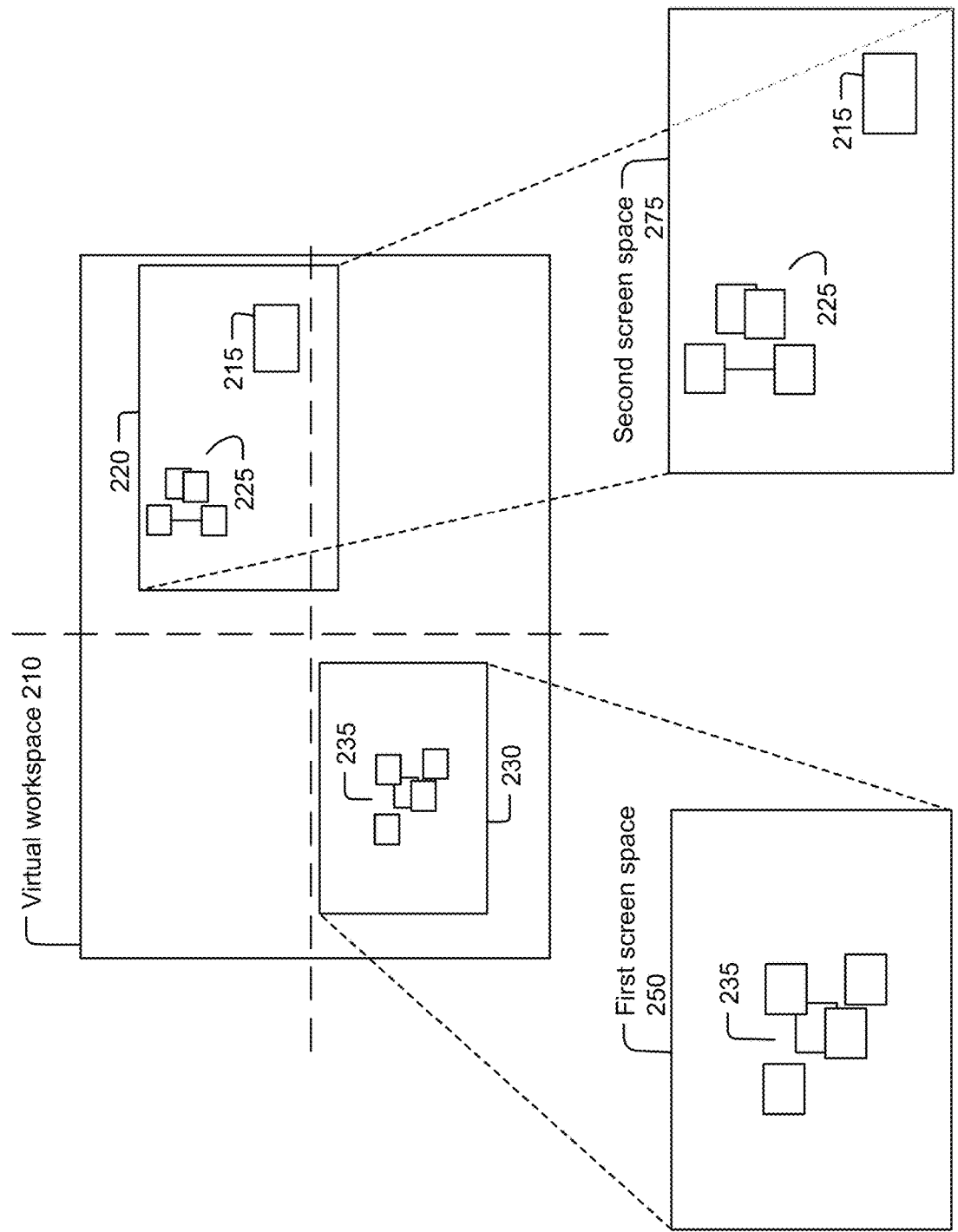
FIG. 2 illustrates one implementation of two network nodes having viewports in distinct areas of an unbounded virtual workspace.
Figure 3:
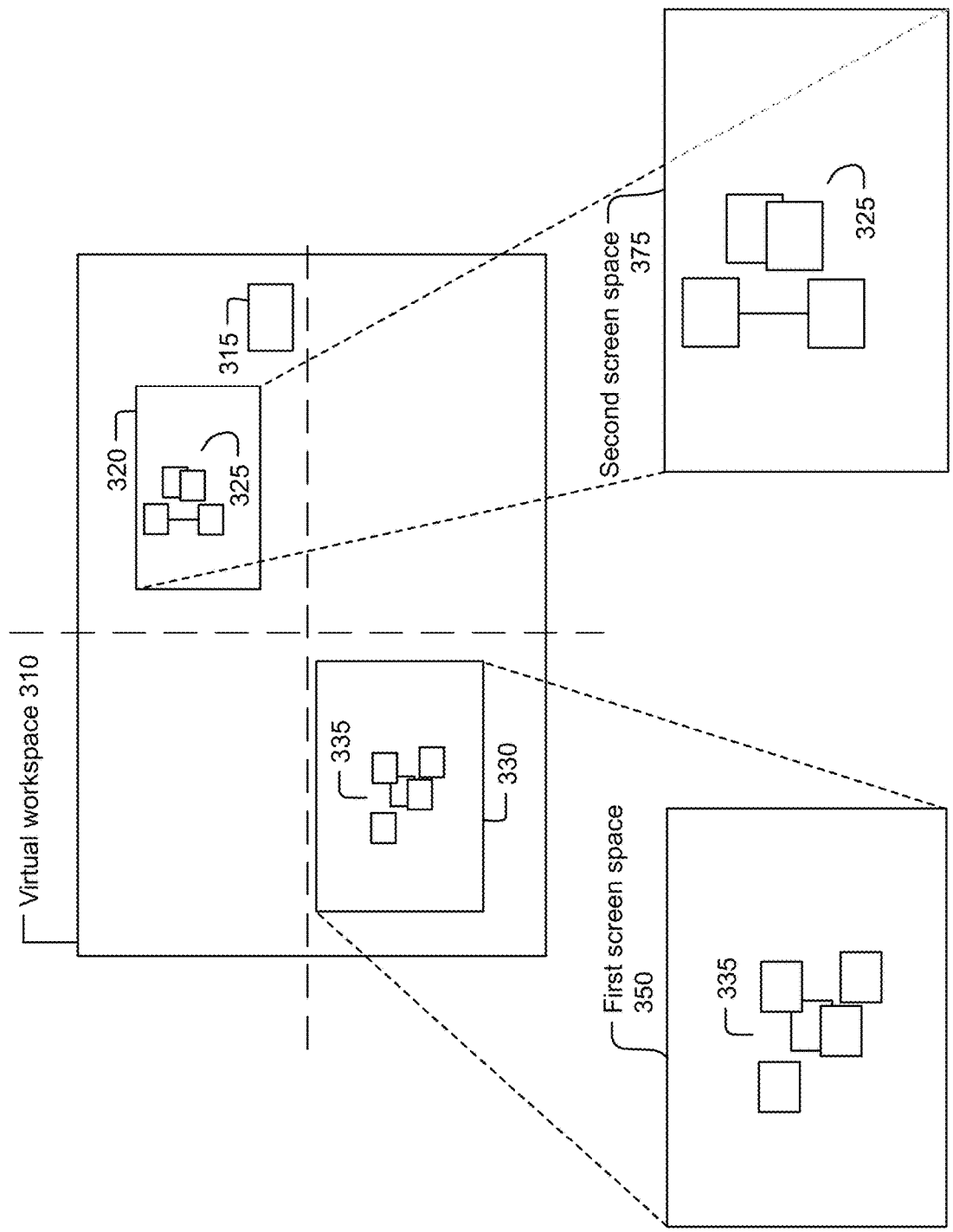
FIG. 3 illustrates how a viewport of one network node can be changed without affecting the viewports of other network nodes.
Figure 4:
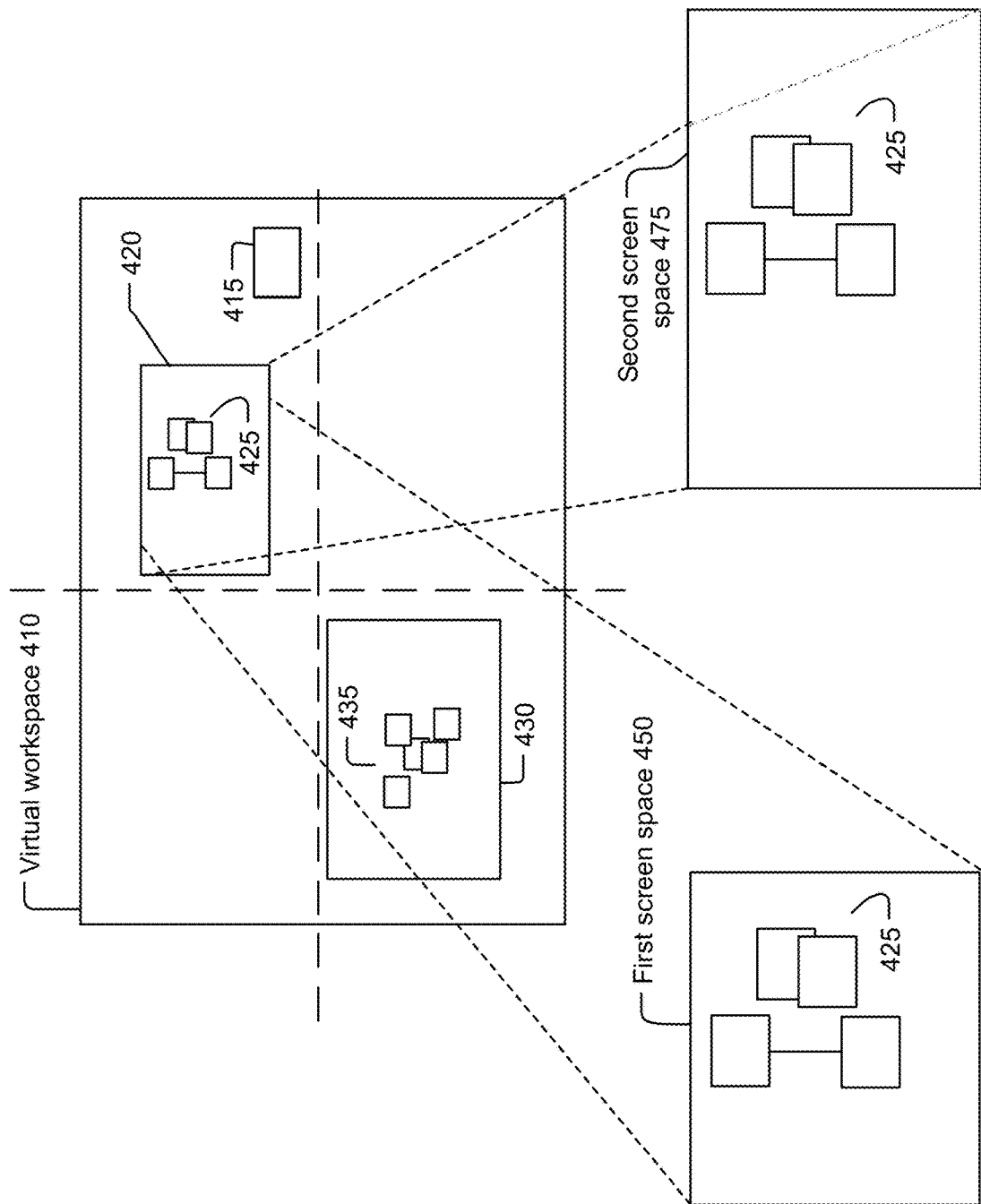
FIG. 4 illustrates a first network node selecting a viewport created by a second network node.

FIGS. 2, 3, and 4 illustrate a high level process of a first network node selecting a viewport created at a second network node.

FIG. 2 illustrates one implementation of two network nodes having viewports in distinct areas of a virtual workspace. FIG. 2 illustrates a virtual workspace 210 comprising a first viewport 230 and a second viewport 220. A set of graphical targets 235 having locations in the first viewport 230, and a set of graphical targets 225 and a particular graphical target 215 having locations within the second viewport 220 are shown. FIG. 2 also illustrates schematically a first screen space 250 at a first network node and a second screen space 275 at a second network node. In this illustration, the first viewport 230 containing the set of graphical targets 235 is mapped to the first screen space 250, and the set of graphical targets 235 are rendered on it. The first viewport 230 can be referred to as the initial local client viewport of the first network node. The second screen space 275 has the graphical targets (225 and 215) in second viewport 220 rendered on it. Each viewport contains a different set of graphical targets. In another example, some or all of the graphical targets can exist outside of the viewports.

FIG. 3 illustrates how a viewport of one network node can be changed without affecting the viewports of other network nodes. FIG. 3 illustrates how a second network node changes the dimensions in the workspace of second viewport 320 without affecting the first viewport 330 of a first network node. In this example, FIG. 3 is based on FIG. 2. FIG. 3 illustrates a virtual workspace 310 comprising a first viewport 330 and a second viewport 320. The first viewport 330 envelops a set of graphical targets 335. The second viewport envelops a set of graphical targets 325. A graphical target 315 exists within the virtual workspace 310 outside of the area enveloped by the first viewport 330 or the second viewport 320. FIG. 3 also illustrates a first screen space 350 and a second screen space 375. The first screen space 350 has the first viewport 330 containing the set of graphical targets 335 rendered on it. The second screen space 375 has the second viewport 320 containing the set of graphical targets 325 rendered on it. The graphical target 315 within the virtual workspace 310 exists outside of either of the viewports 330, 320, and is not rendered on either the first screen space 350 or the second screen space 375.

Figure 7A:
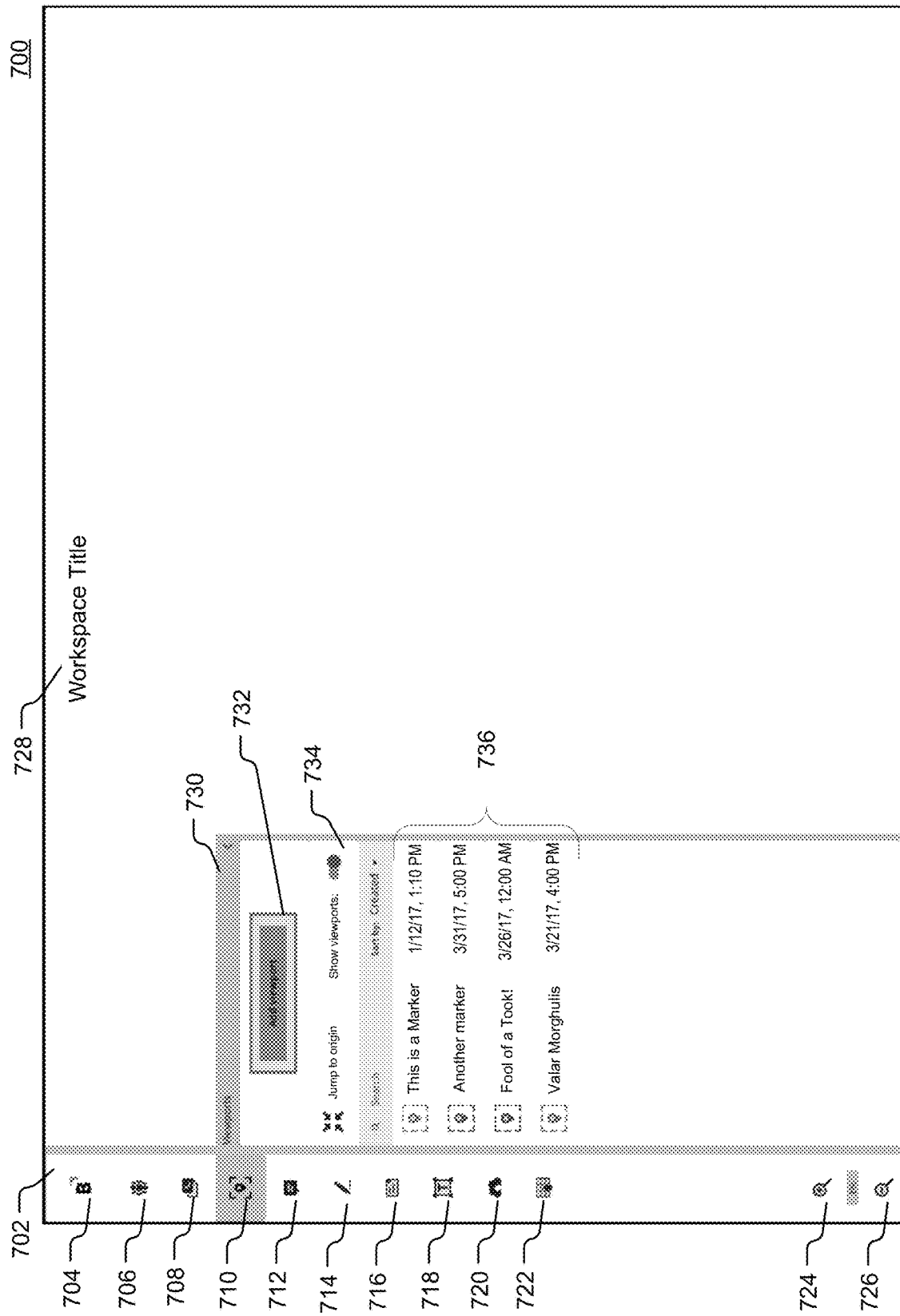
FIGS. 7A, 7B, and 7C (collectively FIG. 7) illustrate a creation of a viewport and a viewport marker using a graphical user interface.

A difference between FIG. 2 and FIG. 3 is that a size of the second viewport 320 has been changed in FIG. 3 to exclude the graphical target 315. The size of the viewport can be changed by changing the zoom level of the viewport by using, for example, a variety of input devices and gestures, including, for example, a zoom wheel on a mouse, or combinations of keys pressed on a keyboard. A viewport can also be changed by a touch screen or mouse gesture that includes "grabbing" a location on the screen space with a mouse or other pointer, and then moving the mouse. In this implementation illustrated in FIG. 3, the first node can essentially save the second viewport 320 and create a viewport marker that represents the second viewport 320. In other examples, the size of the second viewport 320 could remain the same but the location of the second viewport 320 could change, such that the graphical target 315 is not included (e.g., the second viewport 320 could move to the left but remain the same size, and the graphical target 315 would no longer be located in the second viewport 320). The second viewport 320 can be moved in a similar manner as described above regarding the zooming. The viewport marker is not illustrated in FIG. 3, but is illustrated in FIG. 7A.

A display is a device comprised of an array of pixels. Complex displays, such as walls, comprise multiple displays in a rectangular array, and have consecutive pixels in the X and Y coordinates managed by a controller. In one implementation, a display can have multiple windows, each window comprising a separate screen space.

For example, a workspace can have a set of objects laid out between coordinates x0=−10000, y0=4500 and x1=5200, y1=−1400, in abstract units. If a client wants to see that set of objects, then it defines a viewport with those coordinates, and then renders that viewport within its screen space, mapping the abstract units of the workspace to the physical units of displayable pixels. If the client wants to see more of the workspace, they can zoom out so that more distributed x0, y0, x1, y1 coordinates of the viewport map are viewable on the available space in the screen space. If they want to see a smaller area of the workspace, they zoom in to whatever x0', y0', x1', y1' coordinates they want, and those coordinates are mapped to the screen space of the client. In other words, the dimensions of the viewport are changed by changing the zoom level of the viewport, which allows more or less of the workspace to be viewed within the screen space. In rendering the viewport to the screen space, scaling of the contents of the viewport can be accomplished through standard graphical scaling techniques.

FIG. 4 illustrates what happens when a first network node selects the viewport created by a second network node. As discussed in further detail below, the viewport is selected by the first network node when the first network node selects a viewport marker from a menu that represents the viewport created by the second network node. FIG. 4 illustrates a virtual workspace 410 comprising a first viewport 430, and a second viewport 420. FIG. 4A also illustrates a first screen space 450 and a second screen space 475. A graphical target 415 exists within the virtual workspace 410 and outside of the area enveloped by the first viewport 430 or the second viewport 420. The graphical target 415 within the virtual workspace 410 exists outside of either of the viewports 430, 420, and is not rendered on either the first screen space 450 or the second screen space 475.

The first viewport 430 specifies an area in the virtual workspace 410 that envelops a set of graphical targets 435. In this implementation, the first viewport 430 is not mapped on screen spaces 450 and 475, and corresponds, for example, to another local client viewport. The second viewport 420 specifies an area in the virtual workspace 410 that envelops a set of graphical targets 425. The second viewport 420 has been created by the second network node and has been associated with a viewport marker (not illustrated). When the first network node selects, from a menu, the viewport marker representing the second viewport 420, the second viewport 420 is mapped to first screen space 450 by the local client that operates first screen space 450. Even though the physical display of the first network node is a different size and/or aspect ratio than the physical display of the second network node, the first screen space 450 of the first network node will display all of the graphical targets 425 of the second viewport 420, as intended by the second network node, which created the second viewport 420 to include all of the graphical targets 425.

As mentioned above, even though the first screen space 450 has a first aspect ratio and size and the second screen space 475, on which the second viewport 420 was created, has a second aspect ratio and size (width or height or both width and height) that is different from the first aspect ratio and size (width or height or both width and height), the first screen space 450 still displays all of the graphical targets 425 on the screen at the same time. This is possible because dimensions of the second viewport 420 and the graphical targets 425 are adjusted and rendered so that they are properly displayed in the first screen space 450. This can be achieved by proportionally scaling the one or more graphical targets 425 so that they all are rendered and displayed on the first screen space 450. Alternatively, this can be achieved by rearranging one or more of the graphical targets 425 with or without the scaling.

Figure 5:
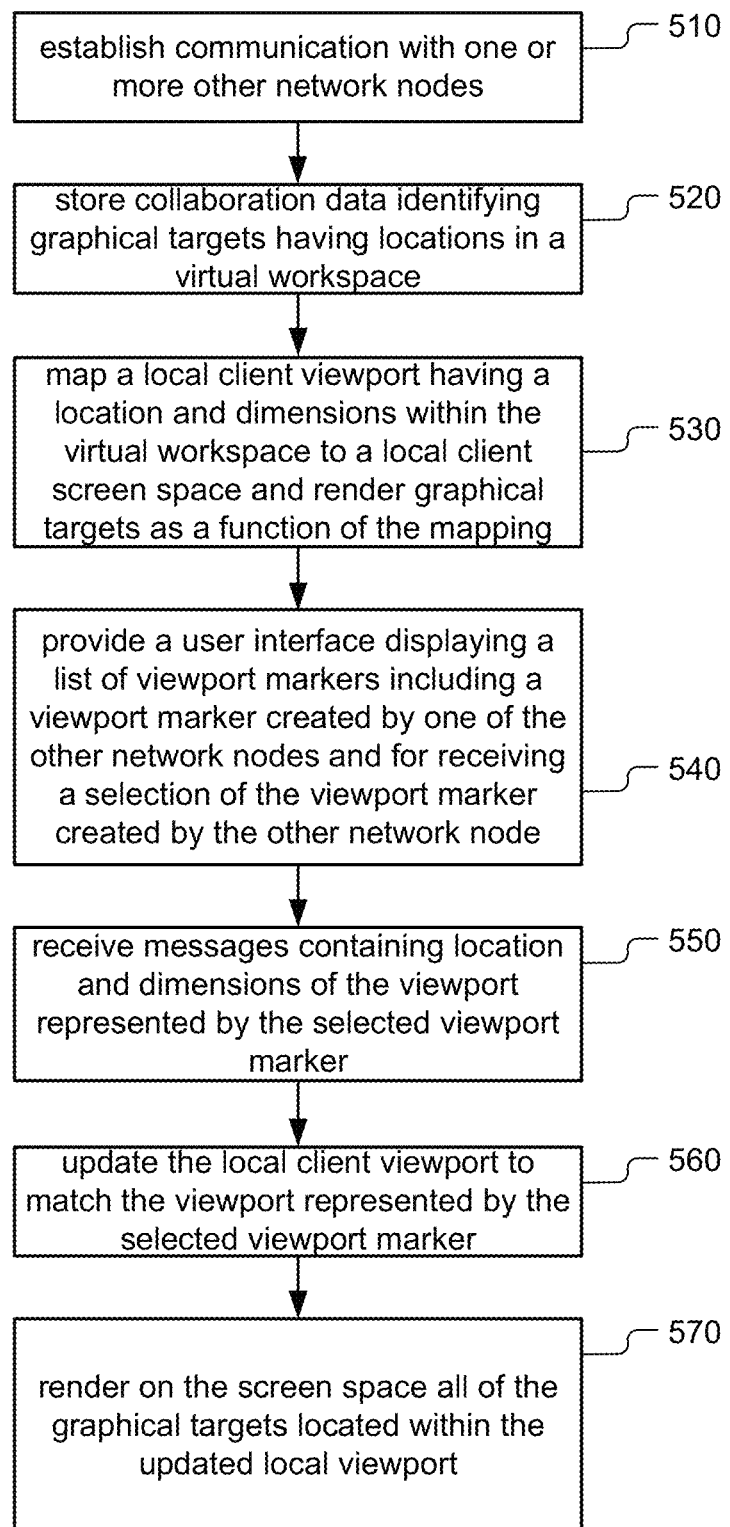
FIG. 5 is a flowchart that illustrates one implementation of a first network node selecting and rendering a viewport created by a second network node.

FIG. 5 is a flowchart that illustrates one implementation of logic executed at a first network node to produce a local viewport that matches the viewport including all of the graphical targets contained within, as created by a second network node. The technology disclosed allows a plurality of subject users to access and render a viewport created by a single target client-side network node within a workspace.

FIG. 5 is a simplified flow diagram of a process for interpreting user input executed by a client-side network node. The order illustrated in the simplified flow diagram is provided for the purposes of illustration, and can be modified as suits a particular implementation. Many of the steps, for example, can be executed in parallel. In this implementation, historic and ephemeral events that occur within the workspace are received by some or all of the users within the workspace. It is to be noted that a server implementing the collaboration system can include logic for determining how much (e.g., some or all) of the historic and ephemeral events are sent to the other users. As described below, these historic and ephemeral events can be sent in the form of a Spatial Event Map. Some or all of the Spatial Event Map can be transmitted to other users. The determination of what portions of the Spatial Event Map are to be sent can depend on the size of the Spatial Event Map, the bandwidth between the server and the clients, the usage history of the clients, the number of clients, as well as any other factors that could contribute to providing a balance of latency and usability. In one implementation, all users in the workspace will receive all historic and ephemeral events that occur within that workspace (e.g., the entire Spatial Event Map). In another implementation, only the historic and ephemeral events that occur in specific viewports of the clients will be transmitted to the clients. The workspace can be, in essence, limitless, while a viewport for a client has a specific location and dimensions in the workspace. A plurality of clients can be collaborating within the workspace with overlapping viewports. The clients can receive and log the events relating to the objects that have coordinates outside of their viewport.

In this example, a first network node establishes (direct and/or indirect) communication with one or more other network nodes 510 that are participating in a collaborative workspace. This can include logging in to a session at a server, and communication through the server to the other network nodes, or other communication pathways.

For initialization, the first network node receives collaboration data, such as a Spatial Event Map in the form of a log of the historic events that have occurred within the workspace, or other data structure that identifies the location of graphical objects in the workspace. The first network node also receives, for example, as a part of the log of historic events or otherwise, a list of network nodes participating in the session. The first network node can store the collaboration data identifying graphical targets having locations in a virtual workspace used in the workspace session, the collaboration data including locations in a virtual workspace of respective graphical targets 520. As part of this initialization, the first network node can instantiate an initial "vc" (Viewport Change) record, and communicate this record to other participant clients in the workspace. The initial "vc" record can be retrieved from the log from a previous session. The initial "vc" record can also be a default "vc" record within the workspace, or can be instantiated by some other method such as logic to identify the most used area of the workspace. The first network node maps the local client viewport having a location and dimensions within the virtual workspace to a local client screen space and renders graphical targets having locations in the local client viewport to the local screen space as a function of the mapping 530. In order to select the viewport marker representing the viewport created by another network node, a first subject user associated with the first network node is provided a user interface displaying a list of viewport markers including a viewport marker that represents the viewport created by a second user of another network node 540. The first subject user can then select a viewport marker from the list of viewport markers. The list of viewport markers can also be associated with different users, such that the first subject user can open a list of users that provides a display of viewport markers created by each of the users on the list. The first network node creates a viewport change "vc" record, and (via the server) communicates the record to the participating network nodes of the workspace, which can include the network node of the selected user.

The first network node receives messages containing a location and dimensions in the workspace of the viewport represented by the selected viewport marker 550. The first network node updates its local client viewport to match the location and dimensions, in the virtual workspace, of the viewport represented by the selected viewport marker 560.

The first network node can then render, on the local client screen space, one or more graphical targets located within the updated local client viewport 570. The rendered one or more graphical targets have locations and dimensions within the updated local client viewport that are matched to the locations and dimensions of the one or more targets within the viewport represented by the selected viewport marker.

The technology disclosed can render the contents of the viewport created by the other user onto the local client screen space accounting for possible differences in attributes such as aspect ratio, height, and width of the local screen space. Changes to the virtual workspace, such as the addition, deletion, or modification of graphical targets within the viewport created by the other user are also rendered on the screen space of the first network node.

A third user can also select the same viewport marker as the first user. Even if the local client screen space of the third user is different from that of the first user and the second user that created the viewport, the third user will render the viewport, such that all of the graphical targets within the viewport are presented on their physical screen at the same time.

Figure 6:
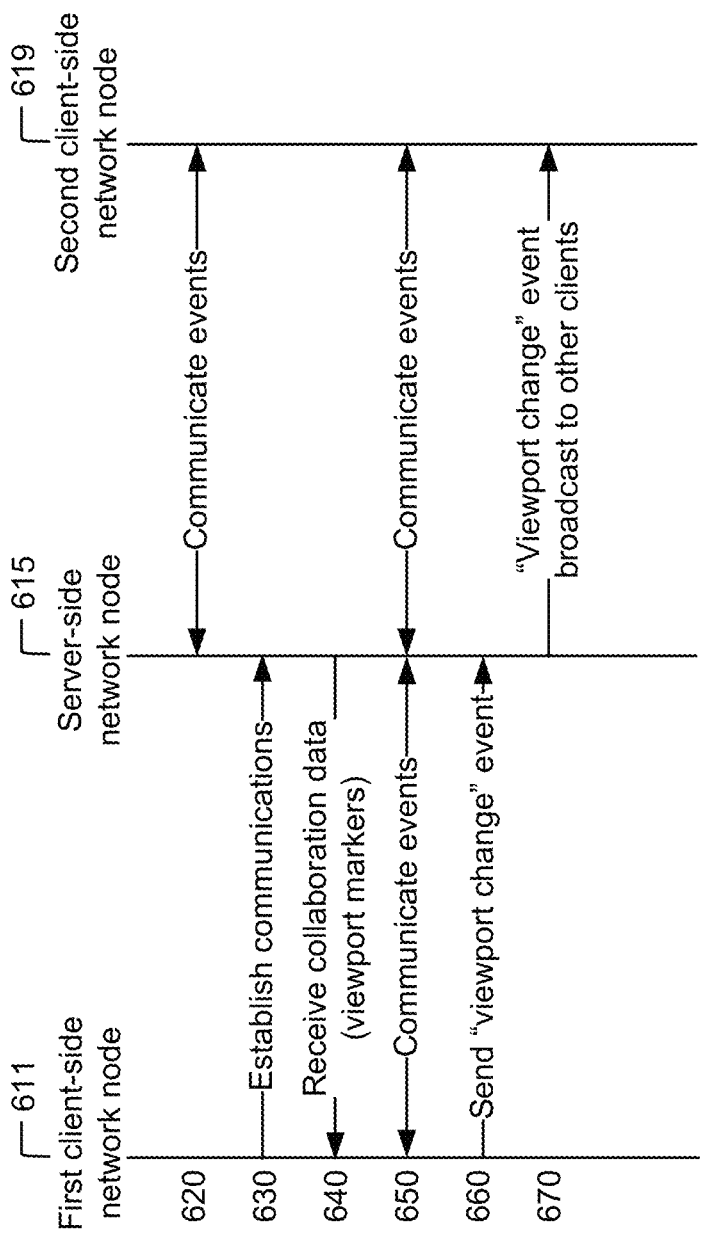
FIG. 6 illustrates a message map between a first client-side network node, a server-side network node, and a second client-side network node for the first client-side network node to select and open a viewport created by the second client-side network node.

FIG. 6 illustrates a message map between a first client-side network node, a server-side network node, and a second client-side network node for the first client-side network node to select and open a viewport created by the second client-side network node.

Initially, in this implementation, a second client-side network node 619 is participating in a collaborative workspace. The second client-side network node 619 can create events that are shared with other network nodes through a Spatial Event Map on a server-side network node 615. The second client-side network node 619 can also receive events from other client-side network nodes through the server-side network node 615. The transmission of events occurs through a communication of events 620 between the second client-side network node 619 and the server-side network node 615, as well as between the server-side network node 615 and any other client-side network nodes that are participating in the collaborative workspace. The server-side network node 615 distributes the events to other participating network nodes in this example.

In this example, the first client-side network node 611 joins the collaborative workspace by establishing communications with the server-side network node 630. The server-side network node sends the collaboration data, including, but not limited to, a user list, viewport change records of the network nodes, and a Spatial Event Map identifying viewports and viewport markers representing the viewports, to the first client-side network node 640. The first client-side network node then stores the collaboration data to a local log. The first client-side network node 611 sets an initial (local client) viewport, as described in FIG. 5, then discovers the event records of graphical targets within the local log that intersect its initial viewport. The graphical targets that intersect the viewport are then rendered on the screen space.

The first client-side network node 611 and the second client-side network node 619 can both create, transmit, and receive events within the workspace, and can view events that have occurred within their viewports. Events can be communicated 650 to all participating network nodes through the server-side network node 615. The technology disclosed allows a first user to select and view/render a viewport created by a second user. In this example, a first client-side network node 611 can select, from a list of viewport markers its local log, a viewport marker that represents a viewport created by the second client-side network node 619. This selection of the viewport marker causes the first client-side network node 611 to create a viewport change "vc" record, which can be communicated to the second client-side network node 619 through the server-side network node 615 (messages 660 and 670).

Events are still communicated to all participating network nodes. However, the first client-side network node produces a local client viewport that matches the viewport represented by the selected viewport marker and created by the second client-side network node, and only displays those events (graphical targets) that intersect the updated local client viewport. Events (graphical targets) can be generated by the second client-side network node 619, or by a third client-side network node not shown in FIG. 6. However, in this example, the first client-side network node 611 does not generate events that change the displayable contents of the viewport represented by the selected viewport marker, but continues to receive events created by other network nodes, including events that could change attributes or contents contained within the viewport represented by the selected viewport marker 670.

Figure 7B:
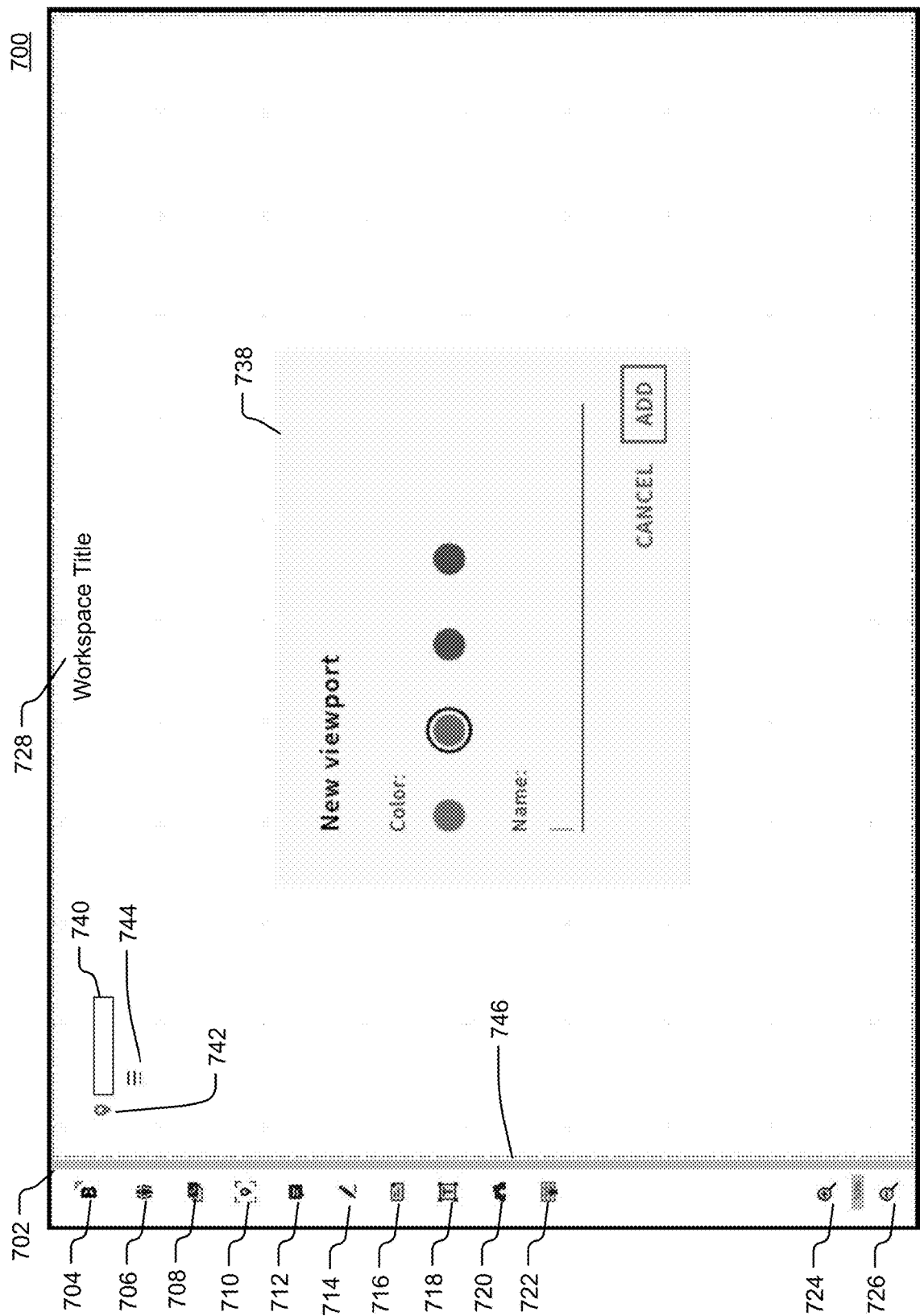
Figure 7C:
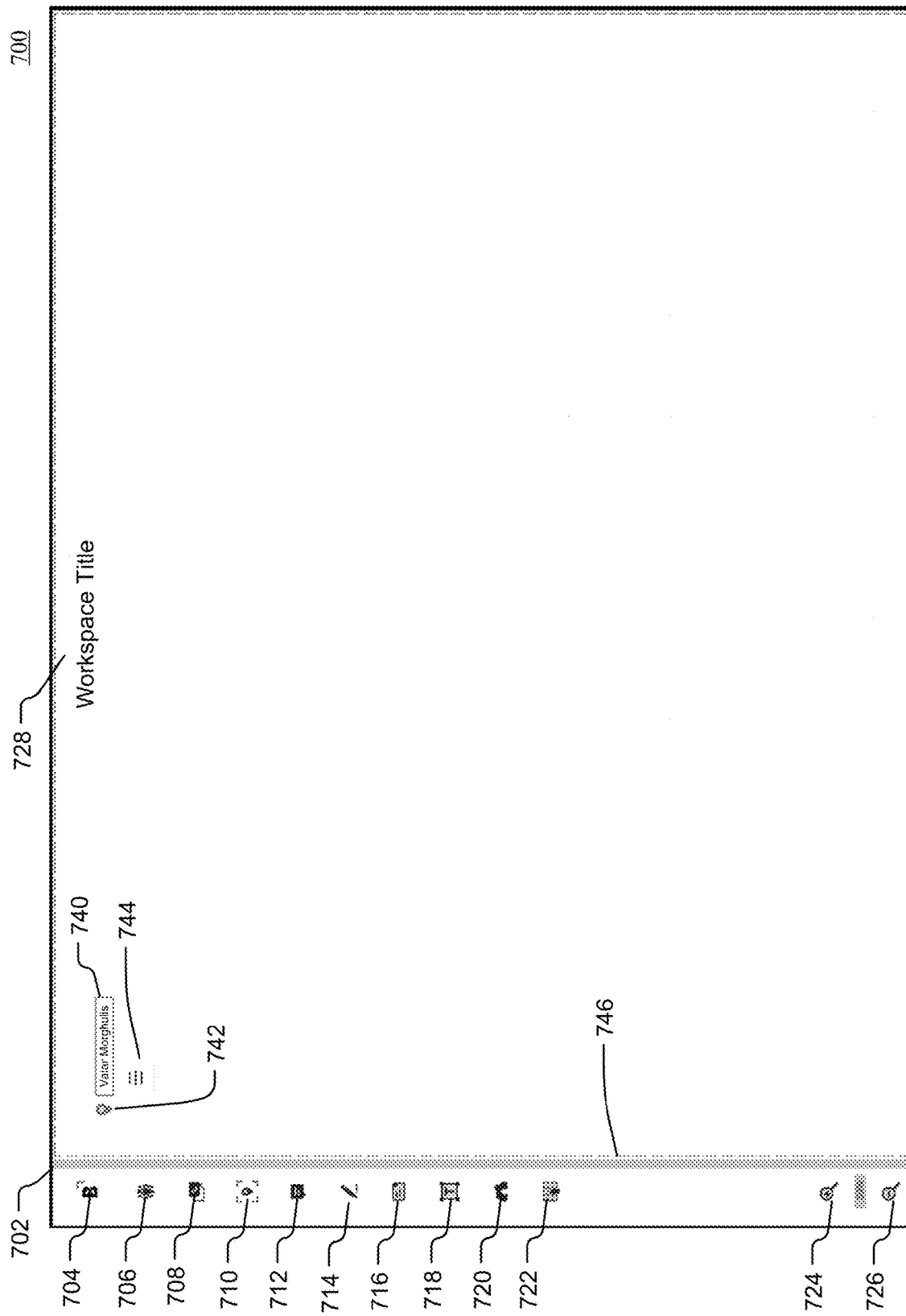

FIGS. 7A, 7B, and 7C illustrate the creation of a viewport and a viewport marker using a graphical user interface 700. An example implementation of the graphical user interface 700 provides a screen space view of a virtual workspace. The screen space view is, for example, a first screen space 250 of a first (client) user, as illustrated in FIG. 2. Specifically, FIG. 7A illustrates a menu bar 702 of the graphical user interface 700. The location of the menu bar 702 is only for exemplary purposes. The menu bar 702 can be located at any location within the graphical user interface 700 or it can be located in a window or some other graphical format that is separate from the graphical user interface 700.

The menu bar 702 may include several menu items such as a main portal item 704, a users item 706, a meet item 708, a viewport item 710, an activity item 712, a tools item 714, a notecard item 716, a text item 718, an upload item 720, a send to wall item 722, a zoom-in item 724 and a zoom-out item 726. The main portal item 704 allows the user to return to a main portal for selecting and/or creating other virtual workspaces. The users item 706, when selected, provides the user with a list of users who are currently viewing the virtual workspace and allows the user to invite other users. The meet item 708 allows the user to connect audio and/or video with other users. This enables video and/or audio conference type features. The viewport item 710 provides a viewport menu 730, which is described in more detail below. The activity item 712, when selected, identifies recent activities performed by various users of the virtual workspace. The tools item 714, when selected, provides various drawing tools with selectable colors and sizes, as well as erasing and selecting tools (e.g., a Marquee box selection tool).

The notecard item 716, when selected, allows the user to add a notecard to the virtual workspace. The notecard can, for example, have a range of colors and fonts and font sizes all selectable by the user. The user can type text into the notecard and place it anywhere in the virtual workspace. The text item 718 allows the user to create a text box that can have display text input by the user. The color of the text, as well as other properties, such as bold, underline, italicize, etc. can be selected by the user. The text box can also have a background color designated by the user. The upload item 720 allows the user to upload various types of items from various sources. For example, the upload item 720, when selected, can provide a list of cloud drives (e.g., Dropbox™), local drives, YouTube™, etc., from which the user can select and upload items into the virtual workspace. The send to wall item 722 can allow the user to send the entire virtual workspace or a portion thereof to a large display or a wall that is set up in, for example, a conference room. The large display or wall must be connected to the collaboration system and can be identified by a pin number or some other type of identifier. The zoom-in and zoom-out items 724 and 726 are used to change the zoom level of what is displayed on the physical display of the user. Each of the items discussed above that can be added to the virtual workspace (e.g., text box, notecard, etc.) can be referred to as a graphical target. The graphical user interface 700 also provides a workspace title 728 of the virtual workspace.

The viewport menu 730 includes an add viewport item 732 that allows the user to create and save a viewport, a show viewports item 734 that allows the user to select whether or not they want to see other viewport markers that represent other viewports, and a list of viewport markers 736. The list of viewport markers 736 is rendered when the show viewports item 734 is turned on or selected.

FIG. 7B illustrates the same graphical user interface 700 as FIG. 7A, except that FIG. 7B shows an example of what happens when the user selects the add viewport item 732 of FIG. 7A. Specifically, once the user selects the add viewport item 732, a new viewport interface 738 appears, which allows the user to add a name for the new viewport, as well as select a color for the viewport marker that represents the newly added viewport. The location of the newly added viewport within the virtual workspace and the dimensions (area) of the newly added viewport, in this example, are based on what is presently rendered on the screen space of the user. Also, the graphical targets contained within the newly added viewport, in this example, will be the graphical targets presently rendered on the screen space of the user. In this implementation, there are no graphical targets rendered on the screen space, as illustrated in FIGS. 7A and 7B. Additional Figures discussed below provide examples of creating viewports that include graphical targets. According to the example implementation illustrated in FIGS. 7A and 7B, the newly created viewport will have its location and dimensions dictated by the portion of the workspace rendered in the screen space of the user, such that, whatever is presently rendered on the screen of the user (i.e., graphical targets, location, dimensions, etc.), excluding the menu items, will be rendered on the screen space of another user who opens the viewport created by the user. Note that, if the graphical targets that are located within the created viewport are manipulated by the user that created the viewport or by another user, then all users who subsequently open the created viewport will view the manipulated graphical targets. As an alternative to the newly created viewport essentially representing the screen space of the user, the user can (i) input numeric values representing the dimensions of the viewport they are creating, (ii) draw a square or rectangle to represent the location and dimensions of the viewport and/or (iii) select one or more graphical targets to form the location and dimensions of the viewport.

During the creation of the new viewport, a title box 740 may appear along with a marker icon 742 and a context menu icon 744. In this example, the title box 740 is blank. However, once the user inputs a name for the viewport, the name will appear in the title box 740. The color of the marker icon 742 and the background of the title box 740 can correspond with the color selected from the new viewport interface 738. The graphical user interface 700 may also provide a line 746 designating the area or boundaries of the newly created viewport.

Once the viewport is created, the name of the viewport (e.g., Valar Morghulis) will appear in the title box 740, as illustrated in FIG. 7C.

An example message sent from the client to the server for the creation of the viewport by the client is described below. This is a historical event "he," so a permanent record is created in the Spatial Event Map. In addition to the location and dimensions being stored in the record, the color selected by the creator of the viewport is included in the record.

```
[
    <client-id>,
    "he", // history event, permanent in nature
    <target-id>,
    "viewport",
    {
        "x": 1000,
        "y": 1200,
        "width": 250,
        "height": 250,
        "title":"Valar Morghulis",
        "color": 0
    }
]
```

As a result of the permanent record being created in the Spatial Event Map, a message is sent to all other clients connected to the virtual workspace, so that they have the ability to select and open the newly created viewport. As a result of receiving this message, the graphical user interface 700, for example, will add a new viewport marker to the list of viewport markers 736, such that the new viewport marker will be the color designated by the message (e.g., whichever color is designated as color "0") and the new viewport marker will also include the name of the new viewport (e.g., "Valar Morghulis") as well as the date and time of the creation of the new viewport. This message also allows the graphical user interface to render the newly created viewport in the virtual workspace when the client using the graphical user interface 700 manually navigates (e.g., pans) to the location in the virtual workspace in which the new viewport has been created. An example message, as sent from the server to all other clients connected to the virtual workspace, is as follows:

```
[
    <client-id>,
    "he",
    <session-id>,
    <event-id>,
    "create",
    {
        "type":"viewport",
        "id": <viewport-id>,
        "properties": {
            "creationTime": 1387565966,
            "x": 1000,
            "y": 1200,
            "width": 250,
            "height": 250,
            "title":"Valar Morghulis",
            "color": 0
        }
    }
]
```

The client running in the network node that creates the new viewport includes logic to send messages to the server to be distributed to other network nodes. These messages include information identifying events including creation or movement of the viewport. Also, the logic in the client running at the network node, and at other network nodes in the collaboration system, is responsive to receipt of a message carrying the viewport create events or other viewport edit events from another (second) network node to update the list of viewport markers 736.

FIGS. 8A-8D illustrate the creation of a viewport and a viewport marker by making a selection of one or more graphical targets using a graphical user interface 800. The graphical user interface 800 provides a screen space view of a virtual workspace. The screen space view is for example, a screen space 250 of a first (client) user, as illustrated in FIG. 2. Reference elements 702, 704, 706, 708, 710, 712, 714, 716, 718, 720, 722, 724, 726, 728 and 738 of FIGS. 8A-8D are identical to that which is illustrated in FIGS. 7A-7C. As such, redundant descriptions thereof are omitted.

Figure 8A:
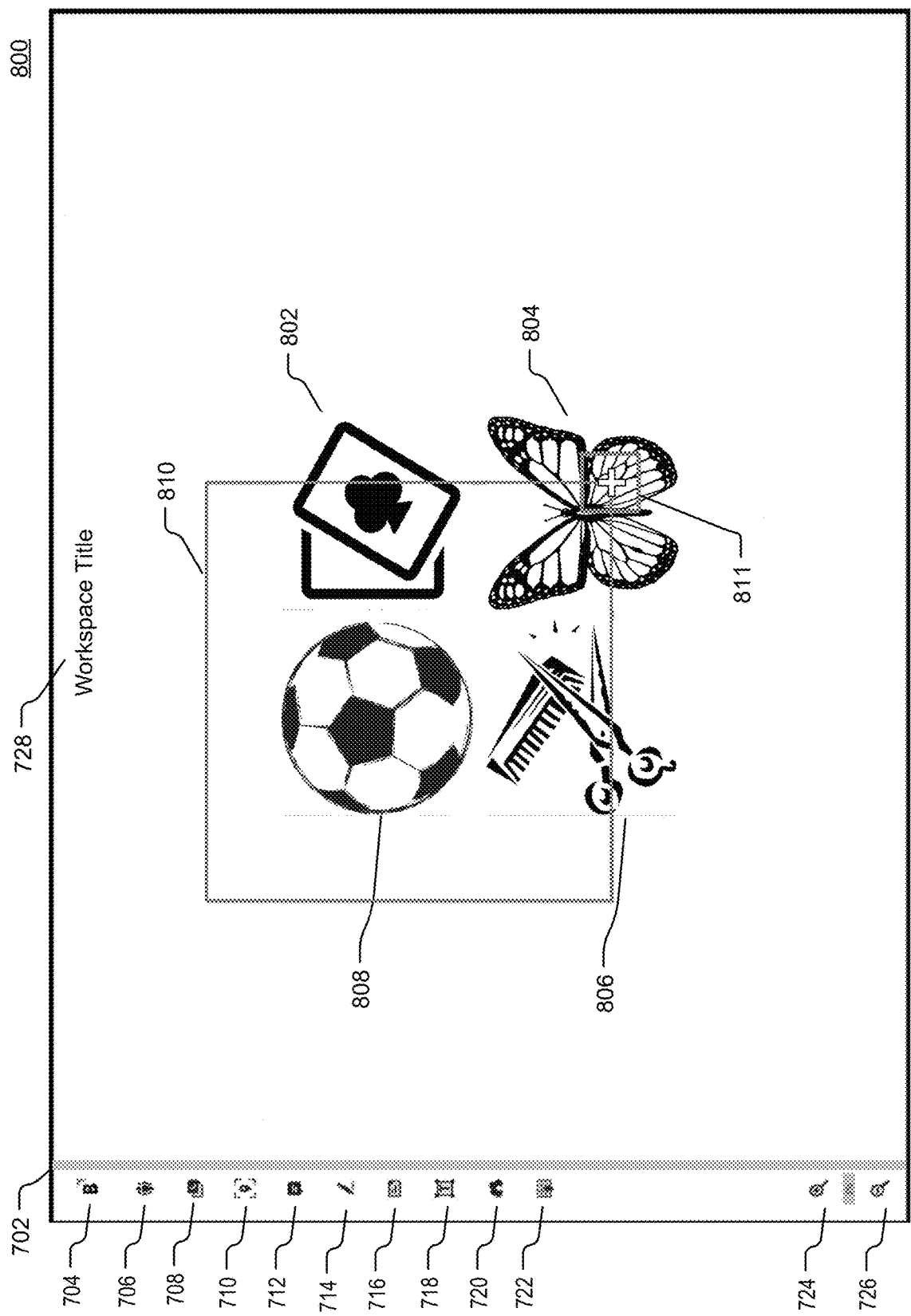
FIGS. 8A, 8B, 8C, and 8D (collectively FIG. 8) illustrate a creation of a viewport and a viewport marker by making a selection of one or more graphical targets using a graphical interface.
Figure 8B:
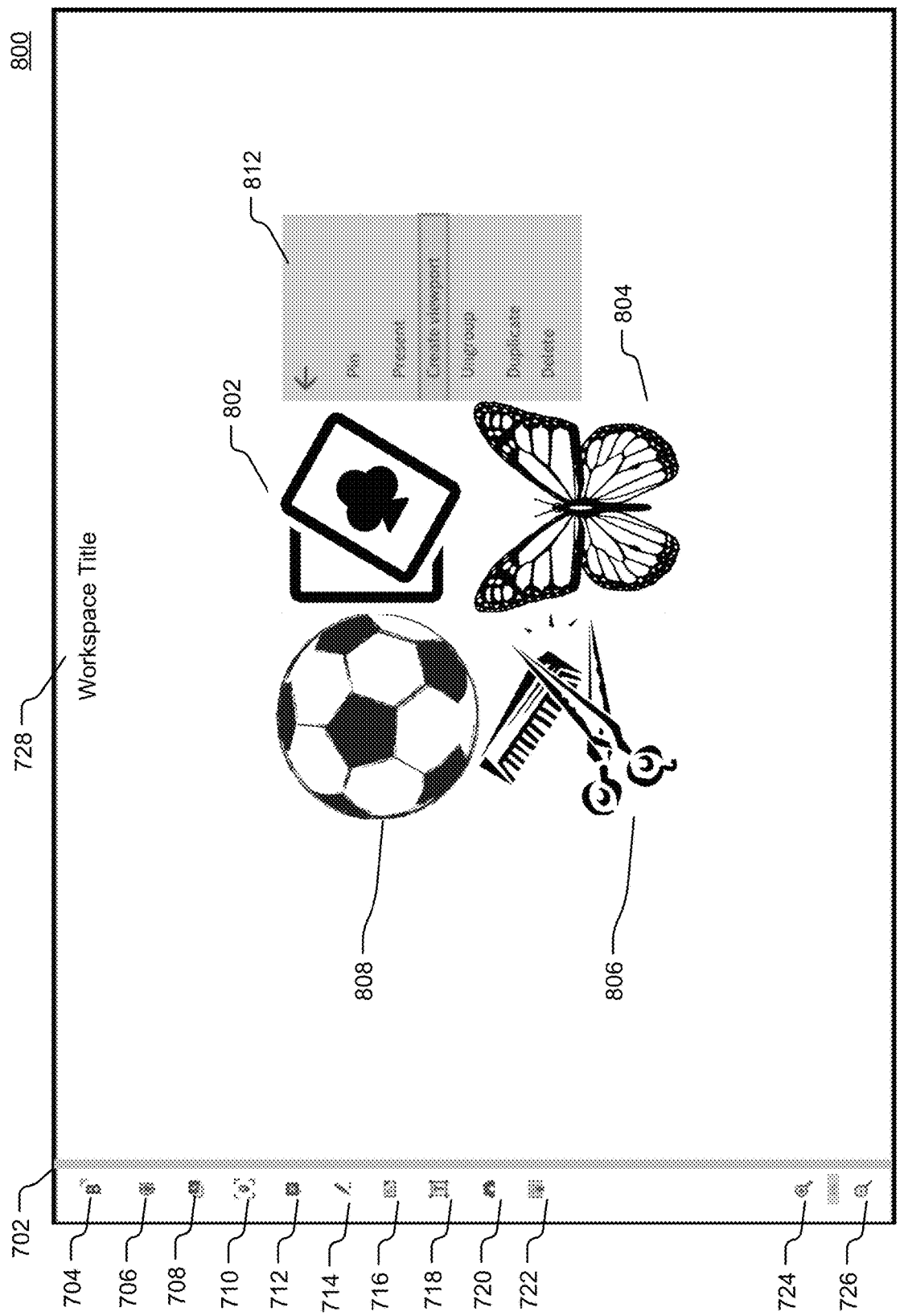
Figure 8C:
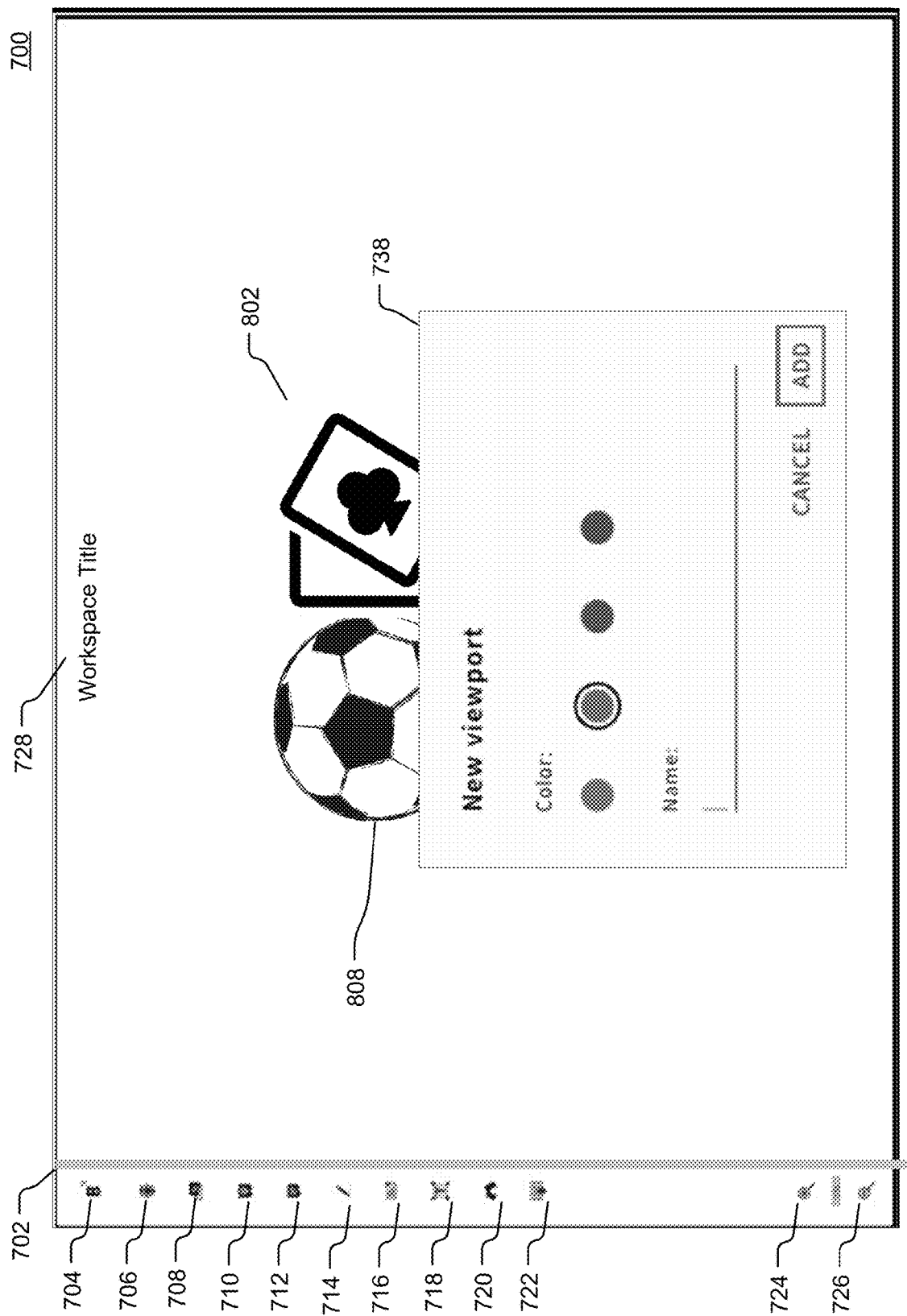
Figure 8D:
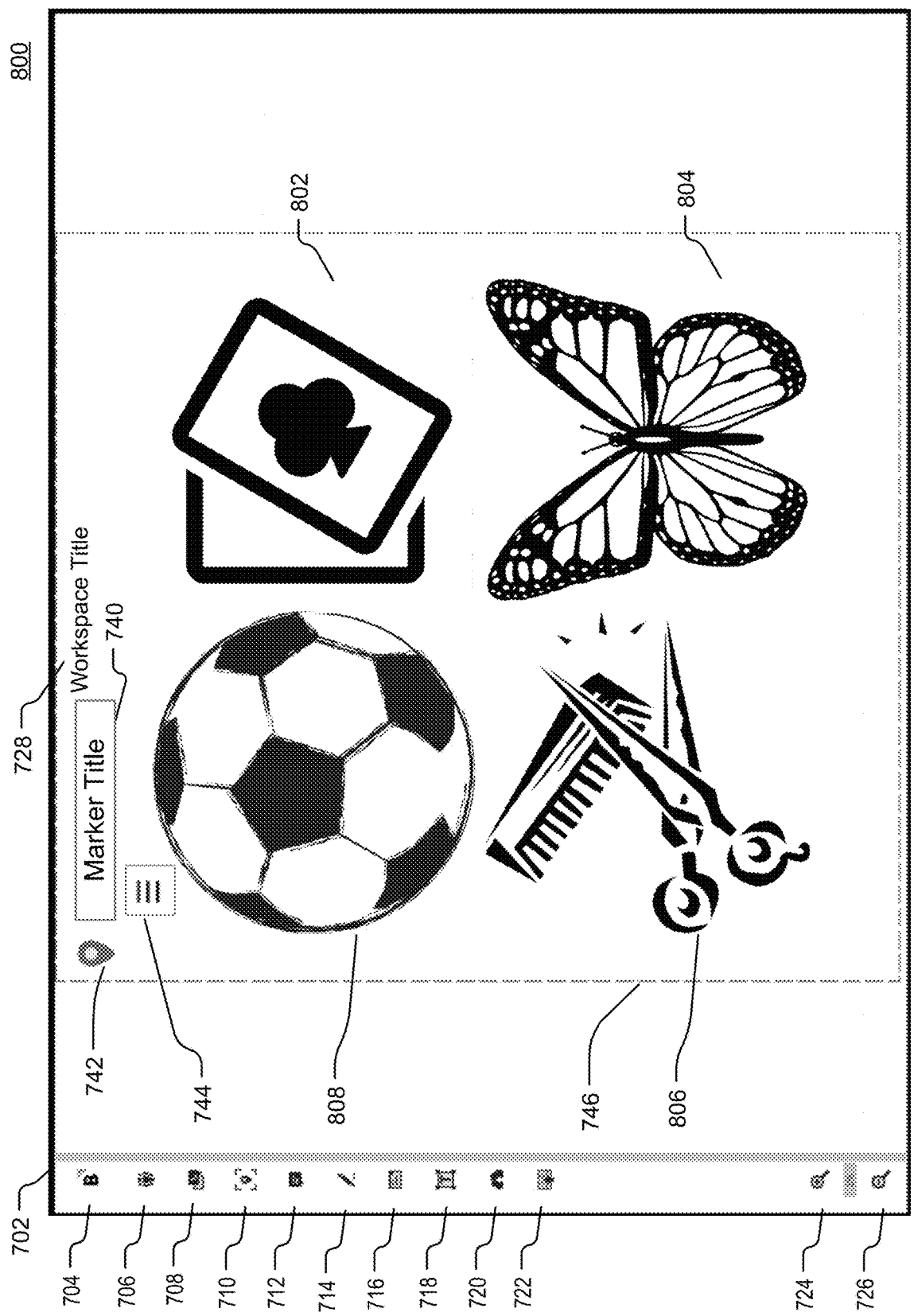

FIG. 8A illustrates a user making a selection of a group of graphical targets 802, 804, 806, 808 for the purpose of creating a new viewport to include the graphical targets 802, 804, 806, 808. The graphical targets 802, 804, 806, 808 can be selected by using an input device to draw a box 810 around or at least partially around the graphical targets 802, 804, 806, 808. The drawing of the box 810 can be initiated using a Marquee box selection tool from the tools item 714 of the menu 702. The graphical targets 802, 804, 806, 808 can be selected in other various manners, such as holding down the shift key on a keyboard and selecting each of the graphical targets 802, 804, 806, 808 using a pointing device or a touch input. A crosshair 811 may be used to indicate movement or sizing of the box 810 as a size of the box 810 is being adjusted by the pointing device or the touch input.

Upon selection of the graphical targets 802, 804, 806, 808 a context menu 812 will appear. The context menu 812 may include simple icons or word descriptors. In the present implementation, the context menu 812 may have options such as "Pin/Unpin," "Present," "Create viewport," "Ungroup," "Duplicate" and "Delete." Pin causes the location of each of the graphical targets 802, 804, 806, 808 to be pinned in the virtual workspace, such that the locations of the graphical targets 802, 804, 806, 808 cannot move unless the user unpins the graphical targets 802, 804, 806, 808. A selection of the present option from the context menu 812 will result in the graphical user interface 800 entering a presentation mode causing the selected graphical targets 802, 804, 806, 808 to fill the physical display of the user, as if the graphical targets 802, 804, 806, 808 were a single slide for presentation viewing. The user can exit the presentation mode by pressing the "escape" key on their keyboard or by selecting an "X" in one of the corners of the graphical user interface 800. Selection of the ungroup option from the context menu 812 will undo the selection of the selected graphical targets 802, 804, 806, 808, selection of the duplicate option from the context menu 812 will create a duplicate of all of the selected graphical targets 802, 804, 806, 808, and selection of the delete option from the context menu 812 will delete all of the selected graphical targets 802, 804, 806, 808.

Selection of the create viewport option from the context menu 812 will cause the new viewport interface 738, as discussed above with reference to FIG. 7B, to appear. Using the new viewport interface 738, the user can create a name for the new viewport and select a corresponding color for easy identification of the newly created viewport. Similar to FIG. 7B, after the new viewport is created, the title box 740 will appear with the title added by the user, as well as the marker icon 720 and the context menu icon 744. Additionally, the line 746 designating the area or boundaries of the newly created viewport is rendered within the graphical user interface 800.

Figure 9A:
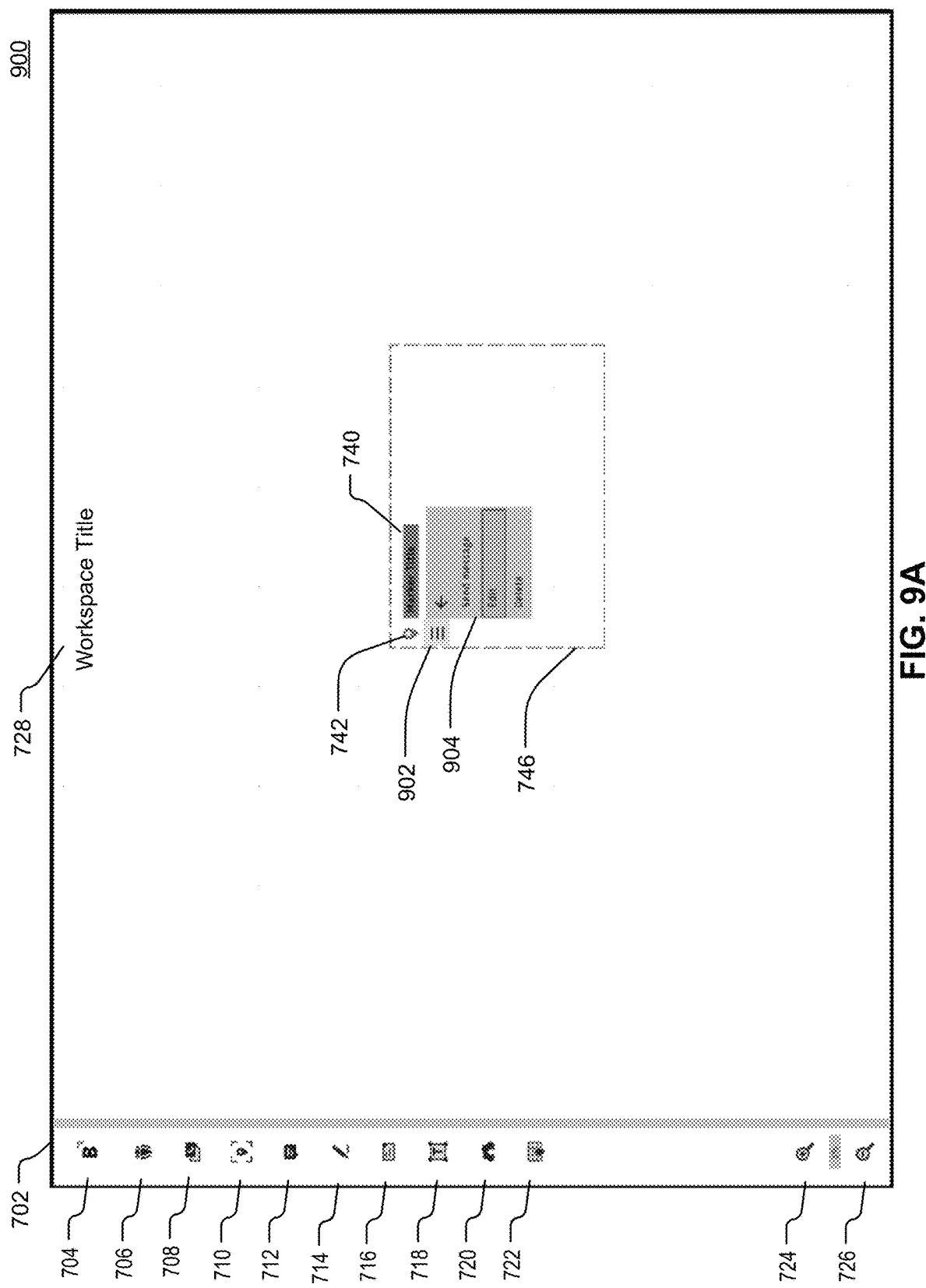
FIGS. 9A, 9B, and 9C (collectively FIG. 9) illustrate an example process of editing an existing viewport using a context menu of a graphical user interface.
Figure 9B:
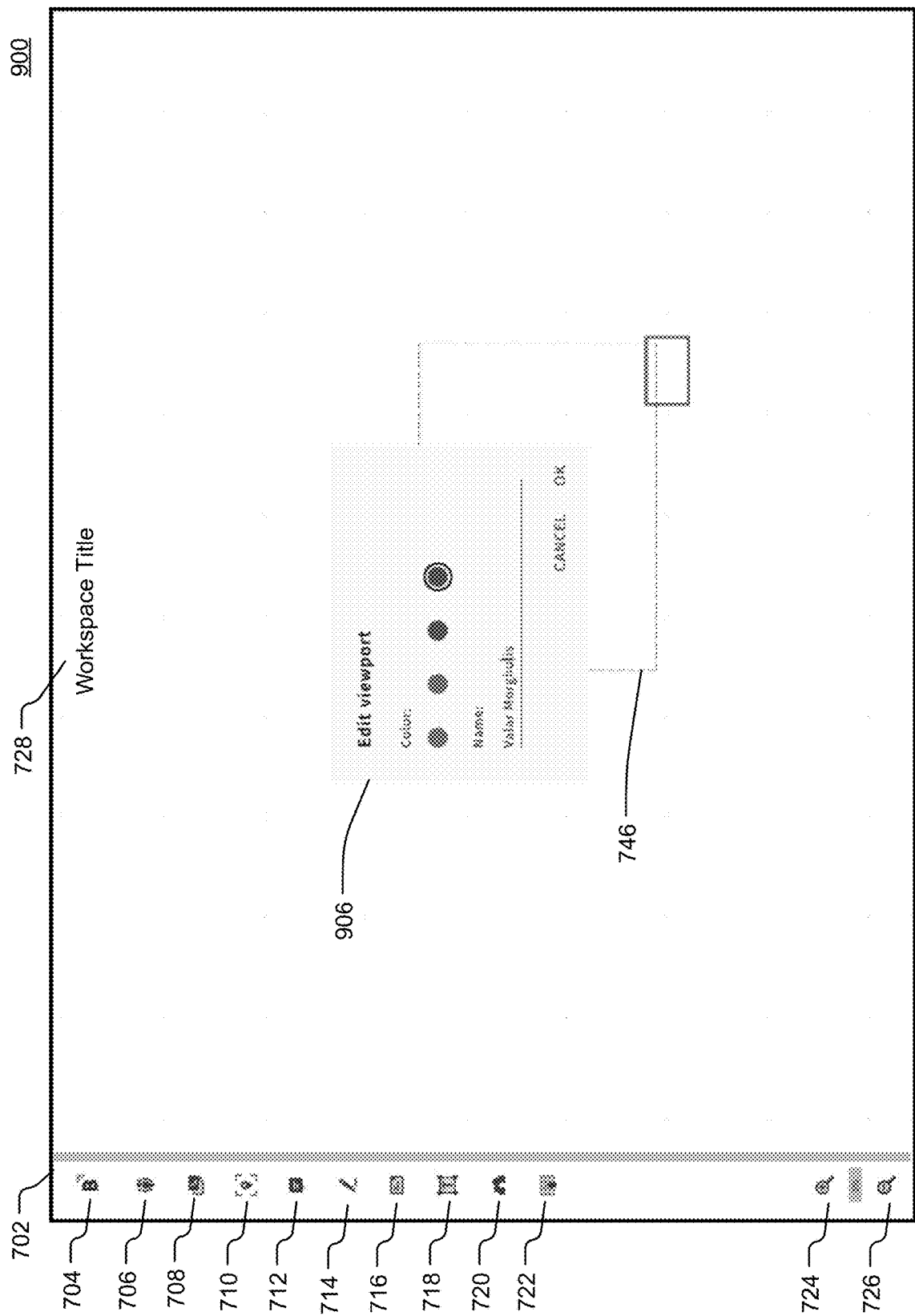
Figure 9C:
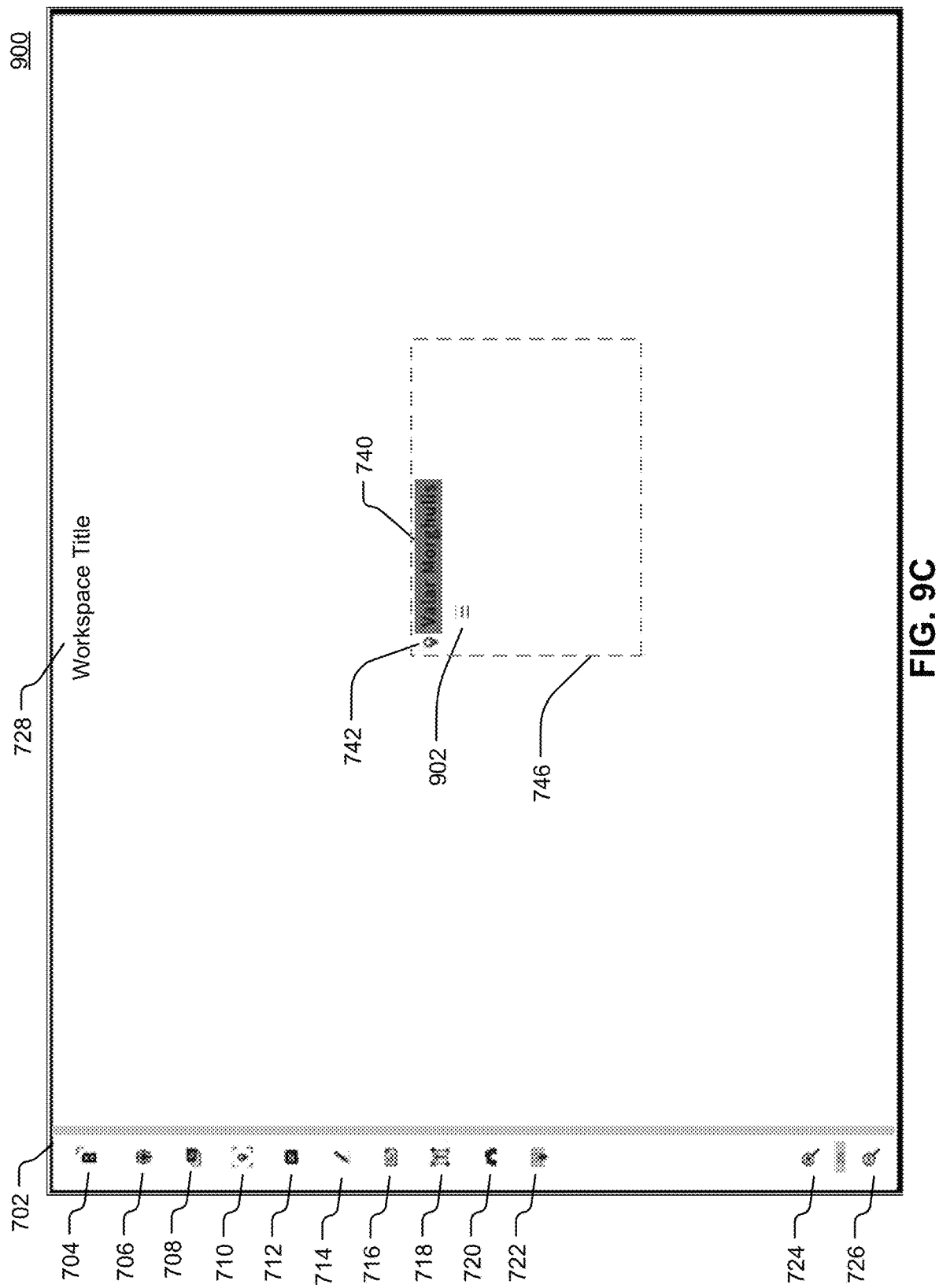

FIGS. 9A-9C illustrate a process of editing an existing viewport using a context menu 904 of a graphical user interface 900. The graphical user interface 900 provides a screen space view of a virtual workspace. The screen space view is, for example, a screen space 250 of a first (client) user, as illustrated in FIG. 2. Reference elements 702, 704, 706, 708, 710, 712, 714, 716, 718, 720, 722, 724, 726, 728 and 738 of FIGS. 9A-9C are identical to that which is illustrated in FIGS. 7A-7C. As such, redundant descriptions thereof are omitted.

FIG. 9A illustrates a viewport that has either just been created by a user or that has just been opened by a user using the viewport item 710 of the menu bar 702. Opening up a viewport can also be referred to as focusing in on a selected viewport. When focusing on a selected viewport, the boundaries of the viewport (e.g., line 746) will be fit to the user's display area according to the design of the collaboration system. However, in this example, the zoom level of the viewport may have been adjusted or changed by the user, such that the line 746 that designates the boundaries of the viewport only takes up a small portion of the screen space. The user can edit the viewport by selecting the marker icon 742 or a context menu icon 902 by single clicking (or any other designated selection mechanism) the marker icon 742 or the context menu icon 902. Once the marker icon 742 or the context menu icon 902 has been selected, context menu 904 will be rendered. The context menu 904 can be in the format of a hamburger menu, a kabob menu, or any other type of text or graphical type menu. In this example, the context menu 904 allows the user to send a message to another user(s) that will contain a reference or link to the viewport, edit the viewport or delete the viewport.

As illustrated in FIG. 9B, when the user selects edit the viewport from the context menu 904, an edit viewport interface 906 will appear that allows the user to create a name for the viewport and to select a color associated with the viewport. The edit viewport interface 906 is similar to the new viewport interface 738 discussed above with reference to FIGS. 7A-7C. FIG. 9C illustrates the updated (edited) viewport having the new name "Valar Morghulis" as entered by the user in FIG. 9B.

Figure 10A:
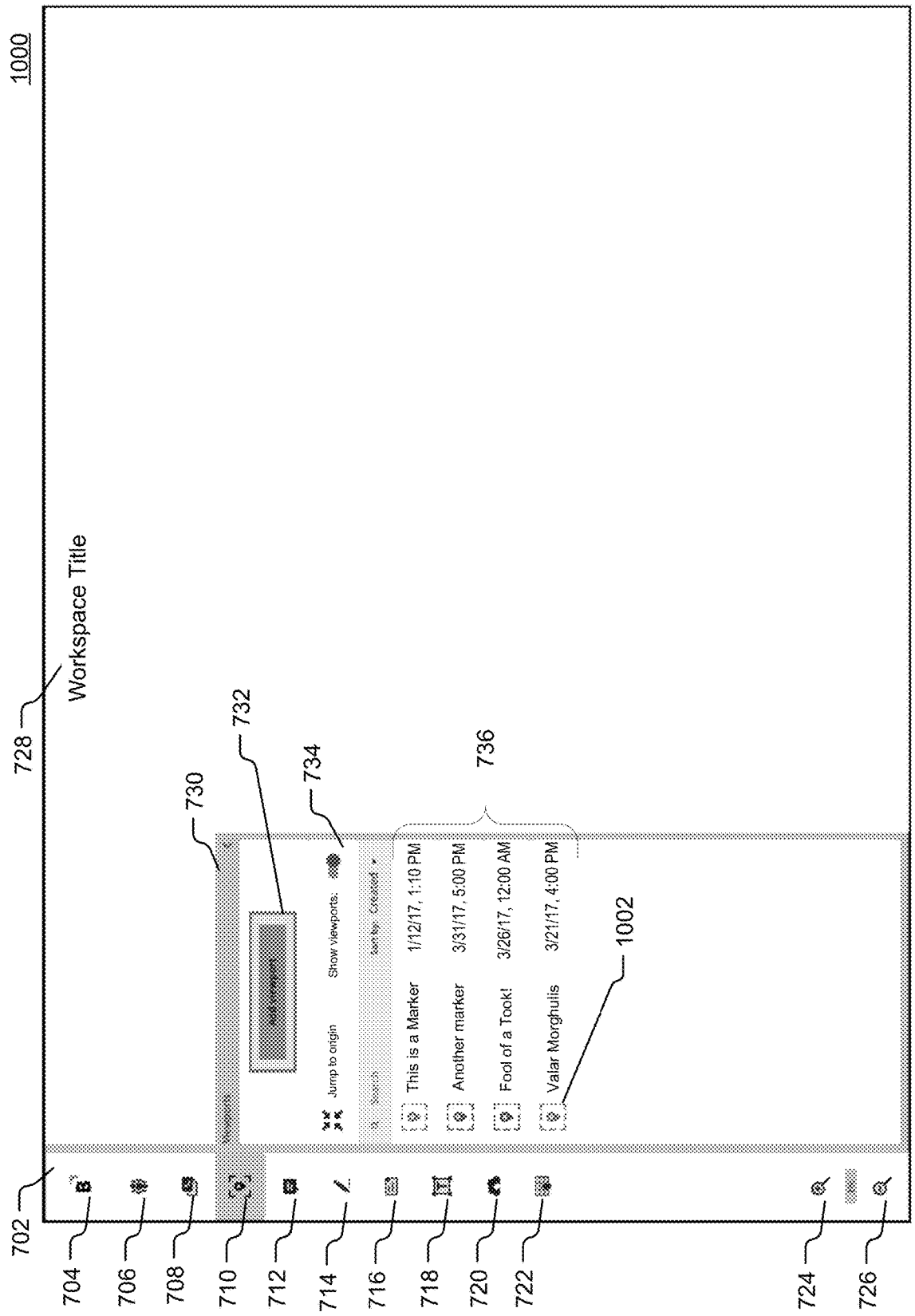
FIGS. 10A and 10B (collectively FIG. 10) illustrate an example process of opening up a viewport that has previously been created by selecting a viewport marker using a graphical user interface.
Figure 10B:
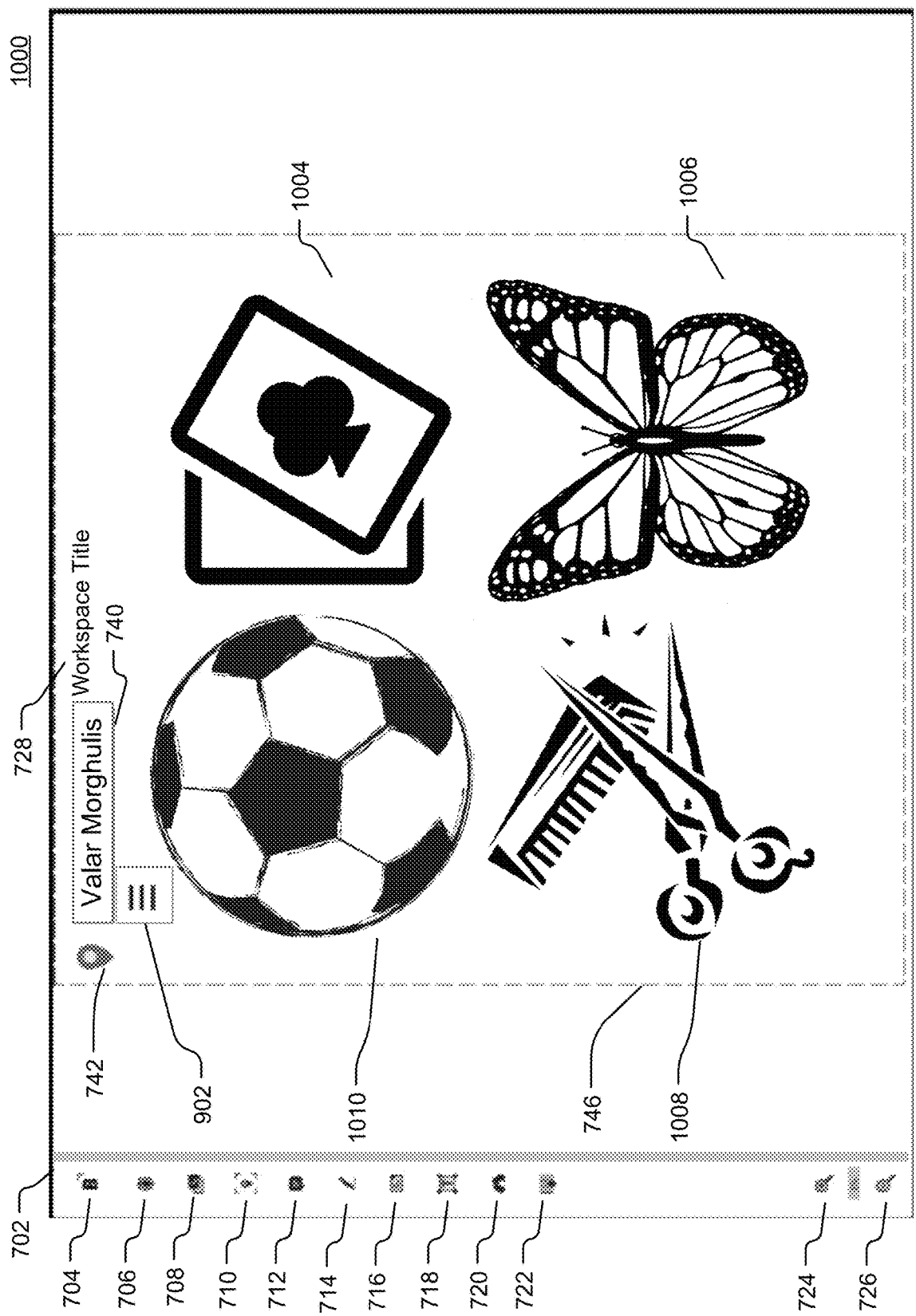

FIGS. 10A and 10B illustrate a process of opening up a viewport that has been previously created by selecting a viewport marker using a graphical user interface 1000. The graphical user interface 1000 provides a screen space view of a virtual workspace. The screen space view is, for example, a screen space 250 of a first (client) user, as illustrated in FIG. 2. Reference elements 702, 704, 706, 708, 710, 712, 714, 716, 718, 720, 722, 724, 726, 728 and 738 of FIGS. 10A and 10B are identical to that which is illustrated in FIGS. 7A-7C. As such, redundant descriptions thereof are omitted.

Referring to FIG. 10A, the user opens the viewport menu 730 by selecting the viewport item 710 from the menu bar 702. As discussed above with reference to FIGS. 7A-7C, the viewport menu 730 provides a list 736 of previously created viewport markers. When the user selects, for example, the viewport marker 1002 named Valar Morghulis, the local client viewport is changed to match the Valar Morghulis viewport and to simultaneously display any of the graphical targets included therein.

FIG. 10B illustrates the graphical user interface 1000 rendered on the client's physical display after selection of the viewport marker 1002. As illustrated, the viewport includes graphical targets 1004, 1006, 1008 and 1010 that were placed in the viewport by the creator of the viewport named "Valar Morghulis" or by a user who has edited the viewport. As discussed above with reference to FIGS. 9A-9C, the user can edit the viewport by selecting the viewport icon 742 or the context menu icon 902.

Alternatively, the user can select a viewport by simply navigating the virtual workspace. For example, just below the viewport named "Valar Morghulis," there may be another viewport named "Fool of a took!". FIG. 10A illustrates that in the viewport menu 730 there is a viewport marker representing the viewport named "Fool of a took!". However, rather than selecting the viewport named "Fool of a took!" from the viewport menu 730, the user can just navigate below the "Valar Morghulis" viewport to reach the "Fool of a took!" viewport. The user can then select and edit the "Fool of a took!" viewport, as described above. Once the user selects the "Fool of a took!" viewport, each of the graphical targets contained within with be rendered on the physical display of the user because the user's local client viewport will be changed to match the "Fool of a took!" viewport.

When the user selects a viewport marker from the viewport menu 730 (e.g., selecting the viewport marker 1002 representing the "Valar Morghulis" viewport) or when the user selects the "Fool of a took!" viewport after navigating the virtual workspace, a message is sent from the client to the server in order to initiate a viewport change. An example message for creating this viewport change could be as follows:

[
  <client-id>,
  "vc", // viewport change
  <target-id>,
  "viewport",
  {
    "viewportId": <viewport-id>
  }
]

In response to receiving the message from the client, the server will send a message to the client including all of the information regarding the selected viewport. The message from the server to the client could be as follows:

[
  <client-id>,
  "he",
  <session-id>,
  <event-id>,
  "create",
  {
    "type":"viewport",
    "id": <viewport-id>,
    "properties": {
      "x": 1000,
      "y": 1200,
      "width": 250,
      "height": 250,
      "title":"Valar Morghulis",
      "color": 0
    }
  }
]

Each client/node of the collaboration system includes logic to, upon receipt of this message, render the graphical user interface including an updated list 736 of viewport markers and to render the new/updated viewport as identified in the message. The message can also include additional metadata such as a specified zoom-in indicator that, for example, indicates that the client/node is to render the graphical targets included in the created viewport using a specified zoom-in level while still allowing the rendered one or more graphical targets to remain on the local screen space in their entirety. This indicator can be set by the user who created the viewport or by some other means or option on the system of the user who created the viewport. All other network nodes include logic to interpret the indicator so that the specified zoom-in level can be achieved when viewing the viewport.

As discussed above, the selected viewport can essentially serve as a target for a user's display area (i.e., a local client screen space rendering a current local client viewport that is matched to the selected viewport). This process can also be referred to as focusing in on a selected viewport. When focusing in on a selected viewport, the boundaries of the viewport (e.g., line 746) will be fit to the user's display area according to the design of the collaboration system. The system can define the fitting of the viewport in many ways, and can include: (a) making the selected viewport as large as possible on the user's screen while assuring that the entire viewport including any graphical targets included therein is displayed in the user's display area without changing its proportions and optionally include displaying the boundaries of the selected viewport on the user's display area; (b) positioning the top left corner of the selected viewport at the top left corner of the user's display area and providing a visual indication of the boundaries of the viewport so that the user can pan and zoom the workspace freely knowing where the viewport is located; and (c) initially rendering the content of the selected viewport at a zoom level that makes viewing the content easy (e.g., all of the graphical targets within the selected viewport are at least partially available to the user on the user's display) and optionally limiting the pan and zoom of the user's display area to the boundaries of the viewport until the user indicates that they wish to stop focusing on the selected viewport. The logic of the client/node of the collaboration system can be configured to interpret this message to display a selected viewport in the above-described manner or any other manner not described here.

Additional Features of Viewports

In addition to the features described above, viewports and viewport messages sent between the client and the server can provide many other features to the user. For example, the context (or contextual) menu of the viewport can be smart or content aware, a viewport can be a destination (location) for new content added to the virtual workspace, access to contents of the viewport can be restricted, and viewports can be linked to one another to create a walkthrough or a slide show. Each of these features is described below in more detail.

Figure 11A:
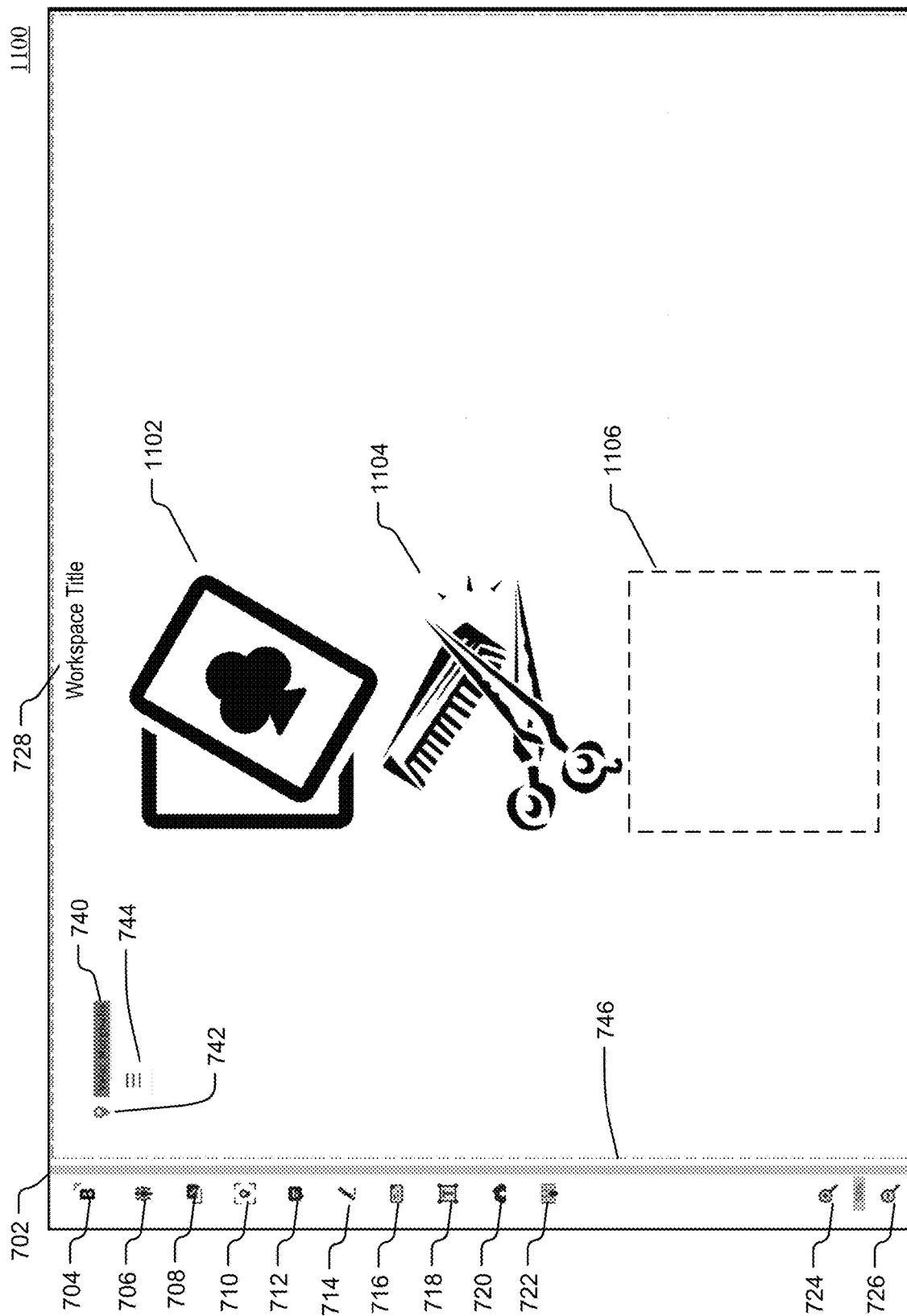
FIGS. 11A, 11B and 11C illustrate different types of interface elements and functionalities that can be provided by a smart viewport.
Figure 11B:
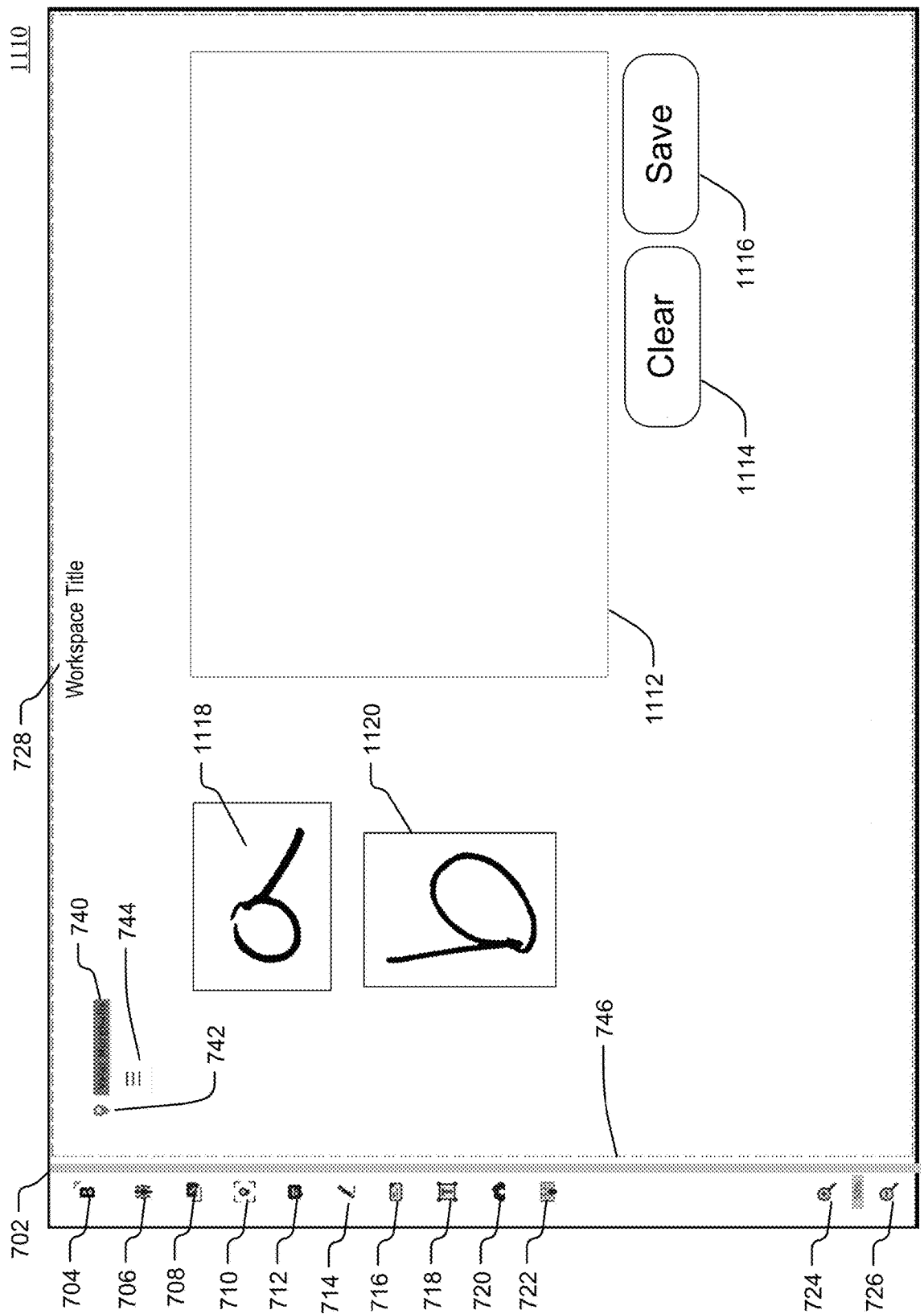
Figure 11C:
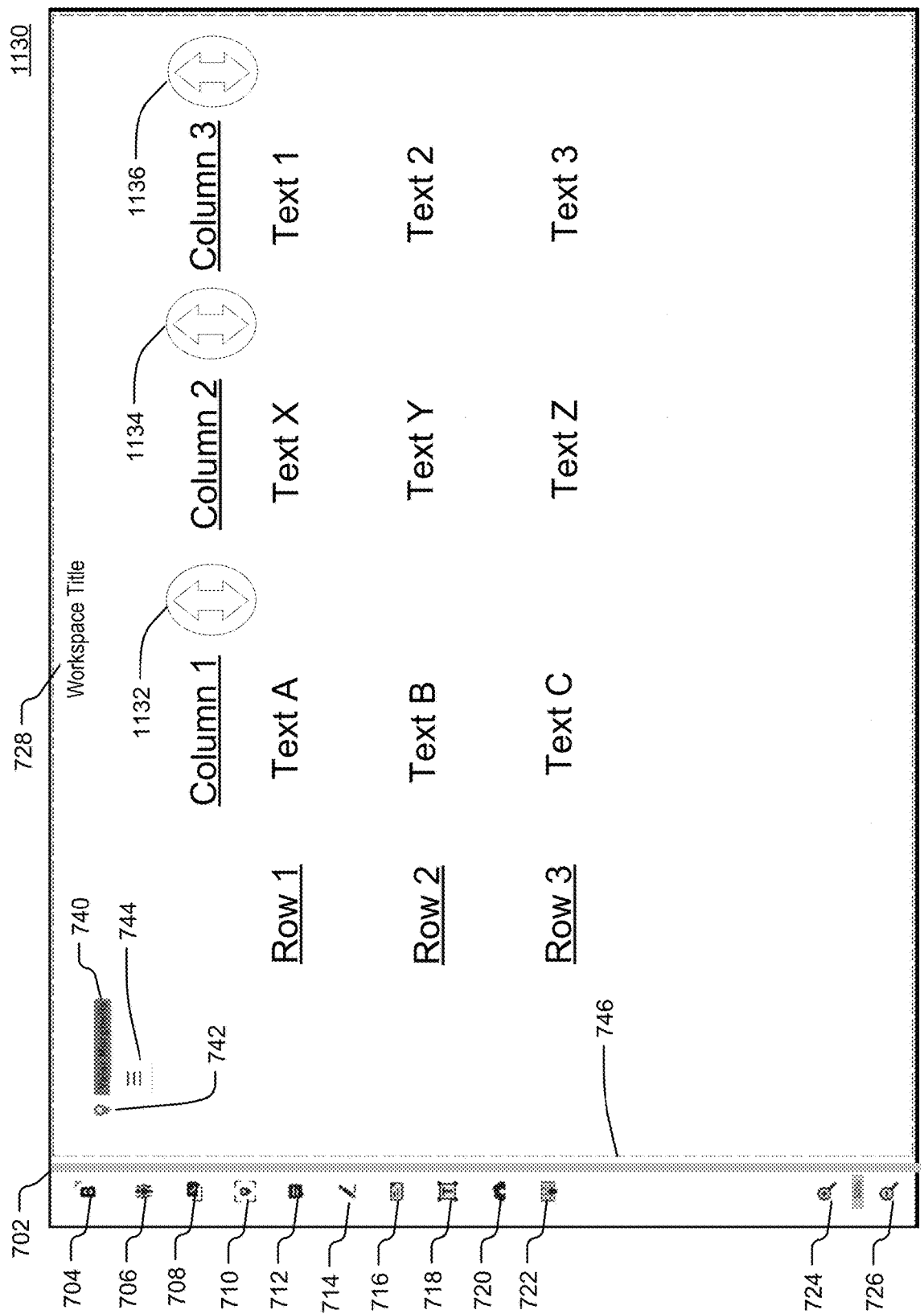

Smart Viewports: A viewport can also serve as a container for content and can provide interface elements and functionality well suited for the content. For example, a smart viewport can automatically arrange/sort contents included therein and can provide certain functions based on the type of contents that are included therein. FIGS. 11A-11C illustrate different types of interface elements and functionalities that can be provided by a smart viewport.

FIG. 11A illustrates a smart viewport 1100 that is "smart" about how objects are arranged inside of its boundaries. For example, a viewport can be designated or identified as a vertical layout viewport that will automatically place a newly added object at the vertical bottom of the current contents (e.g., at a same x coordinate, but at a higher or lower y coordinate, depending on the orientation of the coordinates). The viewport 1100 can be manually designated as the vertical layout viewport by a user or creator of the viewport or it can be automatically designated using one or more algorithms of the collaboration system. For example, the collaboration system can intelligently identify that two or more objects are vertically arranged in the viewport and can then automatically designate the viewport as a vertical layout viewport.

Referring to FIG. 11A, a first object 1102 and a second object 1104 are vertically arranged in the viewport 1100. The vertical arrangement of objects 1102 and 1104 can be the result of the user manually placing them in a vertical configuration. Based on this configuration, the viewport 1100 can be automatically identified as being a vertical layout viewport. As mentioned above, the user or creator of this viewport 1100 can manually designate it as a vertical layout viewport. When a user adds a new object 1106 to the viewport 1100, the new object 1106 will follow the vertical arrangement and be automatically placed immediately below the second object 1104. The user will be able to override this automatic placement by moving the new object 1106 anywhere else within the viewport. Other features of this vertical layout viewport can include extending the boundaries of the viewport 1100 if there is not sufficient room to add the new object 1106 below the second object 1104. The smart viewport 1100 can also be a horizontal layout viewport or a diagonal layout viewport.

Referring to FIG. 11B, a viewport 1110 is illustrated. The viewport 1110 is a smart viewport that is a whiteboard type viewport 1110. This viewport 1110 can be automatically or manually designated as a whiteboard type viewport 1100 in a similar manner as viewport 1100, as discussed above. A whiteboard type viewport 1110 can offer unique user interface interactions that are specific to the kind of content being placed inside. For example, if a viewport is designated as a whiteboard type viewport, then the user may be presented with a set of interface elements designed to replicate a whiteboard application that includes (i) a primary drawing surface (i.e., the whiteboard) 1112, (ii) a clear button 1114 for clearing the primary drawing surface 1112, (iii) a save button 1116 for capturing a current state of the primary drawing surface 1112 and saving it as a copy, and (iv) a list of the saved copies 1118 and 1120 of the primary drawing surface. While this type of viewport can be automatically designated, a typical implementation would involve the user making a manual designation by, for example, adding a whiteboard object into the viewport 1110.

Referring to FIG. 11C, a viewport 1130 is illustrated. Viewport 1130 is similar to viewport 1100, except that it is designated as a grid viewport. Menu items 1132, 1134 and 1136 will appear that are contextual in the sense that columns of the grid can be sorted. The menu items 1132, 1134 and 1136 are automatically added by the smart viewport 1130 because it was automatically or manually designated as being a grid type viewport.

Other types of smart viewports can be implemented that provide different features based on their contents. For example, if a viewport only contains images, the collaboration system may present an interface or contextual menu for viewing the images in a slideshow or may present tools for editing the images. In contrast, if the viewport contains primarily text, the collaboration system may present a search box to the user for finding instances of a string in the text. The collaboration system can recognize the type and/or characteristics of content included in the viewport and present to the user specially designed interfaces for the tasks of creating, modifying and deleting that particular kind of content. Upon creation of a viewport, information such as metadata that pertains to the contextual menu can be added to a message by the client/node.

An example message sent from the client to the server for creating a smart viewport could be:

```
[
  <client-id>,
  "he", // history event, permanent in nature
  <target-id>,
  "viewport",
  {
    "x": 1000,
    "y": 1200,
    "width": 250,
    "height": 250,
    "title":"Valar Morghulis",
    "color": 0,
    "smart-type":"whiteboard"
  }
]
```

An example message sent from the server to the client opening a smart viewport could be:

```
[
  <client-id>,
  "he",
  <session-id>,
  <event-id>,
  "create",
  {
    "type":"viewport",
    "id": <viewport-id>,
    "properties": {
      "creationTime": 1387565966,
      "x": 1000,
      "y": 1200,
      "width": 250,
      "height": 250,
      "title":"Valar Morghulis",
      "color": 0,
      "smart-type":"whiteboard"
    }
  }
]
```

Viewport As a Destination for Content: A viewport can serve as a destination for new content (e.g., graphical targets) being added to a virtual workspace. If a client requests to add a new graphical target (e.g., a jpeg image) to the virtual workspace, the collaboration system can offer the client the option to select a viewport as the destination of the new graphical target. This is particularly useful when the client is not focused on the particular viewport at the time of selecting and/or uploading the new graphical target. This is helpful because a virtual workspace can be very large, making it difficult to manually change the client's local viewport. This can also be helpful if the client does not want to go and open that particular viewport at the moment because they are working in a different portion of the virtual workspace. Without this feature, the client will have to select the viewport to open or focus in on, and then add the new graphical target, and then go back to the other location in the virtual workspace where they were previously working. Additionally, there may be a scenario when the client is working from a system or tool that does not provide rendering of the workspace. Even in such a situation, the client can add the new graphical target to the viewport when the viewport is set up as a destination for content. The collaborative system could add the new graphical target to a default location (e.g., top/left corner) or the system could expand the size of the workspace so that the new graphical target can fit.

Given that a viewport exists as follows:

```
[
  "id": <viewport-id>,
  "title":"All Site Designs",
  "position": {
    "x": 1000,
    "y": 1200
  }
}
```

An example message sent from the client to the server could be as follows:

Sample message from client to server:

```
[
  <client-id>,
  "he", // history event
  <target-id>,
  "create",
  {
    "type":"image",
    "filename":"site-design-page-1.png",
    "destination": {
      "type":"viewport",
      "destinationId": <viewport-id>
    }
  }
]
```

An example message sent from the server to the client could be:

```
[
  <client-id>,
  "he",
  <session-id>,
  <event-id>,
  "create",
  {
    "type":"image",
    "id": <object-id>,
    "properties": {
      "filename":"site-design-page-1.png"
    }
    "position": {
      "x": 1000,
      "y": 1200
    }
  }
]
```

Access Restrictions to Viewports: Access restrictions for viewing the contents of the viewport are another property of the viewport that can be defined and enabled by the collaborative system. When a client creates a viewport or selects a viewport (e.g., by way of a viewport marker or any of the other ways described above), restrictions regarding access to the viewport can be defined. For example, a client can restrict viewing and/or editing rights to certain other users or clients. This allows the virtual workspace to contain private information that can only be viewed and/or edited by authorized users or clients. These access restrictions can be created and enforced by creating an access list that includes a list of users that are permitted to render/view the graphical targets of a viewport. The access list can be sent as metadata from the client/node that created the viewport to a server and/or other nodes of the collaborative system. When another client/node accesses the viewport their local system will only allow the user to access the contents of the viewport if the user is on the access list. When a client/node requests the Spatial Event Map contents for an area of the workspace that includes a viewport to which the user of the node does not have access, the server will filter any graphical targets within the viewport according to the restrictions that were defined. For further security, the access lists can be encrypted and/or other security measures can be taken so that the access list cannot be manipulated by a user.

An example message sent from the client to the server updating the properties of the viewport to only allow User A and User B to view the contents of the viewport could be:

```
[
  <client-id>,
  "he",
  <target-id>,
  "update",
  {
    "viewportId": <viewport-id>,
    "properties": {
      "title":"New viewport title",
      "accessList": ["userA", "userB"]
    }
  }
]
```

Linking Viewports for a Walkthrough: Multiple viewports can be linked together by defining a collection of viewports. The collection of viewports can be called a slideshow or a walkthrough. A client can create a walkthrough as a destination of a newly created viewport or by editing an existing viewport. Further, a client can request that existing viewports be moved or copied into an existing walkthrough. Once a walkthrough is defined and populated with viewports, it can be visualized on the screen as a list or in a paging mechanism with buttons for moving a cursor forward or backward in the collection. The walkthrough can be followed or viewed using an input device such as a mouse, keyboard, or touch gestures on a touch sensitive display for manipulating which viewports of the walkthrough are displayed or focused on.

An example message sent from the client to the server to create a walkthrough would be:

```
[
  <client-id>,
  "he", // historical event
  <target-id>,
  "walkthrough",
  {
    "title":"Active Projects"
  }
]
```

An example message sent back from the server to the client in response could be:

```
[
  <client-id>,
  "he",
  <session-id>,
  <event-id>,
  "create",
  {
    "type":"walkthrough",
    "id": <object-id>,
    "properties": {
      "title":"Active Projects"
    }
  }
]
```

An example message sent from the client to the server to assign a viewport to an existing walkthrough could be:

```
[
   <client-id>,
   "he", // historical event
   <target-id>,
   "assignToWalkthrough",
   {
      "viewportId": <viewport-id>,
      "walkthroughId": <walkthrough-id>
   }
]
```

An example message sent from the server back to the client in response could be:

```
[
   <client-id>,
   "he",
   <session-id>,
   <event-id>,
   "update",
   {
      "type":"assignToWalkthrough",
      "id": <object-id>,
      "properties": {
         "viewportId": <viewport-id>,
         "walkthroughId": <walkthrough-id>
      }
   }
]
```

Rearranging Locations of Graphical Targets within Viewports: Zooming or mapping complications can arise in a situation where a user creates a viewport using a screen space that is in landscape orientation and another user who is using a screen space that is in portrait orientation views (focuses on) that viewport. The graphical targets that easily fit into the landscape orientation may not fit in the screen space that has a portrait orientation without significantly reducing the size of the entire viewport on the user's node (e.g., significantly zooming out). In order to resolve this issue, the client/node can include logic that rearranges the graphical targets to fit better on the screen space of the user who is viewing the viewport. This rearrangement feature can be implemented by the client/node if a certain minimum zoom level is necessary to map the viewport to the screen space of the user. For example, if the zoom level must go to 15% to fit all of the graphical targets correctly on a portrait orientation because the viewport has a landscape orientation, then the rearrangement feature will be triggered. This rearrangement will allow the graphical targets to simultaneously fit on the screen space of the user without going to a zoom level that makes all of the graphical targets too small to reasonably view. This rearrangement feature could also be enabled or disabled using the messages or metadata sent between the clients/notes and the server and vice-versa.

Figure 12:
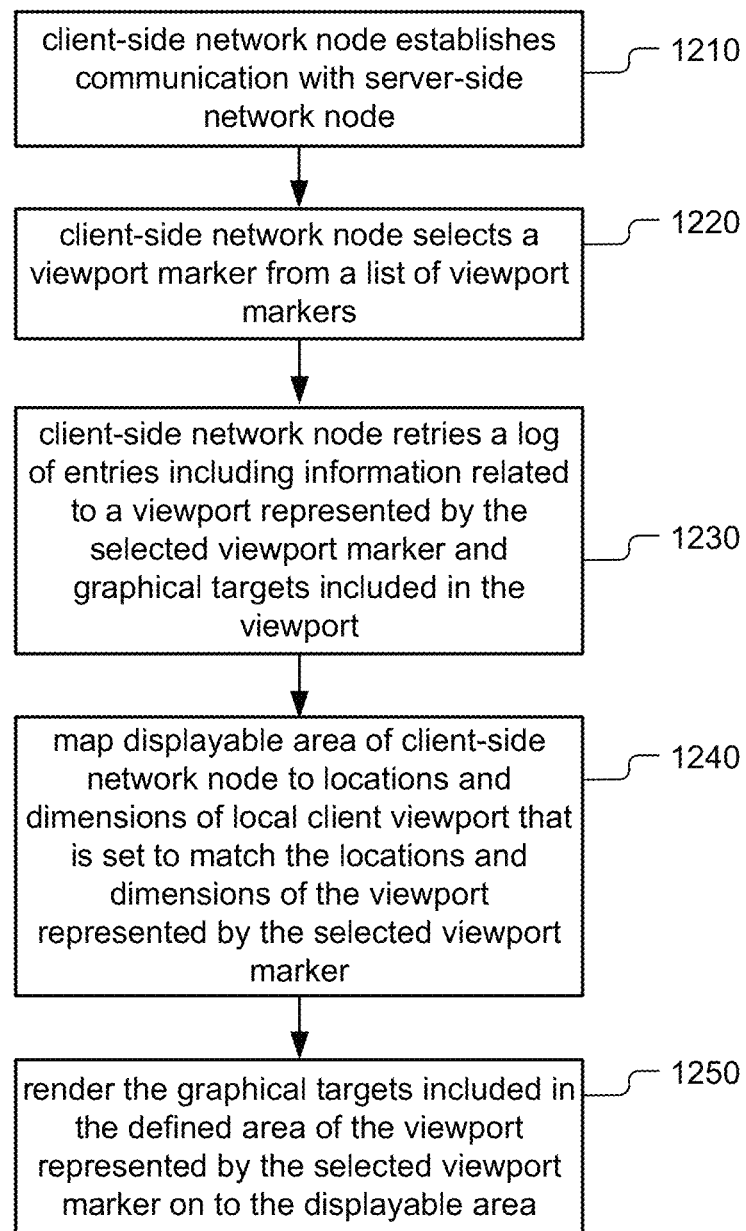
FIG. 12 provides a flowchart that illustrates operations performed after the selection of a viewport marker from a list of viewport markers rendered by a graphical user interface.

FIG. 12 is a flowchart that illustrates operations performed after the selection of a viewport marker from, for example, the list of viewport markers 736 of the viewport menu 730 rendered by the graphical user interface 700, as illustrated in FIG. 7A. FIG. 12 is a simplified flow diagram of a process for interpreting user input executed by a client-side network node. The order illustrated in the simplified flow diagram is provided for the purposes of illustration, and can be modified as suits a particular implementation. Many of the operations, for example, can be executed in parallel. In this implementation, all users in the virtual workspace receive all historic and ephemeral events that occur within that virtual workspace. The virtual workspace can be, in essence, limitless, while a viewport for a client can include the contents of a portion of the workspace that intersects the client's viewport. A plurality of clients can be collaborating within the workspace with overlapping viewports. The clients can receive and log the objects defined by event records that have coordinates outside of their local viewport.

In this example, a client-side network node establishes communication with a server-side network node 1210. The client-side network node can include a display having a physical display space, a user input device, a processor and a communication port. The first network node may also establish communication with other client network nodes.

After selection of one of the viewport markers from the list of viewport markers 1220, the client-side network node retrieves at least part of a log of events identifying (i) locations and dimensions, within the virtual workspace, of a viewport represented by the selected viewport marker, (ii) graphical targets and (iii) virtual coordinates of the graphical targets representing locations in the virtual workspace 1230. The viewport represented by the selected viewport marker defines an area in the virtual workspace having the location and dimensions. Further, the defined area in the workspace includes certain graphical targets for simultaneous display on the physical display space of the client-side network node when rendered by the client-side network node. Also, one of the entries in the retrieved log identifies the viewport represented by the selected viewport marker and includes data specifying (i) virtual coordinates of the location and dimensions (within the workspace) of the viewport represented by the selected viewport marker and having the defined area including the certain graphical targets and (ii) virtual coordinates of a location and dimensions in the virtual workspace of the certain graphical targets.

In response to the retrieving of the log of entries, the client-side network node maps a displayable area, in the physical display space, to locations and dimensions of a local client viewport that is set to match the locations and dimensions of the viewport represented by the selected viewport marker 1240.

The client-side network node renders each of the certain graphical targets included in the defined area of the viewport, represented by the selected viewport marker, onto the displayable area 1250.

Figure 13:
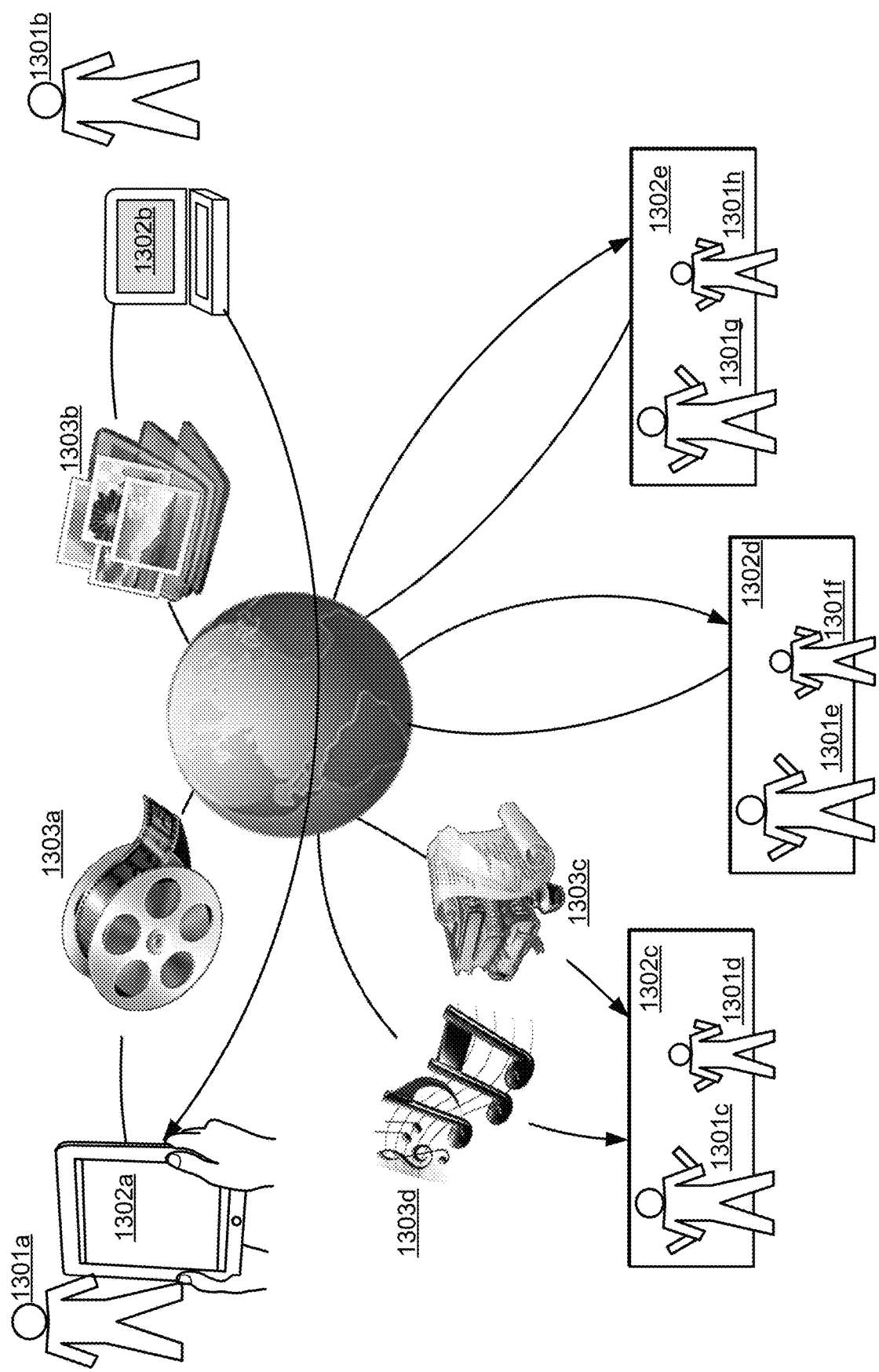
FIG. 13 illustrates example aspects of a digital display collaboration environment.

FIG. 13 illustrates example aspects of a digital display collaboration environment. In the example, a plurality of users 1301a-h (collectively 1301) may desire to collaborate with each other in the creation of complex images, music, video, documents, and/or other media, all generally designated in FIG. 13 as 1303a-d (collectively 1303). The users in the illustrated example use a variety of devices configured as electronic network nodes, in order to collaborate with each other, for example a tablet 1302a, a personal computer (PC) 1302b, and many large format digital displays or walls 1302c, 1302d, 1302e (collectively devices 1302). In the illustrated example, the large format display 1302c, which is sometimes referred to herein as a "wall", accommodates more than one of the users, (e.g. users 1301c and 1301d, users 1301e and 1301f, and users 1301g and 1301h). The user devices, which are referred to as client-side network nodes, have displays on which a screen space is allocated for displaying events in a workspace. The screen space for a given user may comprise the entire screen of the display, a subset of the screen, a window to be displayed on the screen and so on, such that each has a limited area or extent compared to the virtually unlimited extent of the workspace.

Figure 14:
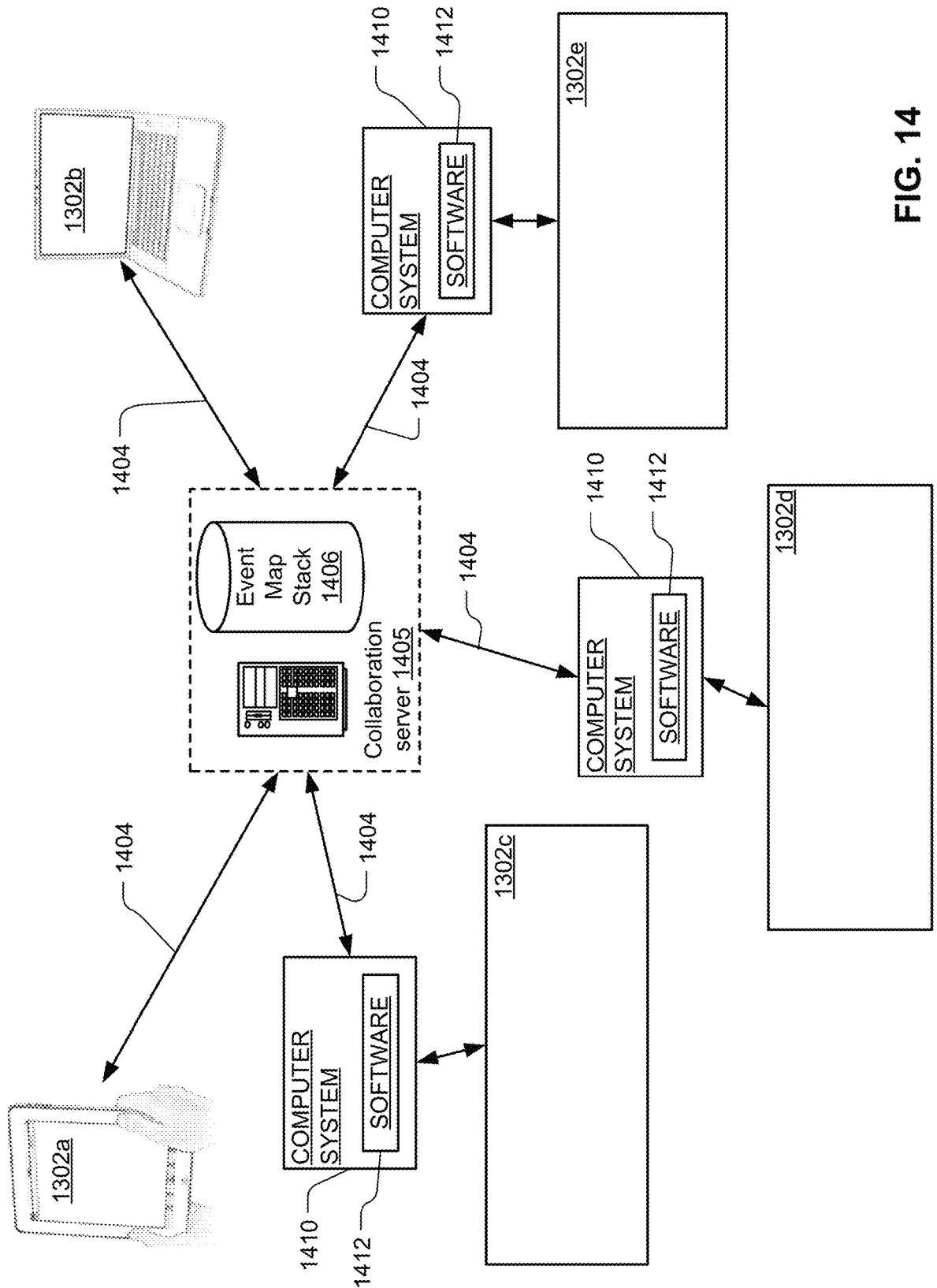
FIG. 14 illustrates additional example aspects of a digital display collaboration environment.

FIG. 14 illustrates additional example aspects of a digital display collaboration environment. As shown in FIG. 13, the large format digital displays 1302c, 1302d, 1302e sometimes referred to herein as "walls" are controlled by respective client-side, communication networks 1404, which in turn are in network communication with a central collaboration server 1405 configured as a server-side physical network node or nodes, which has accessible thereto a database 1406 storing Spatial Event Map stacks for a plurality of workspaces.

As used herein, a physical network node is an active electronic device that is attached to a network, and is capable of sending, receiving, or forwarding information over a communication channel. Examples of electronic devices, which can be deployed as network nodes, include all varieties of computers, workstations, laptop computers, hand held computers and smart phones. As used herein, the term "database" does not necessarily imply any unity of structure. For example, two or more separate databases, when considered together, still constitute a "database" as that term is used herein.

The application running at the collaboration server 1405 can be hosted using Web server software such as Apache or nginx, or a runtime environment such as node.js. It can be hosted for example on virtual machines running operating systems such as LINUX. The server 1405 is illustrated, heuristically, in FIG. 14 as a single computer. However, the server architecture can involve systems of many computers, each running server applications, as is typical for large-scale cloud-based services. The server architecture includes a communication module, which can be configured for various types of communication channels, including more than one channel for each client in a collaboration session. For example, with near-real-time updates across the network, client software can communicate with the server communication module using a message-based channel, based for example on the Web Socket protocol. For file uploads as well as receiving initial large volume workspace data, the client software can communicate with the server communication module via HTTPS. The server can run a front-end program written for example in JavaScript served by Ruby-on-Rails, support authentication/authorization based for example on Oauth, and support coordination among multiple distributed clients. The server communication module can include a message based communication protocol stack, such as a Web Socket application, that performs the functions of recording user actions in workspace data, and relaying user actions to other clients as applicable. This system can run on the node.JS platform for example, or on other server technologies designed to handle high-load socket applications.

The database 1406 stores, for example, a digital representation of workspace data sets for a Spatial Event Map of each session where the workspace data set can include or identify events related to objects displayable on a display canvas. A workspace data set can be implemented in the form of a spatial event stack, managed so that at least persistent spatial events (called historic events) are added to the stack (push) and removed from the stack (pop) in a first-in-last-out pattern during an undo operation. There can be workspace data sets for many different workspaces. A data set for a given workspace can be configured in a database, or as a machine-readable document linked to the workspace. The workspace can have unlimited or virtually unlimited dimensions. The workspace data includes event data structures identifying objects displayable by a display client in the display area on a display wall, and associates a time and a location in the workspace with the objects identified by the event data structures. Each device 1302 displays only a portion of the overall workspace. A display wall has a display area for displaying objects, the display area being mapped to a corresponding area in the workspace that corresponds to a viewport in the workspace centered on, or otherwise located with, a user location in the workspace. The mapping of the display area to a corresponding viewport in the workspace is usable by the display client to identify objects in the workspace data within the display area to be rendered on the display, and to identify objects to which to link user touch inputs at positions in the display area on the display.

The server 1405 and database 1406 can constitute a server-side network node, including memory storing a log of events relating to graphical targets having locations in a workspace, entries in the log including a location in the workspace of the graphical target of the event, a time of the event, and a target identifier of the graphical target of the event. The server can include logic to establish links to a plurality of active client-side network nodes, to receive messages identifying events relating to modification and creation of graphical targets having locations in the workspace, to add events to the log in response to said messages, and to distribute messages relating to events identified in messages received from a particular client-side network node to other active client-side network nodes.

The logic in the server 1405 can comprise an application program interface (API), including a specified set of procedures and parameters, by which to send messages carrying portions of the log to client-side network nodes, and to receive messages from client-side network nodes carrying data identifying events relating to graphical targets having locations in the workspace.

Also, the logic in the server 1405 can include an application program interface including a process to distribute events received from one client-side network node to other client-side network nodes.

The events compliant with the API can include a first class of event (history event) to be stored in the log and distributed to other client-side network nodes, and a second class of event (ephemeral event) to be distributed to other client-side network nodes but not stored in the log.

The server 1405 can store workspace data sets for a plurality of workspaces, and provide the workspace data to the display clients participating in the session. The workspace data is then used by the computer systems 1410 with appropriate software 1412 including display client software, to determine images to display on the display, and to assign objects for interaction to locations on the display surface. The server 1405 can store and maintain a multitude of workspaces, for different collaboration sessions. Each workspace can be associated with a group of users, and configured for access only by authorized users in the group.

In some alternatives, the server 1405 can keep track of a "viewport" for each device 1302, indicating the portion of the canvas viewable on that device, and can provide to each device 1302 data needed to render the viewport.

Application software running on the client device responsible for rendering drawing objects, handling user inputs, and communicating with the server can be based on HTML5 or other markup based procedures, and run in a browser environment. This allows for easy support of many different client operating system environments.

The user interface data stored in database 1406 includes various types of objects including graphical constructs, such as image bitmaps, video objects, multi-page documents, scalable vector graphics, and the like. The devices 1302 are each in communication with the collaboration server 1405 via a communication network 1404. The communication network 1404 can include all forms of networking components, such as LANs, WANs, routers, switches, WiFi components, cellular components, wired and optical components, and the internet. In one scenario, two or more of the users 1301 are located in the same room, and their devices 1302 communicate via WiFi with the collaboration server 1405. In another scenario two or more of the users 1301 are separated from each other by thousands of miles and their devices 1302 communicate with the collaboration server 1405 via the internet. The walls 1302c, 1302d, 1302e can be multi-touch devices, which not only display images, but also can sense user gestures provided by touching the display surfaces with either a stylus or a part of the body such as one or more fingers. In some embodiments, a wall (e.g. 1302c) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 1302c may, for example, be an array of Model No. MT553UTBL MultiTaction Cells, manufactured by Multi-Touch Ltd., Helsinki, Finland, tiled both vertically and horizontally. In order to provide a variety of expressive means, the wall 1302c is operated in such a way that it maintains "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, a display array can have a displayable area usable as a screen space totaling on the order of 6 feet in height and 30 feet in width, which is wide enough for multiple users to stand at different parts of the wall and manipulate it simultaneously.

FIGS. 15A-15G represent data structures which can be part of workspace data maintained by a database at the collaboration server 1405. In FIG. 15A, an event data structure is illustrated. An event is an interaction with the workspace data that can result in a change in workspace data. Thus, an event can include an event identifier, a timestamp, a session identifier, an event type parameter, the client identifier as client-id, and an array of locations in the workspace, which can include one or more for the corresponding event. It is desirable, for example, that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include style events, which indicate the display parameters of a stroke, for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example. Events can include begin follow events and viewport change events. Events can include marker create events.

Events can be classified as persistent history events and as ephemeral events. Processing of the events for addition to workspace data, and sharing among users can be dependent on the classification of the event. This classification can be inherent in the event type parameter, or an additional flag or field can be used in the event data structure to indicate the classification.

A Spatial Event Map can include a log of events having entries for history events, where each entry comprises a structure such as illustrated in FIG. 15A. A server-side network node includes logic to receive messages carrying ephemeral and history events from client-side network nodes, and to send the ephemeral events to other client-side network nodes without forwarding them to a server at which events are added as corresponding entries in the log, and to send history events to the other client-side network nodes while forwarding them to a server at which events are added as corresponding entries to the log.

FIG. 15B illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 15C illustrates a data structure which consolidates a number of events and objects into a cacheable set called a chunk. The data structure includes a session identification, an identifier of the events included in the chunk, and a timestamp at which the chunk was created.

FIG. 15D illustrates the data structure for links to a user participating in a session in a chosen workspace. This data structure can include an access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated.

FIG. 15E illustrates a display array data structure which can be used in association with large-format displays that are implemented by federated displays, each having a display client. The display clients in such federated displays cooperate to act as a single display. The workspace data can maintain the display array data structure which identifies the array of displays by an array ID, and identifies the session position of each display. Each session position can include an x-offset and a y-offset within the area of the federated displays, a session identifier, and a depth.

The system can encrypt communications with client-side network nodes, and can encrypt the database in which the Spatial Event Maps are stored. Also, on the client-side network nodes, cached copies of the Spatial Event Map are encrypted in some embodiments, to prevent unauthorized access to the data by intruders who gain access to the client-side computers.

FIG. 15F illustrates a Global Session Activity Table (GSAT) used to map active clients to active workspaces. The data structure includes a workspace name, a device type, a client identification, a session identification, an actor type, and an actor identification.

FIG. 15G illustrates an example viewport data structure. The viewport data structure can provide a cache of attributes that identify current state information for the viewport in the workspace data, including client identifier, an event type, a target identifier, a session identifier, a location array, a dimension array, a title, a color, a timestamp, a context menu, an access list, and linking information.

Figure 16:
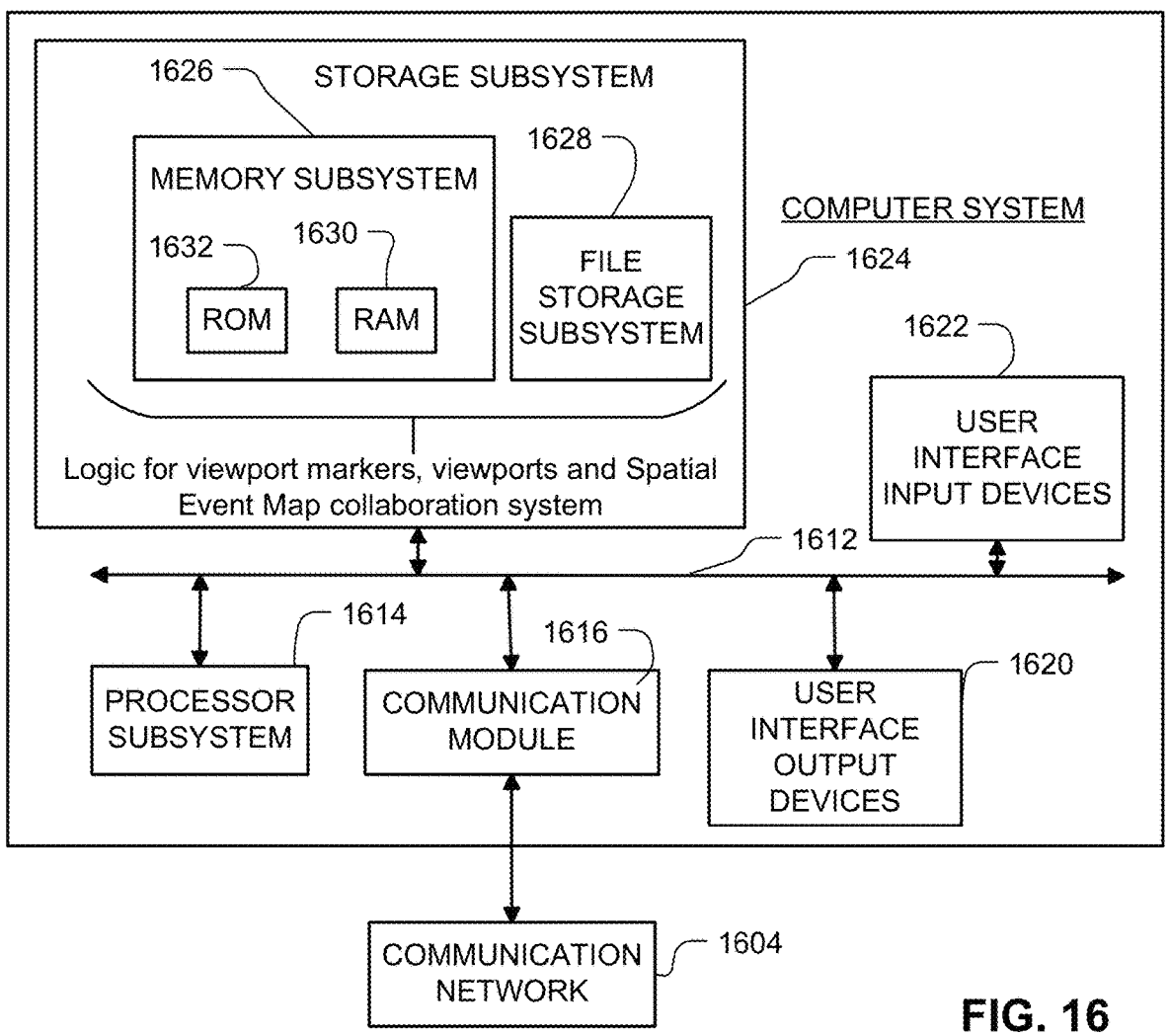
FIG. 16 is a simplified block diagram of a computer system, or network node, which can be used to implement the client-side functions or the server-side functions in a distributed collaboration system.

FIG. 16 is a simplified block diagram of a computer system, or network node, which can be used to implement the client-side functions (e.g. computer system 1410) or the server-side functions (e.g. server 1405) in a distributed collaboration system. A computer system typically includes a processor subsystem 1614 which communicates with a number of peripheral devices via bus subsystem 1612. These peripheral devices may include a storage subsystem 1624, comprising a memory subsystem 1626 and a file storage subsystem 1628, user interface input devices 1622, user interface output devices 1620, and a network interface subsystem within a communication module 1616. The input and output devices allow user interaction with the computer system. Communication module 1616 provides physical and communication protocol support for interfaces to outside networks, including an interface to communication network 1604, and is coupled via communication network 1604 to corresponding communication modules in other computer systems. Communication network 1604 may comprise many interconnected computer systems and communication links. These communication links may be wireline links, optical links, wireless links, or any other mechanisms for communication of information, but typically consist of an IP-based communication network, at least at its extremities. While in one embodiment, communication network 1604 is the internet, in other embodiments, communication network 1604 may be any suitable computer network.

The physical hardware components of network interfaces are sometimes referred to as network interface cards (NICs), although they need not be in the form of cards; for instance, they could be in the form of integrated circuits (ICs) and connectors fitted directly onto a motherboard, or in the form of macrocells fabricated on a single integrated circuit chip with other components of the computer system.

User interface input devices 1622 may include a keyboard, pointing devices such as a mouse, trackball, touchpad, or graphics tablet, a scanner, a touch screen incorporated into the display (including the touch sensitive portions of large format digital display 1302*c*), audio input devices such as voice recognition systems, microphones, and other types of tangible input devices. In general, use of the term "input device" is intended to include all possible types of devices and ways to input information into the computer system or onto communication network 1604.

User interface output devices 1620 may include a display subsystem, a printer, a fax machine, or non-visual displays such as audio output devices. The display subsystem can include a cathode ray tube (CRT), a flat panel device such as a liquid crystal display (LCD), a projection device, or some other mechanism for creating a visible image. In the embodiment of FIG. 13, it includes the display functions of large format digital display 1302*c*. In general, use of the term "output device" is intended to include all possible types of devices and ways to output information from the computer system to the user or to another machine or computer system.

Storage subsystem 1624 stores the basic programming and data constructs that provide the functionality of certain embodiments of the technology disclosed. The storage subsystem 1624 includes computer program instructions implementing a Spatial Event Map collaboration system client, or a Spatial Event Map collaboration system server, and can include logic for modules such as "viewports" and "viewport markers."

The storage subsystem 1624 when used for implementation of server side network-nodes, comprises a product including a non-transitory computer readable medium storing a machine readable data structure including a Spatial Event Map which locates events in a workspace, wherein the Spatial Event Map includes a log of events, entries in the log having a location of a graphical target of the event in the workspace and a time. Also, the storage subsystem 1624 comprises a product including executable instructions for performing the procedures described herein associated with the server-side network node.

The storage subsystem 1624 when used for implementation of client side network-nodes, comprises a product including a non-transitory computer readable medium storing a machine readable data structure including a Spatial Event Map in the form of a cached copy as explained below, which locates events in a workspace, wherein the Spatial Event Map includes a log of events, entries in the log having a location of a graphical target of the event in the workspace and a time. Also, the storage subsystem 1624 comprises a product including executable instructions for performing the procedures described herein associated with the client-side network node.

For example, the various modules implementing the functionality of certain embodiments of the technology disclosed may be stored in storage subsystem 1624. These software modules are generally executed by processor subsystem 1614.

Memory subsystem 1626 typically includes a number of memories including a main random access memory (RAM) 1630 for storage of instructions and data during program execution and a read only memory (ROM) 1632 in which fixed instructions are stored. File storage subsystem 1628 provides persistent storage for program and data files, and may include a hard disk drive, a floppy disk drive along with associated removable media, a CD ROM drive, an optical drive, or removable media cartridges. The databases and modules implementing the functionality of certain embodiments of the technology disclosed may have been provided on a computer readable medium such as one or more CD-ROMs, and may be stored by file storage subsystem 1628. The host memory subsystem 1626 contains, among other things, computer instructions which, when executed by the processor subsystem 1614, cause the computer system to operate or perform functions as described herein. As used herein, processes and software that are said to run in or on "the host" or "the computer," execute on the processor subsystem 1614 in response to computer instructions and data in the host memory subsystem 1626 including any other local or remote storage for such instructions and data.

Bus subsystem 1612 provides a mechanism for letting the various components and subsystems of a computer system communicate with each other as intended. Although bus subsystem 1612 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format digital display 1302*c*. Due to the ever-changing nature of computers and networks, the description of computer system 1410 depicted in FIG. 16 is intended only as a specific example for purposes of illustrating the preferred embodiments of the technology disclosed. Many other configurations of the computer system are possible having more or less components than the computer system depicted in FIG. 16. The same components and variations can also make up each of the other devices 1302 in the collaboration environment of FIG. 14, as well as the collaboration server 1405 and display database 1406.

Application Programming Interface (API)

Aspects of an application program interface (API) supporting use of Spatial Event Maps are set out here for the purposes of providing an example of technology to implement the techniques described herein.

An example of components of an API supporting the Spatial Event Map processes described herein is provided.

Message Structure

The first element of each message array is a sender-id, specifying the client that originated the message. Sender-ids are unique among all sessions on the server. The id and cr messages sent from the server to the client have their sender-id set to a default value, such as −1. The second element of each message array is a two-character code. This code defines the remaining arguments in the array as well as the intended action. Messages sent with a sender-id of −1 are messages that originate from the server.

Message Types

The following messages types are officially supported.

| | |
|---|---|
| 1) cs | Change Session |
| 2) echo | Echo |
| 3) error | Error |
| 4) id | Client Id |
| 5) jr | Join Room |
| 6) rl | Room List |
| 7) un | Undo |
| 8) up | User Permissions |
| 9) vc | Viewport Change |
| 10) he | History Event |
| 11) ve | Volatile Event |
| 12) disconnect | Disconnect |
| 13) ls | List Streams |
| 14) bs | Begin Stream |
| 15) es | End Stream |
| 16) ss | Stream State |
| 17) oid | Object Id Reservation |

Change Session (cs)

Inform a client or siblings in a display array that the workspace has changed. The server sends this message to the client when it receives a request to send a workspace to a wall.

// server-->client
[sender-id, "cs", workspaceId]
   sender-id always −1 (indicating the server initiated the message)
   workspaceId (string) is the id of the workspace to switch to Echo (echo)

Echoes an optional body back to the originating client. Used to verify that the socket connection and the server are still healthy.

// client-->server
[sender-id, "echo", "foo", "bar" . . . ]
// server-->client
[−1, "echo", "foo", "bar" . . . ]

After "echo" the message can take any arguments. They will all be echoed back to the client unaltered if the service and the client's socket connection are healthy. When using the echo message to verify socket health we recommend the following:

Wait at least 5 seconds between echo messages
   Require 2 consecutive echo failures before assuming network or server problems This message was added to the protocol because the current implementation of WebSockets in Chrome and other supported browsers do not correctly change readyState or fire onclose when network connection dies.

Error (error)

Informs clients of an error on the server side.
// server-->client
["−1", "error", target-id, message]
   target-id the guide for the object in the session that the error affects
   message a message about the error.

This message is only sent by the server and currently only used when an upload fails during asynchronous processing.

Client Id (id)

The server sends this message when the client connects to the socket. Clients are required to store the assigned client identification for use in subsequent socket requests.
// server-->client
["−1", "id", client-id]
   client-id (string) the ID of the newly-joined client Join Room (jr)

Rooms are communication channels that a client can subscribe to. There can be channels for specific workspaces (sessions), for display arrays, or potentially for other groups of clients. The server repeats/sends messages to all the clients connected to a specific room as events happen in that room. A client joins a room to get messages for that display array or workspace (session). There are several types of join room requests.

General Join Room (jr)

Join any room if you know the id.
// server<--client
[sender-id, "jr", room-id, [data]]
   room-id can contain one of lobby or workspace-id
   data is a wildcard set of arguments, which should be used to initialize the room.

Lobby Join Room (jr)

Joins the lobby channel. Used by clients that wish to keep a web socket open while not displaying a workspace.
// server<--client
[sender-id, "jr", "lobby"]

Session Join Room (jr)

Joins the room for a specific workspace (session).
// server<--client
[sender-id, "jr", "session", workspace-id]
   workspace-id the id of the workspace (workspace)

Array Join Room (jr)

Joins the room for a specific display array.
// server<--client
[sender-id, "jr", "array",
   arrayId: "myArrayId",
   x: 0,
   y: 0,
   width: 1920,
   height: 1080
}]
   arrayId (string) id of the display array
   x (integer) x offset of this display
   y (integer) y offset of this display
   width (integer) width of this display
   height (integer) height of this display Room Join Response:
The server responds to successful room join (jr) messages with a room message.
General Room
// server-->client
["−1", "room", [room-id], [databag]]
   room-id contains one of: lobby or workspace
   databag is a room-specific bag of variables:
Lobby Room
// server-->client
["−1", "room", "lobby", {pin: pin-code}]
   pin containing the pin for wall authentication
Session Room
// server-->client
["−1","room","session",{"uid":
   "SU5DVpxbfnyGCesijBou","name":"Dec 16 Release","sharing link":"https://portal.Bluescape.com/sessions/1357/shares"}]"
   'uid' the id of the workspace
   'name' the name of the workspace to show in the client
   'sharing link' a link to the portal page where a user can share this workspace with others
Room List (rl)
Informs the client of the room memberships. Room memberships include information regarding clients visiting the same room as you.
// server-->client
["−1", "rl", roomMembershipList]
   roomMembershipList (array of room membership objects)
A room membership object is a hash with the following keys
   name User or device name
   device_type The type of device the user is on, currently wall or other. (Deprecated)
   clientId The clientId of this device
   clientType The type of client (browser, ipad, or wall)
   viewport (optional) If the client provides a viewport rect the server will repeat it to all clients.
Undo (un)
Undoes the last undo-able action (move, set text, stroke, etc.).
// server<--client
[sender-id, "un", region-id]
// server-->client
[client-id, 'undo', target-id, removedEventId]
Undo Example: Move a Window and then Undo that Move
The following example shows a move, and how that move is undone.
// Client sends move
["5122895cff31fe3509000001","he",
   "5122898bff31fe3509000002","position", {
      "rect":[257,357,537,517],
      "order":2
   }]
// Server response
["5122895cff31fe3509000001","he",
   "5122898bff31fe3509000002",
   "5122898efde0f3350900000 8","position",{
      "rect":[257,357,537,517]
      ,"order":2
   }]
// Client sends undo [<clientId>, 'un', <canvasRegionId>]
   ["5122895cff31fe3509000001","un",null]
// Server response
// [<clientId>, 'undo', <targetId>, <removedMessageId>]
["−1","undo","5122898bff31fe3509000002",
   "5122898efde0f33509000008"]

The server removes the history event from the workspace history and notifies all clients subscribed to the room that this record will no longer be a part of the workspace's historical timeline. Future requests of the history via the HTTP API will not include the undone event (until we implement redo).
User Permissions (up)
Gets the permissions that the current user has for this workspace. Only relevant when a client is acting as an agent for a specific user not relevant when using public key authentication (walls).
// server-->client
[sender-id, "up", permissions]
   Permissions a hash of permission types and true/false to indicate if the authenticated user has that permission. Currently the only permission is "can share" indicating users who can share the workspace with others.
Viewport Change
Updates other clients in a session that one client's viewport has changed. This is designed to support the "jump to user's view" and "follow me" features. Clients must send a "vc" upon entering a session for the first time. This ensures that other clients will be able to follow their movements. When processing incoming "vc" events, clients must keep a cache of viewports, keyed by client identification. This is in order to handle occasions where room list membership (rl) events with missing viewports arrive after associated "vc" events. A change in a target viewport to a revised target viewport can include a change in the size of the viewport in one or the other dimension or both, which does not maintain the aspect ratio of the viewport. A change in a target viewport can also include a change in the page zoom of the viewport. When subject client-side viewports in "jump to user's view" or "follow-me" mode receive a first "vc" record, it is an instruction for mapping a displayable area of the subject client-side viewport to the area of a target viewport. A subsequent "vc" record results in a remapped displayable area of the subject client-side viewport to the target viewport. When the "jump to user's view" or "follow me" feature is disabled, the subject client-side viewport returns to its prior window.
// server<-->client
[sender-id, "vc", viewport-rect]
   viewport-rect an array in the form [x1, y1, x2, y2] representing the section of the workspace viewable on the sending client.
Historical/History Event (he)
History events are pieces of data that are persisted to the database. Any information that is necessary for recreating a visual workspace should be sent to the collaborative service via "he" messages.

EXAMPLES

Creation of notes, images, and other widgets
Moving widgets
Setting or updating attributes of widgets (e.g. note text, marker locations)
Deleting widgets
When the server receives a history event it does the following:
Assign the event an unique id
Persist the event to the database
Broadcast the event, with its id, to all clients connected to the workspace Establishing an Attachment Relationship record
Updating an Attachment Relationship record
History Event Basic Message Format
  // server<--client
  [client-id, "he", target-id, event-type, event-properties]
    client-id (string) the ID of the originating client
    target-id (string) the ID of the target object/widget/app
      to which this event is relevant
    event-type (string) an arbitrary event type
    properties (object) a JSON object describing pertinent
      key/values for the event
        regionId (string) the canvas region identifier if the
          object is created in a canvas region (optional, will
          be included if it was included in the history event
          sent by the client)
All properties included in a message will be stored on the server and echoed back to clients. They will also be included in the history sent over http.
  // server-->client
  [client-id, "he", target-id, event-id, event-type, event-properties]
    client-id (string) the ID of the originating client
    target-id (string) the ID of the target window to which
      this event is relevant
    event-id (string) the ID of the event in the database
    event-type (string) an arbitrary event type
    properties (object) a JSON object describing pertinent
      key/values for the event, including a time value
        regionId (string) the canvas region identifier if the
          object is created in a canvas region (optional, will
          be included if it was included in the history event
          sent by the client)
Batch History Events
In order to ensure ordering of tightly coupled events, many can be sent in a batch message by changing the event payload to be an array of event payloads.
  // server<--client
  [client-id, "bhe", [event1, event2, event3, event4]]
In this case, each event is a packet sent as a standard web socket history message.
  The event structure is:
  [targetId, eventType, props]
  So, the clientId portion is not repeated, but all else is as a standard event.
Example History Event Types
  create Add a widget to the workspace
  delete Remove the widget from the workspace
  position Update the size or location of the widget in the
    workspace
  template Change a card template (background color)
  membership Update the target children. Used for groups.
  pin Pin or unpin a widget
  stroke Add a pen or eraser stroke to a widget
  text Sets or update the text and/or text formatting of a
    note.
  markercreate Creates a location marker
  markermove Moves an existing location marker
  markerdelete Deletes an existing location marker
  tsxappevent Used for creating, deleting, and updating tsx
    widgets such as web browsers
  navigate Used for navigating to different page inside
    group documents (MS docs/PDF)
  attachment relationship create Used for establishing an
    attachment relationship record.
  attachment relationship update Used for changing an
    attachment relationship record.

Widgets And History Events Table

| | note | image | Work-space | web browser | location marker | pdf | group | doc |
|---|---|---|---|---|---|---|---|---|
| create | X | X | | | * | X | X | X |
| delete | X | X | | | * | X | X | X |
| position | X | X | | | * | X | X | X |
| template | X | | | | | | | |
| membership | | | | | | | X | |
| pin | X | X | | | | X | | X |
| stroke | X | X | X | | | | | |
| text | X | | | | | | | |
| markercreate | | | | | X | | | |
| markermove | | | | | X | | | |
| markerdelete | | | | | X | | | |
| tsxappevent | | | | X | | | | |
| navigate | | | | | | | | X |

*The browser client supports receiving alternative versions of these messages but does not send them out to other clients History Event Details
Comments
Comments are stored in the history database, but are associated with a particular object rather than a position on the plane.
  // client-->server
  [client-id, "he", target-id, "create",{
    "id":"5123e7ebcd18d3ef5e000001",
    "type":"comment",
    "text":"text of the comment",
    "parent":"5123 e7ebcd18d3 ef5e000000" 1]
  Server will append 'name' to the body of the comment into the props object. The parent prop is optional and is an id
  [client-id, "he", comment-id, "delete"}]
  [client-id, "he", comment-id, "text", {"text":"text of the comment"}]
Create
Clients send "create" to the collaboration server to add a widget to a workspace. For "create" messages the target-id is the id of the containing element, usually the workspace-id.

Generic Widget Create Example

// client-->server
  [client-id, "he", workspace-id, "create", {
    "id":"5123e7ebcd18d3ef5e000001",
    "type":"widget",
    "regionId":null
  }]
    Props
      id (string) unique identifier for the widget
      type (string) the type of widget
      regionId (string) the canvas region if the object is
        created in a canvas region
    Most widgets will also have a location property, usually a rect and order, but potentially a point or other representation.

Card Create Example

// client-->server
  [client-id, "he", workspace-id, "create", {
    "id":"5123e7ebcd18d3ef5e000001",
    "baseName":"sessions/all/Teal",
    "ext":"JPEG",
    "rect":[-1298,-390,-1018,-230],
    "actualWidth":560,
    "actualHeight":320,

```
"order":4,
"type":"note",
"regionId":null,
"hidden":false,
"text":"some text for the note",
"styles": {
   "font-size":"42px",
   "font-weight":"400",
   "text-transform":"inherit"
  }
}]
```
  Props
    id (string) unique identifier for the window
    baseName (string) the background image file name
    ext (string) the background image file extension
    rect (object) the location of the window
    actualWidth (int) the background image width in pixels
    actualHeight (int) the background image height in pixels
    order (int) z order
    type (string) "note" for objects that can have text, "image" for other objects
    regionId (string) the canvas region if the object is created in a canvas region
    hidden (boolean) whether the window is currently hidden
    text (string) the text contained in the note (optional)
    styles (object) style for the text contained in the note (optional)

PDF Create Example

```
// server-->client
[client-id,
  "he",
  target-id,
  event-id,
  "create",
  {"type":"pdf",
    "id":"5307ec25a294d9250bf65fce",
    "assetPath":"sessions/objects/
      s7t6mNHxfpqWxAYqYXLF/
      5307ec25a294d9250bf65fce.pdf",
    "rect":[1770,284,2994,1076],
    "actualWidth": 1224,
    "actualHeight": 792,
    "filename":"5617_FSPLT1_018078.pdf",
    "title":"Record of Decision",
    "hidden":false,
    "pin":false
    "pages":73}]
```
      Props
        type (string) "pdf"
        id (string) unique identifier for the pdf
        assetPath (string) the location of this asset on the asset server. Use configuration service to get the asset base path.
        rect (object) the location of the window in the workspace
        actualWidth (int) the width of the widest page in the pdf, combined with actualHeight to build "bounding box"
        actualHeight (int) the height of the tallest page in the pdf, combined with actualWidth to build "bounding box"
        filename (string) the original file name of the pdf
        order (int) z order
        hidden (boolean) whether the window is currently hidden
        pin (boolean) whether the pdf is pinned in one location on the workspace
        regionId (string) the canvas region if the object is created in a canvas region (optional)

Group Create Example

```
// client "→server
[client "id,
  "he"
  target-id,
  "create",
  {"type":"group",
  -id":"S3aS2b392S8f62fce",
  -children": [ ]}]
```
    Props
      type (string) "group"
      id (string) unique identifier for the group
      children (array) array of target-id's of widgets that should be part of the group

Generic Group Position Example

```
// client-->server
[client-id, he, groupid, 'position', {"rect": [0, 0, 0, 0],
  "order":4}]
```
    Props
      rect (object) The rect of the group. Specified as x1, y1, x2, y2.
      order (int) the z-order of the target group
  Membership
  Replaces the target object's children. Used for grouping items.
```
// server<--client
[client-id, "he", target-id, "membership", {"children":
  [53a52b39250f62fce, 53a52b39250f62fce]}]
// server-->client
[client-id, "he", target-id, event-id, "membership", {"children": [53a52b39250f62fce, 53a52b39250f62fce]}]
```
    Properties
      children (array) Required. An array containing at least one widget ID to include in the group. To remove all children, a delete message should be used instead.

Group Document Create Example

```
// server-->client
[client-id,
  "he",
  target-id, // group document id
  event-id,
  "create",
  {
    "type":"document",
    "rect":[x1,y1,x2,y2]
    "maxWidth":123,
    "maxHeight":456,
    "layout":"stacked",
    "title":"title of this document",
    "assetURL":"xxx/xxx/xxx.docx",
    "hidden": true,
```

"pin": false,
"activeChildId":"id1838094221",
"children": [
"id0398749123",
"id1838094221",
"id2849239042",
"id3849012830"]}]
  Properties
    type (string) "groupdocument"
    activeChildId (string) active child Id, such as currently displayed page of PDF/Doc
    children (array) array of child(page) object IDs, array order represents the child(page) order.
    layout (string) Define the client layout to render this group document.

Presentation Create Example

// client-->server
[client-id,
"he",
target-id,
"create",
{"type":"presentation",
"id":"53a52b39250f62fce",
"children": [ ]}]
  Props
    type (string) "presentation"
    id (string) unique identifier for the group
    children (array) array of target-id's of widgets that should part of the presentation in order of presentation Presentation Create Example // server-->client
[client-id,
"he",
target-id, // presentation id
event-id,
"create",
{
"type":"presentation",
"children": [
"id0398749123",
"id1838094221",
"id2849239042",
"id3849012830"]}]
  Props
    type (string) "presentation"
    children (array) array of child(page) object IDs, array order represents the child(page) order.
Delete
  Removes a widget from a workspace.
  // server<--client
  [client-id, "he", target-id, "delete", {"hidden":true}]
  // server-->client
  [client-id, "he", target-id, event-id, "delete", {"hidden": true}]
Position
  Used to save the position of a widget after a move, fling, resize, etc.

Generic Widget Position Example

// server<--client
[client-id, "he", target-id, "position", {new-position}]
// server-->client
[client-id, "he", target-id, event-id, "position", {new-position}]
  Props
    new-position (object) some way to represent the new position of the object. See the window example.

Generic Window Position Example

// server<--client
[client-id, "he", target-id, "position", {"rect":[−1298,−390,−1018,−230],"order":4}]
// server-->client
[client-id, "he", target-id, event-id, "position", {"rect":[4298,−390,−1018,−230],"order":4}]
  Props
    rect (object) the location of the target window. Specified as x1, y1, x2, y2
    order (int) the z-order of the target window
Template
  Used to change the template for a note. This allows changing the background color.

Note Template Example

// server-->client
[client-id, "he", workspace-id, event-id, "template", {"baseName":"sessions/all/Beige"}]
  Props
    baseName (string) the file name of the new background. The file must be already on the collaboration server. The list of templates is available via the http-protocol at /card_templates.json
  Used to pin a widget and prevent users from moving or resizing that widget. Also used to remove an existing pin.

Generic Widget Position Example

// server-->client
[client-id, "he", workspace-id, event-id, "pin", {"pin": true}]
  Props
    pin (boolean) true is pin, false is un-pin
Stroke
  Used to add a stroke to a widget or to the workspace background.

Generic Stroke Example

// server<--client
[client-id, "he", target-id, "stroke", {
"size": 10,
"brush": 1,
"color": [255, 153, 0, 1],
"locs": [850, 616, 844, 617],
"regionId": 59.1
}]
// server-->client
[client-id, "he", target-id, event-id, "stroke", {
"size": 10,
"brush": 1,

```
"color": [255, 153, 0, 1],
"locs": [850, 616, 844, 617],
"regionId": 59.1
}]
```
Props
- size (integer) diameter of the stroke using the coordinate space of the containing object. Strokes on the canvas are sized in world space, while strokes on widgets are sized in their parent widget space.
- brush (integer) the brush type to use when rendering the stroke. 1 is the draw brush, while 2 is the erase brush.
- color (numbers) r/g/b/a values for the color of the stroke. Ignored for erase strokes (although may still be present).
- locs (array) stroke locations in the format: [10, 1, 10, 2, 12, 3] where coordinates are paired [x, y, x, y, x, y, . . . ] in an array. Similar to size, locations are in the coordinate space of the containing object.
- regionId (string) the canvas region if the stroke is created in a canvas region (optional).

Rendering note: strokes should be rendered with end caps centered on the first and last points of the stroke. The end cap's diameter should be equal to the brush size. Rendering end caps is the responsibility of each client.

Text

Set the text and style of text on a widget. Both the text attribute and style attribute are optional.

Generic Text Example

```
// server<--client
[client-id, "he", target-id, "text", {
    "text":"abcdef",
    "styles":   {"font-size":"42px", "font-weight":"400", "text-transform":"inherit" }
}]
// server-->client
[client-id, "he", target-id, event-id, "text", {
    "text":"abcdef",
    "styles": {
        "font-size":"42px",
        "font-weight":"400",
        "text-transform":"inherit"
    }
}]
```
Props
- text (string) the text string to show on the widget
- styles (hash) the css styles to apply to the text Markercreate Creates a location marker (map marker, waypoint) at a specific place in the workspace.

Example

```
// server<--client
[client-id, "he", new-widget-id, "markercreate", {
    "creationTime":1387565966,
    "name":"my marker",
    "y":1828,
    "x":-875,
    "color":0
}]
// server-->client
[client-id, "he", new-widget-id, event-id, "markercreate",
{
    "creationTime":1387565966,
    "name":"my marker",
    "y":1828,
    "x":-875,
    "color":0
}]
```
Props
- creationTime (int) the creation time (unix time)
- name (string) a label for the location marker
- y (number) the y location of the marker
- x (number) the x location of the marker
- template (string) the marker template name Alternative Form Accepted by Browser Client

```
// server<--client
[client-id, "he", session-id, "create", {
    "id":"52b0f86ac55697ad30003b21"
    "type":"locationMarker",
    "creationTime":1387565966,
    "name":"my marker",
    "y":1828,
    "x":-875,
    "template":"red"
}]
// server-->client
[client-id, "he", session-id, event-id, "create",{
    "id":"52b0f86ac55697ad30003b21"
    "type":"locationMarker",
    "creationTime":1387565966,
    "name":"my marker",
    "y":1828,
    "x":-875,
    "template":"red"
}]
```

Markermove

Moves an existing location marker (map marker, waypoint) to a new place in the workspace.

Example

```
// server client
[client-id, "he", marker-id, "markermove", {
    "y":1828,
    "x":-875,
}]
// server-->client
[client-id, "he", marker-id, event-id, "markermove",{
    "y":1828,
    "x":-875,
}]
```
Props
- y (number) the y location of the marker
- x (number) the x location of the marker Alternative Form Accepted by Browser Client

```
// server<--client
[client-id, "he", target-id, "position",{
    "y":1828,
    "x":-875,
}]
// server-->client
[client-id, "he", target-id, event-id, "position",{
    "y":1828,
    "x":-875,
}]
```

Markerdelete

Delete an existing location marker.

Example

```
// server client
[client-id, "he", marker-id, "markerdelete", { }]
// server-->client
[client-id, "he", marker-id, event-id, "markerdelete", { }]
```
Alternative Form Accepted by Browser Client
```
// server<--client
[client-id, "he", target-id, "delete", {
    "hidden":true,
}]
// server-->client
[client-id, "he", target-id, event-id, "delete", {
    "hidden":true,
}]
```
TSXappevent TSXappevent sends a history event to various widgets on the tsx system.

Example

```
// server<--client
[client-id, "he", target-id, "tsxappevent",{
    "payload":
    {
        additional-properties
    },
    "messageType":message-type,
    "targetTsxAppId":tsx-app-id
}]
// server-->client
[client-id, "he", target-id, event-id, "tsxappevent", {
    "payload":
    {
        additional-properties
    },
    "messageType":message-type,
    "targetTsxAppId":tsx-app-id
}]
```
Props
payload (object)
messageType (string) the properties necessary for this tsxappevent the type of message Example of Creating a Web Browser
```
// server<--client
[client-id,"he",new-browser-id,"tsxappevent",{
    "payload":{
        "y":709,
        "x":1517,
        "worldSpaceWidth":800,
        "worldSpaceHeight":600,
        "windowSpaceWidth":800,
        "windowSpaceHeight":600,
        "version":1,
        "url":"http:// www.google.com/",
        "order":735880
    },
    "messageType":"createBrowser",
    "targetTsxAppId":"webbrowser"
}]
// server-->client
[client-id,"he",new-browser-id, event-id, "tsxappevent",
    "payload":{
        "y":709,
        "x":1517,
        "worldSpaceWidth":800,
        "worldSpaceHeight":600,
        "windowSpaceWidth":800,
        "windowSpaceHeight":600,
        "version":1,
        "url":"http:// www.google.com/",
        "order":735880
    },
    "messageType":"createBrowser",
    "targetTsxAppId":"webbrowser"
}]
```
Props
payload (object) details needed for creating a browser
x (number) the x location of the marker
y (number) the y location of the marker
worldSpaceWidth (number) the width in world space
worldSpaceHeight (number) the height in world space
windowSpaceWidth (number) the width in window space
windowSpaceHeight (number) the height in window space
version (number) #TODO
url (number) the url this browser widget should point to messageType *(string) "createBrowser" for creating browsers targetTsxAppId *(string) "webbrowser" for web browser widgets Example of Deleting a Web Browser
```
// client-->server
[client-id,"he",target-id,"tsxappevent",{
    "messageType":"deleteBrowser",
    "targetTsxAppId":"webbrowser",
    "payload": {"version":1}
}]
```
Navigate Example of navigating to a different item in the payload. One could use this for example for a browser widget navigating to an URL.
```
[
client-id,
"he",
target-id, // Group/presentation or maybe Browser URL ID
"navigate",
payload // navigate to this page
]
```
Volatile Event (ve)

Volatile events are not recorded in the database, so they are good for in-progress streaming events like dragging a card around the screen, and once the user lifts their finger, a history event is used to record its final place.

Volatile Event Basic Message Format
```
// server<-->client
[client-id, "ve", target-id, event-type, event-properties]
```
client-id (string) the ID of the originating client
target-id (string) the ID of the target window to which this event is relevant
event-type (string) an arbitrary event type
properties (object) a JSON object describing pertinent key/values for the event Example Volatile Event Types
sb Begins a new stroke.
sc Continues a previously started stroke.
se Ends a stroke position Used to share a position with other clients that should not be persisted. For example show a window being dragged in real time.

bf Begin Follow: User A begins to follow User B. Used to notify User A that user B is following.

of End Follow: User B is no longer following user A. Used to notify user A that user B is no longer following.

| Volatile events by Widget type | | | |
| --- | --- | --- | --- |
|  | card | image | Workspace |
| sb | X | X | X |
| sc | X | X | X |
| se | X | X | X |
| position | X | X |  |
| bf |  |  | X |
| ef |  |  | X |

Workspace
  sb Starts a stroke. Used to render strokes on one client while they are being drawn on another client.
  sc Continues a previously started stroke by giving another point to include. Used to render strokes while they are being drawn on another client.
  se Ends a previously started stroke.
  bf Begin Follow: User A begins to follow User B. Used to notify User A that user B is following.
  of End Follow: User B is no longer following user A. Used to notify user A that user B is no longer following.
Note
  position Live updates the position of a note while it is being moved by another user.
  sb Starts a stroke. Used to render strokes on one client while they are being drawn on another client.
  sc Continues a previously started stroke by giving another point to include. Used to render strokes while they are being drawn on another client.
  se Ends a previously started stroke.
Image
  position Live updates the position of an image while it is being moved by another user.
  sb Starts a stroke. Used to render strokes on one client while they are being drawn on another client.
  sc Continues a previously started stroke by giving another point to include. Used to render strokes while they are being drawn on another client.
  se Ends a previously started stroke.
Volatile Event Details
The following fields are properties of several volatile events.
  stroke-id Stroke-IDs are selected by the client. Currently they are the sender-id composed with an increasing integer, separated by a dot. This is to make it unique within the server context among all clients.
  target-id A stroke may be attached to a specific target (container) in the workspace. In the case of a stroke belonging to a widget, the target identification field would contain the ID of the widget. Strokes destined for the main canvas in the workspace are designated by having their target identification be the same as the workspace identification.
Position—ve
Used to broadcast intermediate steps of a window moving around the workspace.

Generic Position Example

// server<-->client
[client-id, "ve", target-id, "position", {position-info}]
  Props
    position-info—information about the widget's new position Window Position Example // server<-->client
[client-id, "ve", target-id, "position", {"rect":[-1298,-390,-1018,-230],"order":4}]
  Props
    rect (object) the location of the target window
    order (int) the z-order of the target window
Stroke Begin (sb)
  Used to broadcast the beginning of a stroke to the other clients.
  // server<-->client
  [client-id, "ve", target-id, "sb", {
    "brush":1,
    "size":2,
    "color":[214,0,17,1],
    "x":100,
    "y":300,
    "strokeId":"395523 d316e942b496a2c8a6fe5f2cac"
  }]
    Props
      x,y (int) the starting point of this stroke
      strokeId (string) the ID of the new stroke
Stroke Continue (sc)
  Continues the stroke specified by the stroke identification.
  // server<-->client
  [client-id, "ve", target-id, "sc", {"x":100, "y":300, "strokeId":"395523d316e942b496a2c8a6fe5f2cac"}]
    Props
      x,y (int) the new end-point of the stroke
      strokeId (string) the ID of the new stroke
Stroke End (se)
  Ends the stroke specified by stroke-id.
  // server<-->client
  [client-id, "ve", target-id, "se", {"strokeId": "395523d316e942b496a2c8a6fe5f2cac"}]
    stroke-id (string) the ID of the continued stroke
Begin Follow (bf)
  Begin Follow: User A begins to follow User B. Used to notify User A that user B is following. For this global volatile event, the target identification is the session identification. The user being followed will update the UI to indicate that user B is following.
  // server<-->client
  [follower-client-id, "ve", session-id, "bf", {"clientId": "395523d316e942b496a2c8a6fe5f2cac"}]
    Props
      clientId (string) the ID of the client being followed
End Follow (ef)
  End Follow: User B is no longer following user A. Used to notify user A that user B is no longer following. For this global volatile event, the target identification is the session identification. The user being followed will update the UI to indicate that user B is no longer following. If user B leaves the session, user A will receive a room list message which does not contain user B. User A's room list will then be rebuilt, no longer showing user B as a follower.

// server<-->client
[follower-client-id, "ve", session-id, "ef", {"clientId": "395523d316e942b496a2c8a6fe5f2cac"}]
   Props
      clientId (string) the ID of the client no longer being followed Example Interaction: Moving Objects A good example illustrating some of the history event/volatile event-related changes is moving an object. While the object is being moved/resized by dragging, a series of volatile events ("ve" s) is sent to the server, and re-broadcast to all clients subscribed to the workspace:
   // client sends the following volatile events during the move
   // client→server format is: [<clientId>, <messageType>, <targetId>, <eventType>, <messageProperties>]
   ["511d6d429b4aee0000000003","ve",
      "511d6f9c9b4aee0000000039","position",{
      "rect":[-493,73,-2,565],
      "order":0
   }b 1]
   ["511d6d429b4aee0000000003","ve",
      "511d6f9c9b4aee0000000039","position",{
      "rect":[-493,73,-2,565],
      "order":0
   }]
   ["511d6d429b4aee0000000003","ve",
      "511d6f9c9b4aee0000000039","position",{
      "rect":[-538,91,-47,583],
      "order":0
   }]
   ["511d6d429b4aee0000000003","ve",
      "511d6f9c9b4aee0000000039","position",{
      "rect":[-538,91,-47,583],
      "order":0
   }]

Once the user finishes moving the object, the client should send a history event to specify the rect and order of the object:
   ["511d6d429b4aee0000000003","he",
      "511d6f9c9b4aee0000000039","position",{
      "rect":[-492,73,-1,565],
      "order":0
   }]

The server will respond with the newly persisted "he" record. Note the inclusion of the record's event identification.
   // server→client format of 'he' is: [<clientId>, <messageType>, <targetId>, <eventId>,
   // <eventType>, <messageProps>]
   ["511d6d429b4aee0000000003","he",
      "511d6f9c9b4aee0000000039",
      "511d9165c422330000000 253","position",{
      "rect":[-492,73,-1,565],
      "order":0
   }]

Note: The event identification will also be included in history that is fetched via the HTTP API.

Disconnect (disconnect)

Inform other app instances opened by the same user to close their connection and cease reconnect attempts. This is consumed by browser clients in order to prevent the "frantic reconnect" problem seen when two tabs are opened with the same workspace.

// server-->client
[-1, "disconnect"]

List Streams (ls)

Inform a client of the current streams in a list. Triggered by other events, similar to a room list.
   // server-->client
   [send-id, "ls", [Stream List for Session]]
      sender-id always -1 (indicating the server initiated the message)
Stream list is an array of objects, each of which contains the following fields:
   sessionId (string) is the id of the workspace containing the conference
   conferenceId (string) the id of the conference session all users in this workspace connect to
   clientId (Object ID) the ID of the client broadcasting this particular stream
   streamId (string) the ID of this particular AV stream Begin Stream (bs)

Informs the server of a new AV stream starting. The server responds with a List Streams message.
   // server<--client
   [sender-id, "bs", conferenceId, conferenceProvider, streamId, streamType]
      sender-id clientID of the user starting the stream
      conferenceId (string) the id of the conference session all users in this workspace connect to
      conferenceProvider (string) the type of conference, tokbox or twilio for example
      streamId (string) the ID of this particular AV stream
      streamType (string) audio, video or screenshare End Stream (es)

Informs the server of a new AV stream ending. The server responds with a List Streams message.
   // server<--client
   [sender-id, "es", conferenceId, streamId]
      sender-id clientID of the user starting the stream
      conferenceId (string) the id of the conference session all users in this workspace connect to
      streamId (string) the ID of this particular AV stream Stream State (ss)

Informs the server of an existing AV stream changing state. The server responds with a List Streams message.
   // server<--client
   [sender-id, "ss", streamId, streamType]
      sender-id clientID of the user starting the stream
      streamId (string) the ID of this particular AV stream
      streamType (string) audio, video or screenshare Object ID Reservation (oid)

Use this to create a new unique object id that is acceptable for creating new history events which create an object.
   "'javascript
   // server<--client
   [sender-id, "oid"]
Server responds with:
   // server-->client
   ["-1", 'oid', <new-object-id>]

The API described above provides one example message structure. Other structures may be utilized as well, as suits a particular implementation.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also, as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the technology disclosed may consist of any such feature or combination of features. In view of the foregoing description it will be evident to a person skilled in the art that various modifications may be made within the scope of the technology disclosed.

The foregoing descriptions of preferred embodiments of the technology disclosed has been provided for the purposes of illustration and description. It is not intended to be exhaustive or to limit the technology disclosed to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology disclosed. In addition, any and all variations described, suggested or incorporated by reference herein with respect to any one embodiment are also to be considered taught with respect to all other embodiments. The embodiments described herein were chosen and described in order to best explain the principles of the technology disclosed and its practical application, thereby enabling others skilled in the art to understand the technology disclosed for various embodiments and with various modifications as are suited to the particular use contemplated. It is intended that the scope of the technology disclosed be defined by the following claims and their equivalents.

As with all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the technology disclosed, and it will be understood that numerous additional steps for accomplishing other functions can be performed before, after and between those shown.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. It is contemplated that technologies described herein can be implemented using collaboration data structures other that the Spatial Event Map.

What is claimed is:

1. A method for operating a server node including a processor, the method comprising:
providing, to a client node, at least part of a log of entries, the provided part of the log identifying:
(i) a location of a predefined canvas within a virtual workspace, the predefined canvas being represented by a marker associated with coordinates and spatial dimensions of the predefined canvas and representing the predefined canvas within the virtual workspace regardless of whether a client node that created the predefined canvas is connected to the virtual workspace,
(ii) objects, and
(iii) object locations in the virtual workspace;
wherein a defined area in the virtual workspace includes an object, and
wherein an entry in the log of entries provided to the client node comprises data specifying the location of the predefined canvas that is represented by the marker and that includes at least a portion of the defined area.

2. The method of claim 1, further comprising
storing metadata associated with a particular canvas within the virtual workspace.

3. The method of claim 2, wherein
the metadata includes an access list identifying users that are permitted to display objects having locations within the particular canvas.

4. The method of claim 2, wherein
the metadata includes an access list identifying client nodes that are permitted to display objects having locations within the particular canvas.

5. The method of claim 2, wherein
the metadata includes title of the particular canvas.

6. The method of claim 2, wherein
the metadata identifies one or more contextual menu items associated with the particular canvas.

7. The method of claim 2, wherein
the metadata includes a zoom-in indicator indicating that the client node is to display objects included in the particular canvas using a zoom-in level while still allowing the displayed objects to remain displayed by the client node in their entirety.

8. The method of claim 2, wherein
the metadata includes information that links the particular canvas to a different canvas that is within the virtual workspace and that is associated with the particular canvas.

9. A server node, the server node comprising:
a processor configured with logic to implement operations comprising:
providing, to a client node, at least part of a log of entries, the provided part of the log identifying:
(i) a location of a predefined canvas within a virtual workspace, the predefined canvas being represented by a marker associated with coordinates and spatial dimensions of the predefined canvas and representing the predefined canvas within the virtual workspace regardless of whether a client node that created the predefined canvas is connected to the virtual workspace,
(ii) objects, and
(iii) object locations in the virtual workspace;
wherein a defined area in the virtual workspace includes an object, and
wherein an entry in the log of entries provided to the client node comprises data specifying the location of the predefined canvas that is represented by the marker and that includes at least a portion of the defined area.

10. The server node of claim 9, wherein the operations further include:
receiving data identifying a particular canvas, the received data including metadata associated with the particular canvas, and including a location and dimensions, within the virtual workspace, of the particular canvas; and
adding a marker representing the particular canvas to a menu of markers.

11. The server node of claim 10, wherein:
the metadata includes an access list identifying users that are permitted to display objects having locations within the particular canvas; and
the operations further include prohibiting displaying of the objects having locations within the particular canvas when a user of the client node is not identified by the access list.

12. The server node of claim 10, wherein:
the metadata includes an access list identifying clients that are permitted to display objects having locations within the particular canvas; and
the operations further include prohibiting displaying of the objects having locations within the particular canvas when a client is not identified by the access list.

13. The server node of claim 10, wherein:
the metadata includes a title of the particular canvas; and
the operations further include providing data to allow the title of the particular canvas to be included in a menu of markers.

14. The server node of claim 10, wherein:
the metadata identifies a color corresponding to the particular canvas; and
the operations further include providing data to allow displaying, by the client node, of the marker representing the particular canvas in the color identified by the metadata.

15. The server node of claim 10, wherein:
the metadata identifies one or more contextual menu items associated with the particular canvas; and
the operations further include providing data to allow displaying, by the client node, of the one or more contextual menu items associated with the particular canvas.

16. The server node of claim 10, wherein:
the metadata includes a zoom-in indicator; and
the operations further include providing data to allow displaying of the objects included in the particular canvas using a zoom-in level while still allowing the displayed objects to remain displayed by the client node in their entirety.

17. The server node of claim 10, wherein the metadata includes information that links the particular canvas to a different canvas that is within the virtual workspace and that is associated with the particular canvas.

18. The server node of claim 9, wherein the processor is further configured with logic to implement operations comprising:
creating a canvas by:
obtaining information identifying an area in the virtual workspace that includes one or more displayed objects and defines the canvas; and
storing data representing the canvas, the stored data including metadata identifying a location and dimensions of the area within the virtual workspace that defines the canvas;
defining a marker associated with the canvas; and
transmitting data to other nodes, the transmitted data including the stored data representing the canvas and identifying the marker.

19. A non-transitory computer-readable recording medium having a program recorded thereon, the program, when executed by a server node including a processor, causing the server node to perform operations comprising:
providing, to a client node, at least part of a log of entries, the provided part of the log identifying:
(i) a location of a predefined canvas within a virtual workspace, the predefined canvas being represented by a marker associated with coordinates and spatial dimensions of the predefined canvas and representing the predefined canvas within the virtual workspace regardless of whether a client node that created the predefined canvas is connected to the virtual workspace,
(ii) objects, and
(iii) object locations in the virtual workspace;
wherein a defined area in the virtual workspace includes an object, and
wherein an entry in the log of entries provided to the client node comprises data specifying the location of the predefined canvas that is represented by the marker and that includes at least a portion of the defined area.

20. The non-transitory computer-readable recording medium of claim 19, wherein the operations further comprise storing metadata associated with a particular canvas within the virtual workspace.

21. The non-transitory computer-readable recording medium of claim 20, wherein:
the metadata includes an access list identifying users that are permitted to display objects having locations within the particular canvas; and
the operations further include prohibiting displaying of the objects having locations within the particular canvas when a user is not identified by the access list.

22. A method for operating a client node including a processor, the method comprising:
receiving, from a server node, at least part of a log of entries, the received part of the log identifying:
(i) a location of a predefined canvas within a virtual workspace, the predefined canvas being represented by a marker associated with coordinates and spatial dimensions of the predefined canvas and representing the predefined canvas within the virtual workspace regardless of whether a client node that created the predefined canvas is connected to the virtual workspace, (ii) objects, and (iii) object locations in the virtual workspace;

wherein a defined area in the virtual workspace includes an object, wherein an entry in the log of entries received from the server node comprises data specifying the location of the predefined canvas that is represented by the marker and that includes at least a portion of the defined area, and wherein the method includes displaying the object included in the defined area of the predefined canvas represented by the marker.

23. The method of claim 22, further comprising:

receiving data identifying a particular canvas, the received data including metadata associated with the particular canvas, and the metadata including a location and dimensions, within the virtual workspace, of the particular canvas; and adding a marker representing the particular canvas to a menu of markers.

24. The method of claim 23, wherein:

the metadata includes an access list identifying users that are permitted to display objects having locations within the particular canvas of the virtual workspace; and the method further includes prohibiting displaying of the objects having locations within the particular canvas of the virtual workspace when a user of the client node is not identified by the access list.

25. The method of claim 23, wherein:

the metadata includes an access list identifying client nodes that are permitted to display objects having locations within the particular canvas of the virtual workspace; and the method further includes prohibiting displaying of the objects having locations within the particular canvas of the virtual workspace when a client node is not identified by the access list.

26. The method of claim 23, wherein:

the metadata includes a title of the particular canvas of the virtual workspace; and the method further includes including the title of the particular canvas of the virtual workspace in a menu of markers.

27. The method of claim 23, wherein:

the metadata identifies a color corresponding to the particular canvas of the virtual workspace; and the method further includes displaying the marker representing the particular canvas of the virtual workspace in the color identified by the metadata.

28. The method of claim 23, wherein:

the metadata identifies one or more contextual menu items associated with the particular canvas of the virtual workspace; and the method further includes displaying the one or more contextual menu items associated with the particular canvas of the virtual workspace.

29. The method of claim 23, wherein:

the metadata includes a zoom-in indicator; and the method further includes displaying objects included in the particular canvas of the virtual workspace using a zoom-in level while still allowing the displayed objects to remain displayed by the client node in their entirety.

30. The method of claim 22, further comprising:

creating a canvas by:

obtaining information identifying an area in the virtual workspace that includes one or more displayed objects and defines the canvas; and storing data representing the canvas, the stored data including metadata identifying a location and dimensions of the area within the virtual workspace that defines the canvas;

creating a marker associated with the canvas of the virtual workspace; and transmitting data including the stored data representing the canvas and identifying the marker associated with the canvas.

* * * * *